US011150777B2

(12) United States Patent
Kaehler et al.

(10) Patent No.: US 11,150,777 B2
(45) Date of Patent: Oct. 19, 2021

(54) VIRTUAL USER INPUT CONTROLS IN A MIXED REALITY ENVIRONMENT

(71) Applicant: Magic Leap, Inc., Plantation, FL (US)

(72) Inventors: Adrian Kaehler, Los Angeles, CA (US); John Adam Croston, Seattle, WA (US)

(73) Assignee: Magic Leap, Inc., Plantation, FL (US)

( * ) Notice: Subject to any disclaimer, the term of this patent is extended or adjusted under 35 U.S.C. 154(b) by 247 days.

(21) Appl. No.: 15/829,249

(22) Filed: Dec. 1, 2017

(65) Prior Publication Data
US 2018/0157398 A1 Jun. 7, 2018

Related U.S. Application Data

(60) Provisional application No. 62/430,308, filed on Dec. 5, 2016, provisional application No. 62/430,279, filed on Dec. 5, 2016.

(51) Int. Cl.
*G06T 19/00* (2011.01)
*G06N 3/02* (2006.01)
(Continued)

(52) U.S. Cl.
CPC .......... *G06F 3/04815* (2013.01); *G06F 3/017* (2013.01); *G06K 9/00375* (2013.01);
(Continued)

(58) Field of Classification Search
None
See application file for complete search history.

(56) References Cited

U.S. PATENT DOCUMENTS 5,291,560 A 3/1994 Daugman
5,583,795 A 12/1996 Smyth
(Continued)

FOREIGN PATENT DOCUMENTS

EP 3 485 425 5/2019
WO WO 2014/182769 11/2014
(Continued)

OTHER PUBLICATIONS

International Search Report and Written Opinion for PCT Application No. PCT/US17/64311, dated Mar. 1, 2018.
(Continued)

*Primary Examiner* — Andre L Matthews
(74) *Attorney, Agent, or Firm* — Knobbe, Martens, Olson & Bear, LLP

(57) ABSTRACT

A wearable display system can automatically recognize a physical remote or a device that the remote serves using computer vision techniques. The wearable system can generate a virtual remote with a virtual control panel viewable and interactable by user of the wearable system. The virtual remote can emulate the functionality of the physical remote. The user can select a virtual remote for interaction, for example, by looking or pointing at the parent device or its remote control, or by selecting from a menu of known devices. The virtual remote may include a virtual button, which is associated with a volume in the physical space. The wearable system can detect that a virtual button is actuated by determining whether a portion of the user's body (e.g., the user's finger) has penetrated the volume associated with the virtual button.

15 Claims, 20 Drawing Sheets

(51) Int. Cl.
    *G06K 9/46*     (2006.01)
    *G06K 9/00*     (2006.01)
    *G06F 3/0481*     (2013.01)
    *G06F 3/01*     (2006.01)
    *G06N 20/00*     (2019.01)

(52) U.S. Cl.
    CPC ....... *G06K 9/00671* (2013.01); *G06K 9/4676* (2013.01); *G06N 3/02* (2013.01); *G06N 20/00* (2019.01); *G06T 19/006* (2013.01)

(56) References Cited

U.S. PATENT DOCUMENTS

| | | |
|---|---|---|
| 6,850,221 B1 | 2/2005 | Tickle |
| D514,570 S | 2/2006 | Ohta |
| 7,771,049 B2 | 8/2010 | Knaan et al. |
| 7,970,179 B2 | 6/2011 | Tosa |
| 8,098,891 B2 | 1/2012 | Lv et al. |
| 8,341,100 B2 | 12/2012 | Miller et al. |
| 8,345,984 B2 | 1/2013 | Ji et al. |
| 8,363,783 B2 | 1/2013 | Gertner et al. |
| 8,845,625 B2 | 9/2014 | Angeley et al. |
| 8,950,867 B2 | 2/2015 | Macnamara |
| 9,081,426 B2 | 7/2015 | Armstrong |
| 9,141,916 B1 | 9/2015 | Corrado et al. |
| 9,215,293 B2 | 12/2015 | Miller |
| 9,262,680 B2 | 2/2016 | Nakazawa et al. |
| D752,529 S | 3/2016 | Loretan et al. |
| 9,310,559 B2 | 4/2016 | Macnamara |
| 9,348,143 B2 | 5/2016 | Gao et al. |
| D758,367 S | 6/2016 | Natsume |
| D759,657 S | 7/2016 | Kujawski et al. |
| 9,417,452 B2 | 8/2016 | Schowengerdt et al. |
| 9,430,829 B2 | 8/2016 | Madabhushi et al. |
| 9,470,906 B2 | 10/2016 | Kaji et al. |
| 9,547,174 B2 | 1/2017 | Gao et al. |
| 9,671,566 B2 | 6/2017 | Abovitz et al. |
| D794,288 S | 8/2017 | Beers et al. |
| 9,720,505 B2 | 8/2017 | Gribetz et al. |
| 9,740,006 B2 | 8/2017 | Gao |
| 9,791,700 B2 | 10/2017 | Schowengerdt et al. |
| D805,734 S | 12/2017 | Fisher et al. |
| 9,851,563 B2 | 12/2017 | Gao et al. |
| 9,857,591 B2 | 1/2018 | Welch et al. |
| 9,874,749 B2 | 1/2018 | Bradski et al. |
| 10,922,583 B2 | 2/2021 | Kaehler et al. |
| 2002/0041327 A1* | 4/2002 | Hildreth ................. G06F 3/011 348/42 |
| 2004/0130680 A1 | 7/2004 | Zhou et al. |
| 2006/0028436 A1 | 2/2006 | Armstrong |
| 2006/0088193 A1 | 4/2006 | Muller et al. |
| 2006/0147094 A1 | 7/2006 | Yoo |
| 2007/0081123 A1 | 4/2007 | Lewis |
| 2007/0140531 A1 | 6/2007 | Hamza |
| 2009/0195538 A1 | 8/2009 | Ryu et al. |
| 2011/0182469 A1 | 7/2011 | Ji et al. |
| 2012/0119888 A1* | 5/2012 | Reeves .............. G05B 19/0426 340/12.24 |
| 2012/0127062 A1 | 5/2012 | Bar-Zeev et al. |
| 2012/0162549 A1 | 6/2012 | Gao et al. |
| 2012/0163678 A1 | 6/2012 | Du et al. |
| 2013/0082922 A1 | 4/2013 | Miller |
| 2013/0104085 A1 | 4/2013 | Mlyniec et al. |
| 2013/0117377 A1 | 5/2013 | Miller |
| 2013/0125027 A1 | 5/2013 | Abovitz |
| 2013/0147686 A1 | 6/2013 | Clavin et al. |
| 2013/0208234 A1 | 8/2013 | Lewis |
| 2013/0242262 A1 | 9/2013 | Lewis |
| 2014/0049558 A1 | 2/2014 | Krauss et al. |
| 2014/0071539 A1 | 3/2014 | Gao |
| 2014/0177023 A1 | 6/2014 | Gao et al. |
| 2014/0218468 A1 | 8/2014 | Gao et al. |
| 2014/0267420 A1 | 9/2014 | Schowengerdt |
| 2014/0270405 A1 | 9/2014 | Derakhshani et al. |
| 2014/0279774 A1 | 9/2014 | Wang et al. |
| 2014/0306866 A1 | 10/2014 | Miller et al. |
| 2014/0341441 A1 | 11/2014 | Slaby et al. |
| 2014/0380249 A1 | 12/2014 | Fleizach |
| 2015/0016777 A1 | 1/2015 | Abovitz et al. |
| 2015/0103306 A1 | 4/2015 | Kaji et al. |
| 2015/0117760 A1 | 4/2015 | Wang et al. |
| 2015/0125049 A1 | 5/2015 | Taigman et al. |
| 2015/0134583 A1 | 5/2015 | Tamatsu et al. |
| 2015/0170002 A1 | 6/2015 | Szegedy et al. |
| 2015/0178939 A1 | 6/2015 | Bradski et al. |
| 2015/0205126 A1 | 7/2015 | Schowengerdt |
| 2015/0222883 A1 | 8/2015 | Welch |
| 2015/0222884 A1 | 8/2015 | Cheng |
| 2015/0268415 A1 | 9/2015 | Schowengerdt et al. |
| 2015/0278642 A1 | 10/2015 | Chertok et al. |
| 2015/0302652 A1 | 10/2015 | Miller et al. |
| 2015/0309263 A2 | 10/2015 | Abovitz et al. |
| 2015/0326570 A1 | 11/2015 | Publicover et al. |
| 2015/0338915 A1 | 11/2015 | Publicover et al. |
| 2015/0346490 A1 | 12/2015 | TeKolste et al. |
| 2015/0346495 A1 | 12/2015 | Welch et al. |
| 2016/0011419 A1 | 1/2016 | Gao |
| 2016/0018985 A1* | 1/2016 | Bennet .................... G06F 3/011 345/175 |
| 2016/0026253 A1 | 1/2016 | Bradski et al. |
| 2016/0034811 A1 | 2/2016 | Paulik et al. |
| 2016/0035078 A1 | 2/2016 | Lin et al. |
| 2016/0098844 A1 | 4/2016 | Shaji et al. |
| 2016/0104053 A1 | 4/2016 | Yin et al. |
| 2016/0104056 A1 | 4/2016 | He et al. |
| 2016/0135675 A1 | 5/2016 | Du et al. |
| 2016/0162782 A1 | 6/2016 | Park |
| 2016/0165170 A1* | 6/2016 | McRae ................. H04N 5/4403 348/734 |
| 2016/0180151 A1 | 6/2016 | Philbin et al. |
| 2016/0299685 A1 | 10/2016 | Zhai et al. |
| 2016/0313902 A1 | 10/2016 | Hill et al. |
| 2016/0328021 A1 | 11/2016 | Lee et al. |
| 2017/0053165 A1 | 2/2017 | Kaehler |
| 2017/0168566 A1 | 6/2017 | Osterhout et al. |
| 2018/0018451 A1 | 1/2018 | Spizhevoy et al. |
| 2018/0018515 A1 | 1/2018 | Spizhevoy et al. |
| 2018/0089834 A1 | 3/2018 | Spizhevoy et al. |
| 2018/0096226 A1 | 4/2018 | Aliabadi et al. |
| 2018/0137642 A1 | 5/2018 | Malisiewicz et al. |
| 2019/0034765 A1 | 1/2019 | Kaehler et al. |
| 2021/0133506 A1 | 5/2021 | Kaehler |

FOREIGN PATENT DOCUMENTS

| | | |
|---|---|---|
| WO | WO 2015/164807 | 10/2015 |
| WO | WO 2018/013199 | 1/2018 |
| WO | WO 2018/013200 | 1/2018 |
| WO | WO 2018/039269 | 3/2018 |
| WO | WO 2018/063451 | 4/2018 |
| WO | WO 2018/067603 | 4/2018 |
| WO | WO 2018/093796 | 5/2018 |
| WO | WO 2018/106542 | 6/2018 |
| WO | WO 2019/022849 | 1/2019 |

OTHER PUBLICATIONS

"Single Cue—Upgrade Your Viewing Experience", in 7 pages; download Oct. 28, 2017 from URL: https://singlecue.com/.

Krizhevsky A. et al., "ImageNet Classification with Deep Convolutional Neural Networks", *Advances in Neural Information Processing Systems*. Dec. 2012; Pereira et al. [Eds.]; pp. 1097-1105.

International Preliminary Report on Patentability for PCT Application No. PCT/US17/64311, dated Jun. 11, 2019.

"Feature Extraction Using Convolution", Ufldl, printed Sep. 1, 2016, in 3 pages. URL:http://deeplearning.stanford.edu/wiki/index.php/Feature_extraction_using_convolution.

"Machine Learning", Wikipedia, printed Oct. 3, 2017, in 14 pages. URL: https://en.wikipedia.org/wiki/Machine_learning.

"Transfer Function Layers", GitHub, Dec. 1, 2015, in 13 pages; accessed URL: http://github.com/torch/nn/blob/master/doc/transfer.md.

(56) References Cited

OTHER PUBLICATIONS

Adegoke et al., "Iris Segmentation: A Survey", Int J Mod Engineer Res. (IJMER) (July/Aug. 2013) 3(4): 1885-1889.

Anthony, S., "MIT releases open-source software that reveals invisible motion and detail in video", Extreme Tech, Feb. 28, 2013, as accessed Aug. 4, 2017, in 5 pages.

Arevalo J. et al., "Convolutional neural networks for mammography mass lesion classification", in *Engineering in Medicine and Biology Society* (EMBC); 37th Annual International Conference IEEE, Aug. 25-29, 2015, pp. 797-800.

ARToolKit: https://web.archive.org/web/20051013062315/http://www.hitl.washington.edu:80/artoolkit/documentation/hardware.htm, archived Oct. 13, 2005.

Aubry M. et al., "Seeing 3D chairs: exemplar part-based 2D-3D alignment using a large dataset of CAD models", Proceedings of the IEEE Conference on Computer Vision and Pattern Recognition (Jun. 23-28, 2014); Computer Vision Foundation—Open Access Version in 8 pages.

Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.

Azuma, "Predictive Tracking for Augmented Realty," TR95-007, Department of Computer Science, UNC-Chapel Hill, NC, Feb. 1995.

Badrinarayanan et al., "SegNet: A Deep Convolutional Encoder-Decoder Architecture for Image Segmentation", IEEE (Decembers, 2015) arXiv:1511.00561 v2 in 14 pages.

Badrinarayanan et al., "SegNet: A Deep Convolutional Encoder-Decoder Architecture for Image Segmentation", TPAMI, vol. 39, No. 12, Dec. 2017.

Bansal A. et al., "Marr Revisited: 2D-3D Alignment via Surface Normal Prediction", Proceedings of the IEEE Conference on Computer Vision and Pattern Recognition (Jun. 27-30, 2016) pp. 5965-5974.

Belagiannis V. et al., "Recurrent Human Pose Estimation", In Automatic Face & Gesture Recognition; 12th IEEE International Conference—May 2017, ar Xiv:1605.02914v3; (Aug. 5, 2017) Open Access Version in 8 pages.

Bell S. et al., "Inside-Outside Net: Detecting Objects in Context with Skip Pooling and Recurrent Neural Networks", In Proceedings of the IEEE Conference on Computer Vision and Pattern Recognition, Jun. 27-30, 2016; pp. 2874-2883.

Biederman I., "Recognition-by-Components: A Theory of Human Image Understanding", Psychol Rev. (Apr. 1987) 94(2): 115-147.

Bimber, et al., "Spatial Augmented Reality—Merging Real and Virtual Worlds," 2005 https://web.media.mit.edu/~raskar/book/BimberRaskarAugmentedRealityBook.pdf.

Bouget, J., "Camera Calibration Toolbo for Matlab" Cal-Tech, Dec. 2, 2013, in 5 pages. URL: https://www.vision.caltech.edu/bouguetj/calib_doc/inde .html#parameters.

Bulat A. et al., "Human pose estimation via Convolutional Part Heatmap Regression", arXiv e-print arXiv:1609.01743v1, Sep. 6, 2016 in 16 pages.

Carreira J. et al., "Human Pose Estimation with Iterative Error Feedback", In Proceedings of the IEEE Conference on Computer Vision and Pattern Recognition, Jun. 27-30, 2016, pp. 4733-4742.

Chatfield et al., "Return of the Devil in the Details: Delving Deep into Convolutional Nets", arXiv e-print arXiv:1405.3531v4, Nov. 5, 2014 in 11 pages.

Chen X. et al., "3D Object Proposals for Accurate Object Class Detection", in Advances in Neural Information Processing Systems, (2015) Retrieved from <http://papers.nips.cc/paper/5644-3d-objectproposals-for-accurate-object-class-detection.pdf>; 11 pages.

Choy et al., "3D-R2N2: A Unified Approach for Single and Multi-view 3D Object Reconstruction", arXiv; e-print arXiv:1604.00449v1, Apr. 2, 2016 in 17 pages.

Collet et al., "The MOPED framework: Object Recognition and Pose Estimation for Manipulation", The International Journal of Robotics Research. (Sep. 2011) 30(10):1284-306; preprint Apr. 11, 2011 in 22 pages.

Coughlan et al., "The Manhattan World Assumption: Regularities in scene statistics which enable bayesian inference," In NIPS, 2000.

Crivellaro A. et al., "A Novel Representation of Parts for Accurate 3D Object Detection and Tracking in Monocular Images", In *Proceedings of the IEEE International Conference on Computer Vision*; Dec. 7-13, 2015 (pp. 4391-4399).

Dai J. et al., "Instance-aware Semantic Segmentation via Multi-task Network Cascades", In *Proceedings of the IEEE Conference on Computer Vision and Pattern Recognition*; Jun. 27-30, 2016 (pp. 3150-3158).

Dai J. et al., "R-FCN: Object Detection via Region-based Fully Convolutional Networks", in Advances in neural information processing systems; (Jun. 21, 2016) Retrieved from <https://arxiv.org/pdf/1605.06409.pdfin 11 pages.

Dasgupta et al., "Delay: Robust Spatial Layout Estimation for Cluttered Indoor Scenes," In CVPR, 2016.

Daugman, J. et al., "Epigenetic randomness, compleity and singularity of human iris patterns", Proceedings of Royal Society: Biological Sciences, vol. 268, Aug. 22, 2001, in 4 pages.

Daugman, J., "How Iris Recognition Works", IEEE Transactions on Circuits and Systems for Video Technology, vol. 14, No. 1, Jan. 2004, in 10 pages.

Daugman, J., "New Methods in Iris Recognition," IEEE Transactions on Systems, Man, and Cybernetics—Part B: Cybernetics, vol. 37, No. 5, Oct. 2007, in 9 pages.

Daugman, J., "Probing the Uniqueness and Randomness of IrisCodes: Results From 200 Billion Iris Pair Comparisons," Proceedings of the IEEE, vol. 94, No. 11, Nov. 2006, in 9 pages.

Del Pero et al., "Bayesian geometric modeling of indoor scenes," In CVPR, 2012.

Del Pero et al., "Understanding bayesian rooms using composite 3d object models," In CVPR, 2013.

Detone D. et al., "Deep Image Homography Estimation", arXiv e-print arXiv:1606.03798v1, Jun. 13, 2016 in 6 pages.

Dwibedi et al., "Deep Cuboid Detection: Beyond 2D Bounding Bo es", arXiv e-print arXiv:1611.10010v1; Nov. 30, 2016 in 11 pages.

Everingham M. et al., "The PASCAL Visual Object Classes (VOC) Challenge", Int J Comput Vis (Jun. 2010) 88(2):303-38.

Farabet, C. et al., "Hardware Accelerated Convolutional Neural Networks for Synthetic Vision Systems", Proceedings of the 2010 IEEE International Symposium (May 30-Jun. 2, 2010) Circuits and Systems (ISCAS), pp. 257-260.

Fidler S. et al., "3D Object Detection and Viewpoint Estimation with a Deformable 3D Cuboid Model", in *Proceedings of the 25th International Conference on Neural Information Processing Systems*, (Dec. 3-6, 2012), pp. 611-619.

Fouhey D. et al., "Data-Driven 3D Primitives for Single Image Understanding", Proceedings of the IEEE International Conference on Computer Vision, Dec. 1-8, 2013; pp. 3392-3399.

Geiger A. et al., "Joint 3D Estimation of Objects and Scene Layout", In Advances in Neural Information Processing Systems 24; (Dec. 12-17, 2011) in 9 pages.

Gidaris S. et al., "Object detection via a multi-region & semantic segmentation-aware CNN model", in Proceedings of the IEEE International Conference on Computer Vision; Dec. 7-13, 2015 (pp. 1134-1142).

Girshick R. et al., "Fast R-CNN", Proceedings of the IEEE International Conference on Computer Vision; Dec. 7-13, 2015 (pp. 1440-1448).

Girshick R. et al., "Rich feature hierarchies for accurate object detection and semantic segmentation", Proceedings of the IEEE Conference on Computer Vision and Pattern Recognition, Jun. 23-28, 2014 (pp. 580-587).

Gupta A. et al., "Blocks World Revisited: Image Understanding Using Qualitative Geometry and Mechanics", in European Conference on Computer Vision; Sep. 5, 2010 in 14 pages.

Gupta A. et al., "From 3D Scene Geometry to Human Workspace", in Computer Vision and Pattern Recognition (CVPR); IEEE Conference on Jun. 20-25, 2011 (pp. 1961-1968).

(56) References Cited

OTHER PUBLICATIONS

Gupta et al., "Perceptual Organization and Recognition of Indoor Scenes from RGB-D Images," In CVPR, 2013.
Gupta S. et al., "Aligning 3D Models to RGB-D Images of Cluttered Scenes", in Proceedings of the IEEE Conference on Computer Vision and Pattern Recognition, Jun. 7-12, 2015 (pp. 4731-4740).
Gupta S. et al., "Inferring 3D Object Pose in RGB-D Images", arXiv e-print arXiv:1502.04652v1, Feb. 16, 2015 in 13 pages.
Gupta S. et al., "Learning Rich Features from RGB-D Images for Object Detection and Segmentation", in European Conference on Computer Vision; (Jul. 22, 2014); Retrieved from <https://arxiv.org/pdf/1407.5736.pdf> in 16 pages.
Gupta, et al.: "Training In Virtual Environments," A Safe, Cost-Effective, and Engaging Approach to Training. University of Maryland, College Park, Maryland, CECD/ETC Series, 2008.
Han et al., "Deep Compression: Compressing Deep Neural Networks with Pruning, Trained Quantization and Huffman Coding", arXiv e-print arX iv: 1510.00149v5, Feb. 15, 2016 in 14 pages.
Hansen, D. et al., "In the Eye of the Beholder: A Survey of Models for Eyes and Gaze", IEEE Transactions on Pattern Analysis and Machine Intelligence, vol. 32, No. 3, Mar. 2010, in 23 pages.
Hartley R. et al., Multiple View Geometry in Computer Vision, 2nd Edition; Cambridge University Press, (Apr. 2004); in 673 pages.
He et al., "Deep Residual Learning for Image Recognition," In CVPR, 2016.
He et al., "Delving Deep into Rectifiers: Surpassing Human-level Performance on ImageNet Classification", arXiv: e-print arXiv:1502.01852v1, Feb. 6, 2015.
He et al., "Spatial Pyramid Pooling in Deep Convolutional Networks for Visual Recognition", arXiv e-print arXiv:1406.4729v2; Aug. 29, 2014 in 14 pages.
Hedau et al., "Recovering the Spatial Layout of Cluttered Rooms," In ICCV, 2009.
Hedau V. et al., "Recovering Free Space of Indoor Scenes from a Single Image", in Computer Vision and Pattern Recognition (CVPR), IEEE Conference Jun. 16-21, 2012 (pp. 2807-2814).
Hejrati et al., "Categorizing Cubes: Revisiting Pose Normalization", Applications of Computer Vision (WACV), 2016 IEEE Winter Conference, Mar. 7-10, 2016 in 9 pages.
Heun et al., Smarter Objects: Using AR technology to Program Physical Objects and their Interactions,; Work-in-Progress: Augmented Reality, CHI 2013: Changing Perspectives, Paris, Francem pp. 961-966.
Hijazi, S. et al., "Using Convolutional Neural Networks for Image Recognition", Tech Rep. (Sep. 2015) available online URL: http://ip. cadence. com/uploads/901/cnn-wp-pdf, in 12 pages.
Hochreiter et al., "Long Short-Term Memory," Neural computation, 9, 1735-1780, 1997.
Hoiem D. et al., "Representations and Techniques for 3D Object Recognition and Scene Interpretation", Synthesis Lectures on Artificial Intelligence and Machine Learning, Aug. 2011, vol. 5, No. 5, pp. 1-169; Abstract in 2 p.
Hsiao E. et al., "Making specific features less discriminative to improve point-based 3D object recognition", in Computer Vision and Pattern Recognition (CVPR), IEEE Conference, Jun. 13-18, 2010 (pp. 2653-2660).
Huang et al., "Sign Language Recognition Using 3D Convolutional Neural Networks", University of Science and Technology of China, 2015 IEEE International Conference on Multimedia and Expo. June 29-Jul. 3, 2015, in 6 pages.
Iandola F. et al., "SqueezeNet: Ale Net-level accuracy with 50 fewer parameters and <1 MB model size", arXiv e-print arXiv:1602.07360v1, Feb. 24, 2016 in 5 pages.
Ioffe S. et al., "Batch Normalization: Accelerating Deep Network Training by Reducing Internal Covariate Shift", arXiv:1502.03167v3 [cs.LG] Mar. 2, 2015.
Izadinia et al., "IM2CAD," arXiv preprint arXiv:1608.05137, 2016.
Jacob, "Eye Tracking in Advanced Interface Design," Human-Computer Interaction Lab Naval Research Laboratory, Washington, D.C./paper/in Virtual Environments and Advanced Interface Design, ed. by W. Barfield and T.A. Furness, pp. 258-288, Oxford University Press, New York (1995).
Jarrett et al., "What is the Best Multi-Stage Architecture for Object Recognition?," In Computer Vision IEEE 12th International Conference Sep. 29-Oct. 2, 2009, pp. 2146-2153.
Ji, H. et al., "3D Convolutional Neural Networks for Human Action Recognition", IEEE Transactions on Pattern Analysis and Machine Intelligence, vol. 35:1, Jan. 2013, in 11 pages.
Jia et al., "3D-Based Reasoning with Blocks, Support, and Stability", Proceedings of the IEEE Conference on Computer Vision and Pattern Recognition; Jun. 23-28, 2013 in 8 pages.
Jia et al., "Caffe: Convolutional Architecture for Fast Feature Embedding", arXiv e-print arXiv:1408.5093v1, Jun. 20, 2014 in 4 pages.
Jiang H et al., "A Linear Approach to Matching Cuboids in RGBD Images", in Proceedings of the IEEE Conference on Computer Vision and Pattern Recognition. Jun. 23-28, 2013 (pp. 2171-2178).
Jillela et al., "An Evaluation of Iris Segmentation Algorithms in Challenging Periocular Images", Handbook of Iris Recognition, Springer Verlag, Heidelberg (Jan. 12, 2013) in 28 pages.
Kar A. et al., "Category-specific object reconstruction from a single image", in Proceedings of the IEEE Conference on Computer Vision and Pattern Recognition. Jun. 7-12, 2015 (pp. 1966-1974).
Lavin, A. et al.: "Fast Algorithms for Convolutional Neural Networks", Proceedings of the IEEE Conference on Computer Vision and Pattern Recognition (Nov. 2016) arXiv:1509.09308v2, Nov. 10, 2015 in 9 pages.
Lee D. et al., "Geometric Reasoning for Single Image Structure Recovery", in IEEE Conference Proceedings in Computer Vision and Pattern Recognition (CVPR) Jun. 20-25, 2009, pp. 2136-2143.
Lee et al., "Deeply-Supervised Nets," In AISTATS, San Diego, CA 2015, JMLR: W&Cp vol. 38.
Lee et al., "Estimating Spatial Layout of Rooms using Volumetric Reasoning about Objects and Surfaces," In NIPS, 2010.
Lee et al., "Generalizing Pooling Functions in Convolutional Neural Networks: Mixed, Gated, and Tree," In AISTATS, Càdiz, Spain, JMLR: W&Cp vol. 51,2016.
Lee et al., "Recursive Recurrent Nets with Attention Modeling for OCR in the Wild," In CVPR, 2016.
Liang et al., "Recurrent Convolutional Neural Network for Object Recognition," In CVPR, 2015.
Lim J. et al., "FPM: Fine pose Parts-based Model with 3D CAD models", European Conference on Computer Vision; Springer Publishing, Sep. 6, 2014, pp. 478-493.
Liu et al., "Rent3d: Floor-Plan Priors for Monocular Layout Estimation," In CVPR, 2015.
Liu W. et al., "SSD: Single Shot MultiBo Detector", arXiv e-print arXiv:1512.02325v5, Dec. 29, 2016 in 17 pages.
Long et al., "Fully Convolutional Networks for Semantic Segmentation", Proceedings of the IEEE Conference on Computer Vision and Pattern Recognition (Jun. 7-12, 2015) in 10 pages.
Mallya et al., "Learning Informative Edge Maps for Indoor Scene Layout Prediction," In ICCV, 2015.
Meet singleue, "remoteless control for your living room," downloaded from https://singlecue.com on Oct. 28, 2017, in 7 pages.
Mirowski et al., "Learning to Navigate in Complex Environments," In ICLR, 2017.
Nair et al., "Rectified Linear Units Improve Restricted Boltzmann Machines," In ICML, Haifa, Israel Jun. 2010.
Newell et al., "Stacked Hourglass Networks for Human Pose Estimation," In ECCV, ArXiv:1603.06937v2 [cs.CV] 2016.
Noh et al., "Learning Deconvolution Network for Semantic Segmentation," In ICCV, 2015.
Oberweger et al., "Training a Feedback Loop for Hand Pose Estimation," In ICCV, 2015.
Camera calibration with OpenCV, OpenCV, retrieved May 5, 2016, in 7 pages. URL: http://docs.opencv.org/3.1.0/d4/d94/tutorial_camera_calibration.html#gsc.tab=0.
Open CV: "Camera calibration with OpenCV", OpenCV, retrieved May 5, 2016, in 12 pages. URL: http://docs.opencv.Org/2.4/doc/tutorials/calib3d/camera_calibration/camera_calibration.html.

(56) References Cited

OTHER PUBLICATIONS

OpenCV: "Camera Calibration and 3D Reconstruction", OpenCV, retrieved May 5, 2016, in 51 pages. URL: http://docs.opencv.org/2.4/modules/calib3d/doc/camera_calibration_and_3d_reconstruction.html.
Pavlakos G. et al., "6-dof object pose from semantic keypoints", in arXiv preprint Mar. 14, 2017; Retrieved from <http://www.cis.upenn.edu/~kostas/mypub.dir/pavlakos17icra.pdf> in 9 pages.
Peng et al., "A Recurrent Encoder-Decoder Network for Sequential Face Alignment," In ECCV, arXiv:1608.05477v2 [cs.CV] 2016.
Pfister et al., "Flowing Convnets for Human Pose Estimation in Videos," In ICCV, 2015.
Ramalingam et al., "Manhattan Junction Catalogue for Spatial Reasoning of Indoor Scenes," In CVPR, 2013.
Rastegari et al., "XNOR-Net: ImageNet Classification Using Binary Convolutional Neural Networks", arXiv e-print arXiv: 1603.05279v4; Aug. 2, 2016 in 17 pages.
Redmon et al., "You Only Look Once: Unified, Real-Time Object Detection", Proceedings of the IEEE Conference on Computer Vision and Pattern Recognition (Jun. 27-30, 2016) pp. 779-788.
Ren et al., "A Coarse-to-Fine Indoor Layout Estimation (CFILE) Method," In ACCV, arXiv:1607.00598v1 [cs.CV] 2016.
Ren et al., "Faster R-CNN: Towards real-time object detection with region proposal networks", arxiv e-print arXiv:1506.01497v3; Jan. 6, 2016 in 14 pages.
Ren et al., "On Vectorization of Deep Convolutional Neural Networks for Vision Tasks," AAAI, arXiv: e-print arXiv:1501.07338v1, Jan. 29, 2015 in 8 pages.
Roberts L. et al., "Machine Perception of Three-Dimensional Solids", Doctoral Thesis MIT; Jun. 1963 in 82 pages.
Rubinstein, M., "Eulerian Video Magnification", YouTube, published May 23, 2012, as archived Sep. 6, 2017, in 13 pages (with video transcription). URL: https://web.archive.org/web/20170906180503/https://www.youtube.com/watch?v=ONZcjs1Pjmk&feature=youtube.
Russell et al., "Labelme: a database and web-based tool for image annotation," IJCV, vol. 77, Issue 1-3, pp. 157-173, May 2008.
Savarese et al., "3D generic object categorization, localization and pose estimation", in *Computer Vision*, IEEE 11th International Conference; Oct. 14-21, 2007, in 8 pages.
Saxena A., "Convolutional Neural Networks (CNNS): An Illustrated E planation", Jun. 29, 2016 in 16 pages; Retrieved from <http://xrds.acm.org/blog/2016/06/convolutional-neural-networks-cnns-illustrated-explanation/>.
Schroff et al., "FaceNet: A unified embedding for Face Recognition and Clustering", arXiv e-print arXiv:1503.03832v3, Jun. 17, 2015 in 10 pages.
Schwing et al., "Efficient Structured Prediction for 3D Indoor Scene Understanding," In CVPR, 2012.
Shafiee et al., "ISAAC: A Convolutional Neural Network Accelerator with In-Situ Analog Arithmetic in Crossbars", ACM Sigarch Comp. Architect News (Jun. 2016) 44(3):14-26.
Shao et al., "Imagining the Unseen: Stability-based Cuboid Arrangements for Scene Understanding", ACM Transactions on Graphics. (Nov. 2014) 33(6) in 11 pages.
Shi et al., "Convolutional LSTM Network: A Machine Learning Approach for Precipitation Nowcasting," in NIPS, 2015.
Simonyan et al., "Very deep convolutional networks for large-scale image recognition", arXiv e-print arXiv:1409.1556v6, Apr. 10, 2015 in 14 pages.
Song et al., "Deep Sliding Shapes for Amodal 3D Object Detection in RGB-D Images", Proceedings of the IEEE Conference on Computer Vision and Pattern Recognition. Jun. 27-30, 2016 (pp. 808-816).
Song et al., "Sliding Shapes for 3D Object Detection in Depth Images", in European Conference on Computer Vision, (Sep. 6, 2014) Springer Publishing (pp. 634-651).
Song et al., "Sun RGB-D: A RGB-D Scene Understanding Benchmark Suite," In CVPR, 2015.
Su et al., "Render for CNN: Viewpoint Estimation in Images Using CNNs Trained with Rendered 3D Model Views", in Proceedings of the IEEE International Conference on Computer Vision, Dec. 7-13, 2015 (pp. 2686-2694).
Szegedy et al., "Going deeper with convolutions", arXiv:1409.4842v1, Sep. 17, 2014 in 12 pages.
Szegedy et al., "Going Deeper with Convolutions," In CVPR, 2015 in 9 pages.
Szegedy et al., "Rethinking the Inception Architecture for Computer Vision", arXiv e-print arXIV:1512.00567v3, Dec. 12, 2015 in 10 pages.
Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).
Tompson et al., "Joint Training of a Convolutional Network and a Graphical Model for Human Pose Estimation," In NIPS, 2014.
Tu et al., "Auto-context and Its Application to High-level Vision Tasks," In CVPR, 2008. 978-1-4244-2243-2/08, IEEE.
Tulsiani S. et al., "Viewpoints and Keypoints", Proceedings of the IEEE Conference on Computer Vision and Pattern Recognition; Jun. 7-12, 2015 (pp. 1510-1519).
Villanueva, A. et al., "A Novel Gaze Estimation System with One Calibration Point", IEEE Transactions on Systems, Man, and Cybernetics-Part B:Cybernetics, vol. 38:4, Aug. 2008, in 16 pages.
Wikipedia: "Convolution", Wikipedia, accessed Oct. 1, 2017, in 17 pages. URL: https://en.wikipedia.org/wiki/Convolution.
Wikipedia: "Deep Learning", Wikipedia, printed Oct. 3, 2017, in 23 pages. URL: https://en.wikipedia.org/wiki/Deep_learning.
Wilczkowiak et al., "Using Geometric Constraints Through Parallelepipeds for Calibration and 3D Modelling", IEEE Transactions on Pattern Analysis and Machine Intelligence—No. 5055 (Nov. 2003) 27(2) in 53 pages.
Wu et al., "Single Image 3D Interpreter Network", arXiv e-print arXiv:1604.08685v2, Oct. 4, 2016 in 18 pages.
Xiang Y. et al., "Data-Driven 3D Vox el Patterns for Object Category Recognition", in Proceedings of the IEEE Conference on Computer Vision and Pattern Recognition, Jun. 7-12, 2015 (pp. 1903-1911).
Xiao et al., "Localizing 3D cuboids in single-view images", in Advances in Neural Information Processing Systems 25. F. Pereira et al. [Eds.] Apr. 2013 in 9 pages.
Xiao et al., "Reconstructing the Worlds Museums," IJCV, 2014.
Xiao et al., "Sun database: Large-scale scene recognition from abbey to zoo," In CVPR, 2010 IEEE Conference on 2010, 3485-3492.
Yang et al., "Articulated human detection with flexible mixtures of parts", IEEE Transactions on Pattern Analysis and Machine Intelligence. Dec. 2013; 35(12):2878-90.
Yuan, et al., "Assembly guidance in Augmented Reality Environments Using a Virtual Interactive Tool," (Year: 2004).
Zhang et al., "Estimating the 3D Layout of Indoor Scenes and its Clutter from Depth Sensors," In ICCV, 2013.
Zhang et al., Large-scale Scene Understanding Challenge: Room Layout Estimation, 2016.
Zhao et al., "Scene Parsing by Integrating Function, Geometry and Appearance Models," In CVPR, 2013.
Zheng et al., "Conditional Random Fields as Recurrent Neural Networks," In CVPR, 2015.
Zheng et al., "Interactive Images: Cuboid Pro ies for Smart Image Manipulation", ACM Trans Graph. (Jul. 2012) 31(4):99-109.

\* cited by examiner

VIRTUAL USER INPUT CONTROLS IN A MIXED REALITY ENVIRONMENT

CROSS-REFERENCE TO RELATED APPLICATIONS

This application claims the benefit of priority under 35 U.S.C. § 119(e) to U.S. Provisional Application No. 62/430,308, filed on Dec. 5, 2016, entitled "UNIVERSAL VISUAL REMOTE," and U.S. Provisional Application No. 62/430,279, filed on Dec. 5, 2016, entitled "MECHANISM FOR A VIRTUAL BUTTON", the disclosures of which are hereby incorporated by reference herein in their entireties.

FIELD

The present disclosure relates to virtual reality and augmented reality imaging and visualization systems and more particularly to rendering virtual user input controls and detecting interactions with the virtual user input controls.

BACKGROUND

Modern computing and display technologies have facilitated the development of systems for so called "virtual reality", "augmented reality", or "mixed reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user; a mixed reality, or "MR", related to merging real and virtual worlds to produce new environments where physical and virtual objects coexist and interact in real time. As it turns out, the human visual perception system is very complex, and producing a VR, AR, or MR technology that facilitates a comfortable, natural-feeling, rich presentation of virtual image elements amongst other virtual or real-world imagery elements is challenging. Systems and methods disclosed herein address various challenges related to VR, AR and MR technology.

SUMMARY

Various examples of rendering virtual user input control and detecting an actuation of the virtual input control are described.

As one example, a wearable display system can automatically recognize a physical remote or a device that the remote serves using computer vision techniques. The wearable system can generate a virtual remote with a virtual control panel viewable and interactable by user of the wearable system. The virtual remote can emulate the functionality of the physical remote. The user can select a virtual remote for interaction, for example, by looking or pointing at the parent device or its remote control, or by selecting from a menu of known devices. The virtual remote may include a virtual button, which is associated with a volume in the physical space. The wearable system can detect that a virtual button is actuated by determining whether a portion of the user's body (e.g., the user's finger) has penetrated the volume associated with the virtual button.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

Figure 1:
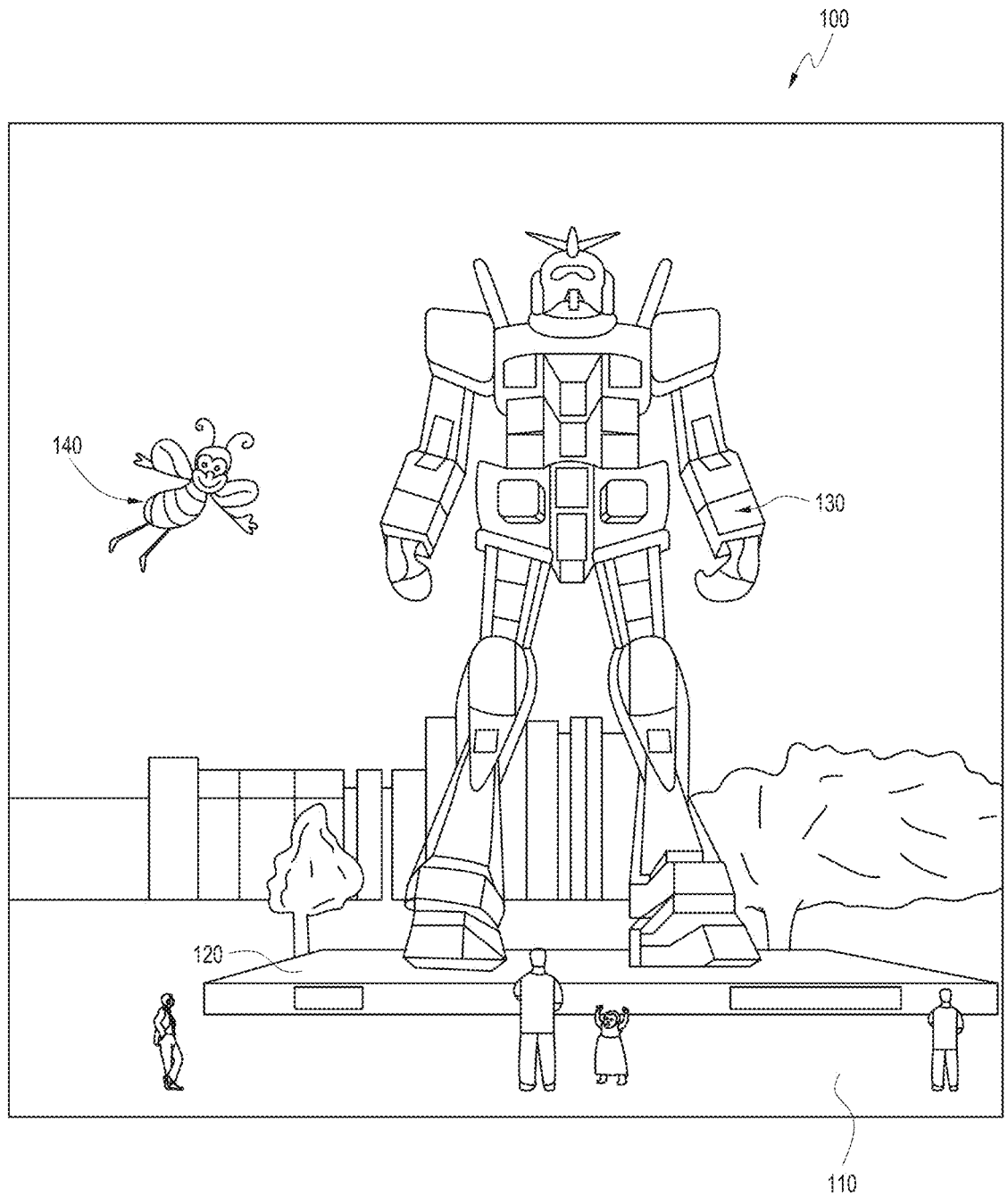
FIG. 1 depicts an illustration of a mixed reality scenario with certain virtual reality objects, and certain physical objects viewed by a person.

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

Many devices (also referred to as parent devices) such as televisions, audio systems, home theaters, home security systems, door bells or door locks, air conditioners or heaters, thermostats, lighting systems (e.g., smart light bulbs), garage door openers, or other household appliances or smart devices can be operated by a remote control. The remote control may be a physical remote comprising a small hand held device. The physical remote can comprise buttons (or a touch surface) that allow a user of a parent device to perform basic functions of the device from a distance. The physical remote can communicate with the parent device using various wireless channels such as an infrared (IR) signal or a radio frequency (RF) signal such as Bluetooth, Wi-Fi, etc. The communication between the physical remote and the parent device may be governed by one or more industry standards or protocols such as those created by the Infrared Data Association (IrDA) or by the Institute of Electrical and Electronics Engineers (IEEE).

Over time, the number of household appliances and their corresponding remotes has grown in a consumer's home. Increasingly many devices are connected to, and controllable from, a network (e.g., devices connected to the Internet of Things) via a remote control. This situation led to the introduction of universal remote control devices that could be programmed to emulate the signals generated by some or even all of the remotes that had been accumulated for different devices. The universal remote control devices may be part of a smartphone or a tablet. For example, the smartphone can use software to emulate a physical remote and generate an IR signal, in conjunction with a control interface appropriate to the emulated physical remote.

In an augmented reality (AR) or mixed reality (MR) environment, however, emulating a physical remote on a physical device (such as a smartphone or a tablet) may be impracticable because a head-mounted device (HMD) may have a small field of view and the user may need to hold the universal remote control device at an uncomfortable location to interact with the parent device. In addition, the user in the AR/MR environment can also interact with objects using body poses and gestures and therefore, may not need a separate physical device as the universal remote control.

The systems and methods described herein are directed at least in part to these challenges. For example, a wearable system can automatically recognize the physical remote or the parent device the remote serves using computer vision techniques. In addition, the wearable system can generate a virtual remote with a control panel viewable and interactable by the user of the wearable system. The user can identify a parent device or physical remote using body pose or eye gaze (e.g., by looking at or pointing at the parent device or the physical remote). Upon detecting the body pose or eye gaze, the wearable system can bring up an associated virtual remote. The user can also select a virtual remote from a menu of known devices.

The virtual remote may include one or more virtual elements on its control panel. The virtual elements may include virtual buttons, virtual sliders, virtual toggles, or a virtual touch surface. Unlike a physical remote or user input device, the virtual remote does not have a user control element (e.g., a button or a touch surface) such that the actuation of the user control element can directly trigger an electrical signal to be sent from the physical remote or the user input device to the associated computing device. Advantageously, in some embodiments, to detect that a user has actuated a virtual element, the wearable system can detect whether a portion of the user's body has intersected with an active surface of the virtual element. The wearable system can calculate the active surface's movement based the user's movement. For example, the speed and displacement of the active surface's movement may be a portion of the movement of the user's finger, which is being used to virtually touch a button. When the active surface reaches a certain threshold position, the wearable system can initiate an interaction event where the wearable system generates a signal indicating that the user has activated the virtual element. For example, the wearable system can determine that the user has pressed a virtual button when the displacement of the active surface has passed a threshold condition. When the user retracts his finger, the wearable system may move the active surface back toward its original position (before the user interaction). When the active surface moves sufficiently far back (such as passing another threshold position, the wearable system may generate another interaction event associated with releasing the virtual button.

Examples of 3D Display of a Wearable System

A wearable system (also referred to herein as an augmented reality (AR) system) can be configured to present 2D or 3D virtual images to a user. The images may be still images, frames of a video, or a video, in combination or the like. The wearable system can include a wearable device that can present a VR, AR, or MR environment, alone or in combination, for user interaction. The wearable device can be a head-mounted device (HMD) which is used interchangeably as an AR device (ARD). Further, for the purpose of the present disclosure, the term "AR" is used interchangeably with the term "MR".

FIG. 1 depicts an illustration of a mixed reality scenario with certain virtual reality objects, and certain physical objects viewed by a person. In FIG. 1, an MR scene 100 is depicted wherein a user of an MR technology sees a real-world park-like setting 110 featuring people, trees, buildings in the background, and a concrete platform 120. In addition to these items, the user of the MR technology also perceives that he "sees" a robot statue 130 standing upon the real-world platform 120, and a cartoon-like avatar character 140 flying by which seems to be a personification of a bumble bee, even though these elements do not exist in the real world.

In order for the 3D display to produce a true sensation of depth, and more specifically, a simulated sensation of surface depth, it may be desirable for each point in the display's visual field to generate an accommodative response corresponding to its virtual depth. If the accommodative response to a display point does not correspond to the virtual depth of that point, as determined by the binocular depth cues of convergence and stereopsis, the human eye may experience an accommodation conflict, resulting in unstable imaging, harmful eye strain, headaches, and, in the absence of accommodation information, almost a complete lack of surface depth.

VR, AR, and MR experiences can be provided by display systems having displays in which images corresponding to a plurality of depth planes are provided to a viewer. The images may be different for each depth plane (e.g., provide slightly different presentations of a scene or object) and may be separately focused by the viewer's eyes, thereby helping to provide the user with depth cues based on the accommodation of the eye required to bring into focus different image features for the scene located on different depth plane or based on observing different image features on different depth planes being out of focus. As discussed elsewhere herein, such depth cues provide credible perceptions of depth.

Figure 2:
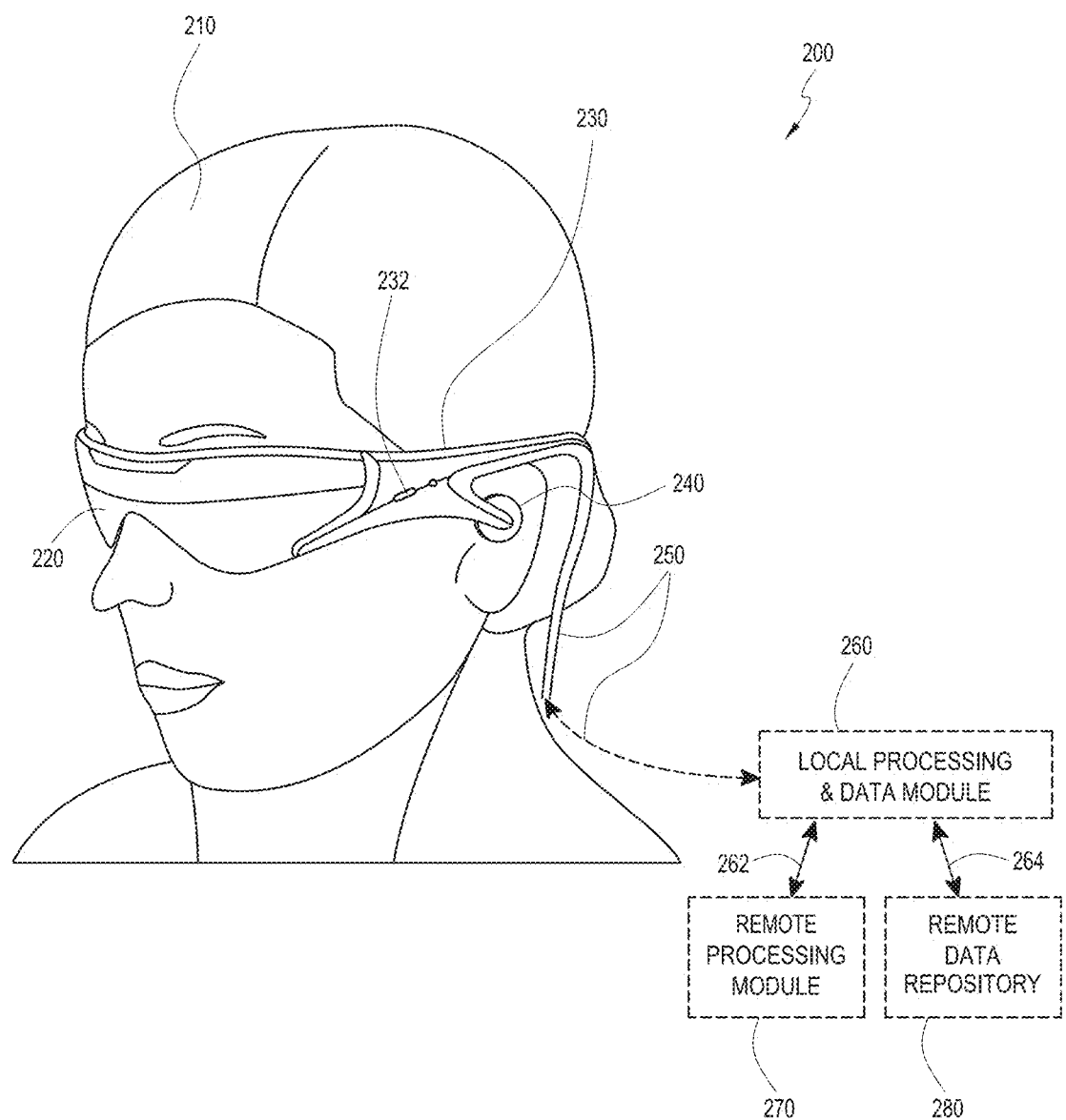
FIG. 2 schematically illustrates an example of a wearable system.

FIG. 2 illustrates an example of wearable system 200. The wearable system 200 includes a display 220, and various mechanical and electronic modules and systems to support the functioning of display 220. The display 220 may be coupled to a frame 230, which is wearable by a user, wearer, or viewer 210. The display 220 can be positioned in front of the eyes of the user 210. The display 220 can present AR/VR/MR content to a user. The display 220 can comprise a head mounted display that is worn on the head of the user. In some embodiments, a speaker 240 is coupled to the frame 230 and positioned adjacent the ear canal of the user (in some embodiments, another speaker, not shown, is positioned adjacent the other ear canal of the user to provide for stereo/shapeable sound control). The display 220 can include an audio sensor (e.g., a microphone) for detecting an audio stream from the environment on which to perform voice recognition.

The wearable system 200 can include an outward-facing imaging system 464 (shown in FIG. 4) which observes the world in the environment around the user. The wearable system 200 can also include an inward-facing imaging system 462 (shown in FIG. 4) which can track the eye movements of the user. The inward-facing imaging system may track either one eye's movements or both eyes' movements. The inward-facing imaging system 462 may be attached to the frame 230 and may be in electrical communication with the processing modules 260 or 270, which may process image information acquired by the inward-facing imaging system to determine, e.g., the pupil diameters or orientations of the eyes, eye movements or eye pose of the user 210.

As an example, the wearable system 200 can use the outward-facing imaging system 464 or the inward-facing imaging system 462 to acquire images of a pose of the user. The images may be still images, frames of a video, or a video, in combination or the like.

The wearable system 200 can also include a sensor 232 configured to communicate with a physical device (such as a television, an air conditioner, or other household appliances). For example, the wearable system 200 may serve as a virtual remote for controlling the physical device. The sensor 232 can be an infra-red light source controllable by the local processing and data module 270. The sensor 232 can also emit other optical signals or electromagnetic signals for communications with the physical device. The communications between the sensor 232 and the physical device may conform to one or more industry standards. For example, where the sensor 232 is configured to emit infrared signals, the communication between the sensor 232 and the physical device may be in accordance with a protocol designed by Infrared Data Association (IrDA). The sensor 232 can be located at the temple (such as the earpieces) of glasses, the nose pad of the wearable system 200, or other locations on a head-mounted display or remote to the head-mounted display (such as e.g., on a beltpack). Although the example in FIG. 2 only illustrates one sensor 232, in some embodiments, the display system may be associated with multiple sensors 232.

The display 220 can be operatively coupled 250, such as by a wired lead or wireless connectivity, to a local data processing module 260 which may be mounted in a variety of configurations, such as fixedly attached to the frame 230, fixedly attached to a helmet or hat worn by the user, embedded in headphones, or otherwise removably attached to the user 210 (e.g., in a backpack-style configuration, in a belt-coupling style configuration).

The local processing and data module 260 may comprise a hardware processor, as well as digital memory, such as non-volatile memory (e.g., flash memory), both of which may be utilized to assist in the processing, caching, and storage of data. The data may include data a) captured from sensors (which may be, e.g., operatively coupled to the frame 230 or otherwise attached to the user 210), such as image capture devices (e.g., cameras in the inward-facing imaging system or the outward-facing imaging system), audio sensors (e.g., microphones), inertial measurement units (IMUs), accelerometers, compasses, global positioning system (GPS) units, radio devices, or gyroscopes; or b) acquired or processed using remote processing module 270 or remote data repository 280, possibly for passage to the display 220 after such processing or retrieval. The local processing and data module 260 may be operatively coupled by communication links 262 or 264, such as via wired or wireless communication links, to the remote processing module 270 or remote data repository 280 such that these remote modules are available as resources to the local processing and data module 260. In addition, remote processing module 280 and remote data repository 280 may be operatively coupled to each other.

In some embodiments, the remote processing module 270 may comprise one or more processors configured to analyze and process data or image information. In some embodiments, the remote data repository 280 may comprise a digital data storage facility, which may be available through the internet or other networking configuration in a "cloud" resource configuration. In some embodiments, all data is stored and all computations are performed in the local processing and data module, allowing fully autonomous use from a remote module.

The human visual system is complicated and providing a realistic perception of depth is challenging. Without being limited by theory, it is believed that viewers of an object may perceive the object as being three-dimensional due to a combination of vergence and accommodation. Vergence movements (i.e., rolling movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex." Likewise, a change in vergence will trigger a matching change in accommodation, under normal conditions. Display systems that provide a better match between accommodation and vergence may form more realistic and comfortable simulations of three-dimensional imagery.

Figure 3:
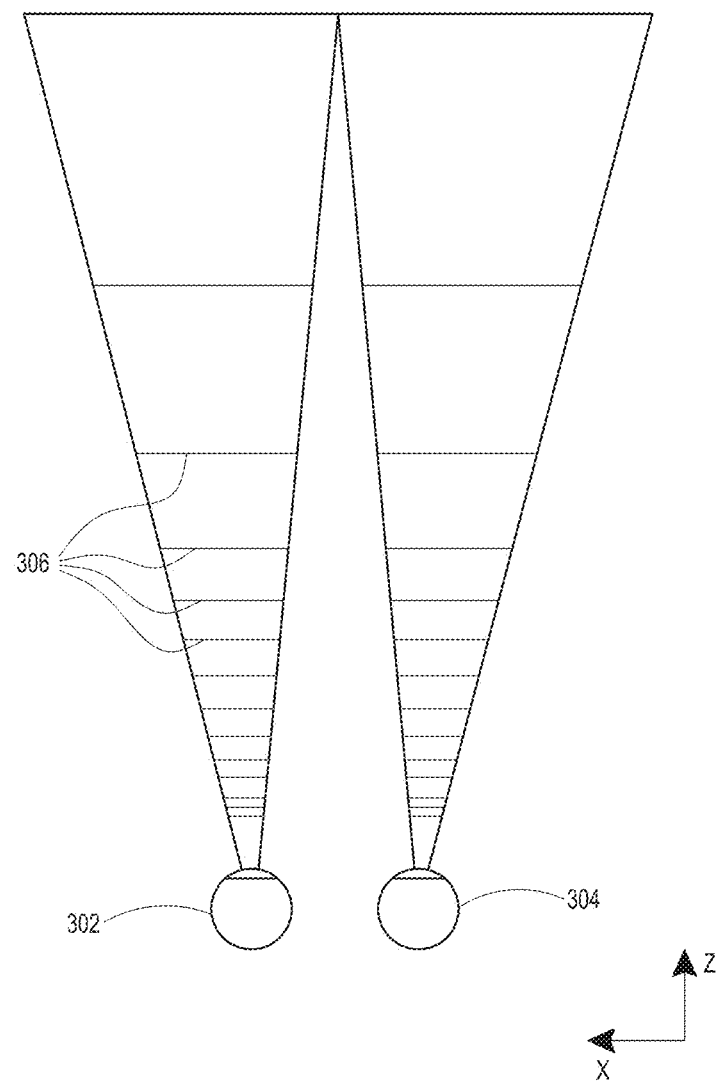
FIG. 3 schematically illustrates aspects of an approach for simulating three-dimensional imagery using multiple depth planes.

FIG. 3 illustrates aspects of an approach for simulating a three-dimensional imagery using multiple depth planes. With reference to FIG. 3, objects at various distances from eyes 302 and 304 on the z-axis are accommodated by the eyes 302 and 304 so that those objects are in focus. The eyes 302 and 304 assume particular accommodated states to bring into focus objects at different distances along the z-axis. Consequently, a particular accommodated state may be said to be associated with a particular one of depth planes 306, which has an associated focal distance, such that objects or parts of objects in a particular depth plane are in focus when the eye is in the accommodated state for that depth plane. In some embodiments, three-dimensional imagery may be simulated by providing different presentations of an image for each of the eyes 302 and 304, and also by providing different presentations of the image corresponding to each of the depth planes. While shown as being separate for clarity of illustration, it will be appreciated that the fields of view of the eyes 302 and 304 may overlap, for example, as distance along the z-axis increases. In addition, while shown as flat for the ease of illustration, it will be appreciated that the contours of a depth plane may be curved in physical space, such that all features in a depth plane are in focus with the eye in a particular accommodated state. Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes.

Waveguide Stack Assembly

Figure 4:
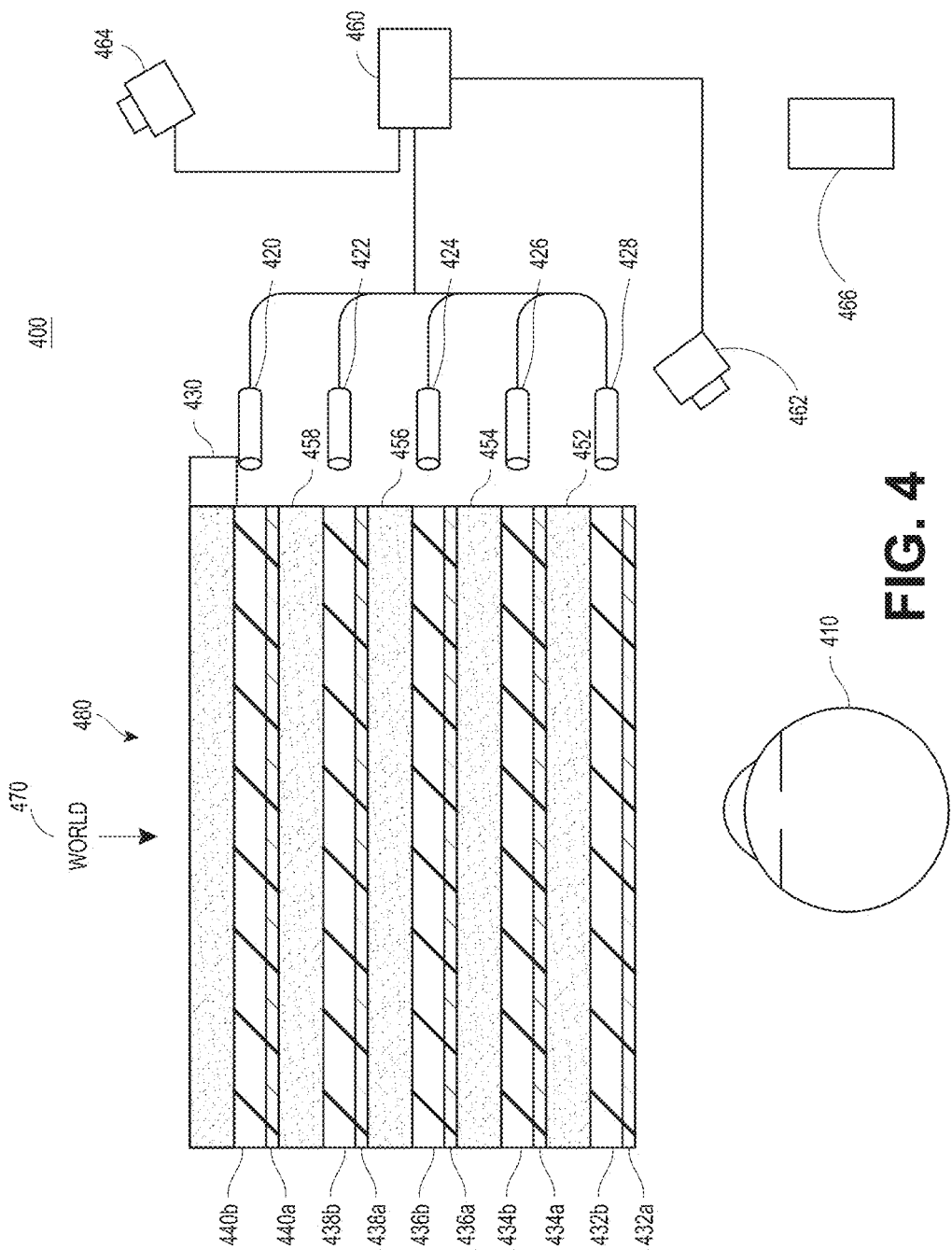
FIG. 4 schematically illustrates an example of a waveguide stack for outputting image information to a user.

FIG. 4 illustrates an example of a waveguide stack for outputting image information to a user. A wearable system 400 includes a stack of waveguides, or stacked waveguide assembly 480 that may be utilized to provide three-dimensional perception to the eye/brain using a plurality of waveguides 432b, 434b, 436b, 438b, 4400b. In some embodiments, the wearable system 400 may correspond to wearable system 200 of FIG. 2, with FIG. 4 schematically showing some parts of that wearable system 200 in greater detail. For example, in some embodiments, the waveguide assembly 480 may be integrated into the display 220 of FIG. 2.

With continued reference to FIG. 4, the waveguide assembly 480 may also include a plurality of features 458, 456, 454, 452 between the waveguides. In some embodiments, the features 458, 456, 454, 452 may be lenses. In other embodiments, the features 458, 456, 454, 452 may not be lenses. Rather, they may simply be spacers (e.g., cladding layers or structures for forming air gaps).

The waveguides 432b, 434b, 436b, 438b, 440b or the plurality of lenses 458, 456, 454, 452 may be configured to send image information to the eye with various levels of wavefront curvature or light ray divergence. Each waveguide level may be associated with a particular depth plane and may be configured to output image information corresponding to that depth plane. Image injection devices 420, 422, 424, 426, 428 may be utilized to inject image information into the waveguides 440b, 438b, 436b, 434b, 432b, each of which may be configured to distribute incoming light across each respective waveguide, for output toward the eye 410. Light exits an output surface of the image injection devices 420, 422, 424, 426, 428 and is injected into a corresponding input edge of the waveguides 440b, 438b, 436b, 434b, 432b. In some embodiments, a single beam of light (e.g., a collimated beam) may be injected into each waveguide to output an entire field of cloned collimated beams that are directed toward the eye 410 at particular angles (and amounts of divergence) corresponding to the depth plane associated with a particular waveguide.

In some embodiments, the image injection devices 420, 422, 424, 426, 428 are discrete displays that each produce image information for injection into a corresponding waveguide 440b, 438b, 436b, 434b, 432b, respectively. In some other embodiments, the image injection devices 420, 422, 424, 426, 428 are the output ends of a single multiplexed display which may, e.g., pipe image information via one or more optical conduits (such as fiber optic cables) to each of the image injection devices 420, 422, 424, 426, 428.

A controller 460 controls the operation of the stacked waveguide assembly 480 and the image injection devices 420, 422, 424, 426, 428. The controller 460 includes programming (e.g., instructions in a non-transitory computer-readable medium) that regulates the timing and provision of image information to the waveguides 440b, 438b, 436b, 434b, 432b. In some embodiments, the controller 460 may be a single integral device, or a distributed system connected by wired or wireless communication channels. The controller 460 may be part of the processing modules 260 or 270 (illustrated in FIG. 2) in some embodiments.

The waveguides 440b, 438b, 436b, 434b, 432b may be configured to propagate light within each respective waveguide by total internal reflection (TIR). The waveguides 440b, 438b, 436b, 434b, 432b may each be planar or have another shape (e.g., curved), with major top and bottom surfaces and edges extending between those major top and bottom surfaces. In the illustrated configuration, the waveguides 440b, 438b, 436b, 434b, 432b may each include light extracting optical elements 440a, 438a, 436a, 434a, 432a that are configured to extract light out of a waveguide by redirecting the light, propagating within each respective waveguide, out of the waveguide to output image information to the eye 410. Extracted light may also be referred to as outcoupled light, and light extracting optical elements may also be referred to as outcoupling optical elements. An extracted beam of light is outputted by the waveguide at locations at which the light propagating in the waveguide strikes a light redirecting element. The light extracting optical elements (440a, 438a, 436a, 434a, 432a) may, for example, be reflective or diffractive optical features. While illustrated disposed at the bottom major surfaces of the waveguides 440b, 438b, 436b, 434b, 432b for ease of description and drawing clarity, in some embodiments, the light extracting optical elements 440a, 438a, 436a, 434a, 432a may be disposed at the top or bottom major surfaces, or may be disposed directly in the volume of the waveguides 440b, 438b, 436b, 434b, 432b. In some embodiments, the light extracting optical elements 440a, 438a, 436a, 434a, 432a may be formed in a layer of material that is attached to a transparent substrate to form the waveguides 440b, 438b, 436b, 434b, 432b. In some other embodiments, the waveguides 440b, 438b, 436b, 434b, 432b may be a monolithic piece of material and the light extracting optical elements 440a, 438a, 436a, 434a, 432a may be formed on a surface or in the interior of that piece of material.

With continued reference to FIG. 4, as discussed herein, each waveguide 440b, 438b, 436b, 434b, 432b is configured to output light to form an image corresponding to a particular depth plane. For example, the waveguide 432b nearest the eye may be configured to deliver collimated light, as injected into such waveguide 432b, to the eye 410. The collimated light may be representative of the optical infinity focal plane. The next waveguide up 434b may be configured to send out collimated light which passes through the first lens 452 (e.g., a negative lens) before it can reach the eye 410. First lens 452 may be configured to create a slight convex wavefront curvature so that the eye/brain interprets light coming from that next waveguide up 434b as coming from a first focal plane closer inward toward the eye 410 from optical infinity. Similarly, the third up waveguide 436b passes its output light through both the first lens 452 and second lens 454 before reaching the eye 410. The combined optical power of the first and second lenses 452 and 454 may be configured to create another incremental amount of wavefront curvature so that the eye/brain interprets light coming from the third waveguide 436b as coming from a second focal plane that is even closer inward toward the person from optical infinity than was light from the next waveguide up 434b.

The other waveguide layers (e.g., waveguides 438b, 440b) and lenses (e.g., lenses 456, 458) are similarly configured, with the highest waveguide 440b in the stack sending its output through all of the lenses between it and the eye for an aggregate focal power representative of the closest focal plane to the person. To compensate for the stack of lenses 458, 456, 454, 452 when viewing/interpreting light coming from the world 470 on the other side of the stacked waveguide assembly 480, a compensating lens layer 430 may be disposed at the top of the stack to compensate for the aggregate power of the lens stack 458, 456, 454, 452 below. Such a configuration provides as many perceived focal planes as there are available waveguide/lens pairings. Both the light extracting optical elements of the waveguides and the focusing aspects of the lenses may be static (e.g., not dynamic or electro-active). In some alternative embodiments, either or both may be dynamic using electro-active features.

With continued reference to FIG. 4, the light extracting optical elements 440a, 438a, 436a, 434a, 432a may be configured to both redirect light out of their respective waveguides and to output this light with the appropriate amount of divergence or collimation for a particular depth plane associated with the waveguide. As a result, waveguides having different associated depth planes may have different configurations of light extracting optical elements, which output light with a different amount of divergence depending on the associated depth plane. In some embodiments, as discussed herein, the light extracting optical elements 440a, 438a, 436a, 434a, 432a may be volumetric or surface features, which may be configured to output light at specific angles. For example, the light extracting optical elements 440a, 438a, 436a, 434a, 432a may be volume holograms, surface holograms, and/or diffraction gratings. Light extracting optical elements, such as diffraction gratings, are described in U.S. Patent Publication No. 2015/0178939, published Jun. 25, 2015, which is incorporated by reference herein in its entirety.

In some embodiments, the light extracting optical elements 440a, 438a, 436a, 434a, 432a are diffractive features that form a diffraction pattern, or "diffractive optical element" (also referred to herein as a "DOE"). Preferably, the DOE has a relatively low diffraction efficiency so that only a portion of the light of the beam is deflected away toward the eye 410 with each intersection of the DOE, while the rest continues to move through a waveguide via total internal reflection. The light carrying the image information can thus be divided into a number of related exit beams that exit the waveguide at a multiplicity of locations and the result is a fairly uniform pattern of exit emission toward the eye 304 for this particular collimated beam bouncing around within a waveguide.

In some embodiments, one or more DOEs may be switchable between "on" state in which they actively diffract, and "off" state in which they do not significantly diffract. For instance, a switchable DOE may comprise a layer of polymer dispersed liquid crystal, in which microdroplets comprise a diffraction pattern in a host medium, and the refractive index of the microdroplets can be switched to substantially match the refractive index of the host material (in which case the pattern does not appreciably diffract incident light) or the microdroplet can be switched to an index that does not match that of the host medium (in which case the pattern actively diffracts incident light).

In some embodiments, the number and distribution of depth planes or depth of field may be varied dynamically based on the pupil sizes or orientations of the eyes of the viewer. Depth of field may change inversely with a viewer's pupil size. As a result, as the sizes of the pupils of the viewer's eyes decrease, the depth of field increases such that one plane that is not discernible because the location of that plane is beyond the depth of focus of the eye may become discernible and appear more in focus with reduction of pupil size and commensurate with the increase in depth of field. Likewise, the number of spaced apart depth planes used to present different images to the viewer may be decreased with the decreased pupil size. For example, a viewer may not be able to clearly perceive the details of both a first depth plane and a second depth plane at one pupil size without adjusting the accommodation of the eye away from one depth plane and to the other depth plane. These two depth planes may, however, be sufficiently in focus at the same time to the user at another pupil size without changing accommodation.

In some embodiments, the display system may vary the number of waveguides receiving image information based upon determinations of pupil size or orientation, or upon receiving electrical signals indicative of particular pupil size or orientation. For example, if the user's eyes are unable to distinguish between two depth planes associated with two waveguides, then the controller 460 (which may be an embodiment of the local processing and data module 260) can be configured or programmed to cease providing image information to one of these waveguides. Advantageously, this may reduce the processing burden on the system, thereby increasing the responsiveness of the system. In embodiments in which the DOEs for a waveguide are switchable between the on and off states, the DOEs may be switched to the off state when the waveguide does receive image information.

In some embodiments, it may be desirable to have an exit beam meet the condition of having a diameter that is less than the diameter of the eye of a viewer. However, meeting this condition may be challenging in view of the variability in size of the viewer's pupils. In some embodiments, this condition is met over a wide range of pupil sizes by varying the size of the exit beam in response to determinations of the size of the viewer's pupil. For example, as the pupil size decreases, the size of the exit beam may also decrease. In some embodiments, the exit beam size may be varied using a variable aperture.

The wearable system 400 can include an outward-facing imaging system 464 (e.g., a digital camera) that images a portion of the world 470. This portion of the world 470 may be referred to as the field of view (FOV) of a world camera and the imaging system 464 is sometimes referred to as an FOV camera. The entire region available for viewing or imaging by a viewer may be referred to as the field of regard (FOR). The FOR may include 4π steradians of solid angle surrounding the wearable system 400 because the wearer can move his body, head, or eyes to perceive substantially any direction in space. In other contexts, the wearer's movements may be more constricted, and accordingly the wearer's FOR may subtend a smaller solid angle. Images obtained from the outward-facing imaging system 464 can be used to track gestures made by the user (e.g., hand or finger gestures), detect objects in the world 470 in front of the user, and so forth.

The wearable system 400 can also include an inward-facing imaging system 466 (e.g., a digital camera), which observes the movements of the user, such as the eye movements and the facial movements. The inward-facing imaging system 466 may be used to capture images of the eye 410 to determine the size and/or orientation of the pupil of the eye 304. The inward-facing imaging system 466 can be used to obtain images for use in determining the direction the user is looking (e.g., eye pose) or for biometric identification of the user (e.g., via iris identification). In some embodiments, at least one camera may be utilized for each eye, to separately determine the pupil size or eye pose of each eye independently, thereby allowing the presentation of image information to each eye to be dynamically tailored to that eye. In some other embodiments, the pupil diameter or orientation of only a single eye 410 (e.g., using only a single camera per pair of eyes) is determined and assumed to be similar for both eyes of the user. The images obtained by the inward-facing imaging system 466 may be analyzed to determine the user's eye pose or mood, which can be used by the wearable system 400 to decide which audio or visual content should be presented to the user. The wearable system 400 may also determine head pose (e.g., head position or head orientation) using sensors such as IMUs, accelerometers, gyroscopes, etc.

The wearable system 400 can include a user input device 466 by which the user can input commands to the controller 460 to interact with the wearable system 400. For example, the user input device 466 can include a trackpad, a touchscreen, a joystick, a multiple degree-of-freedom (DOF) controller, a capacitive sensing device, a game controller, a keyboard, a mouse, a directional pad (D-pad), a wand, a haptic device, a totem (e.g., functioning as a virtual user input device), and so forth. A multi-DOF controller can sense user input in some or all possible translations (e.g., left/right, forward/backward, or up/down) or rotations (e.g., yaw, pitch, or roll) of the controller. A multi-DOF controller which supports the translation movements may be referred to as a 3 DOF while a multi-DOF controller which supports the translations and rotations may be referred to as 6 DOF. In some cases, the user may use a finger (e.g., a thumb) to press or swipe on a touch-sensitive input device to provide input to the wearable system 400 (e.g., to provide user input to a user interface provided by the wearable system 400). The user input device 466 may be held by the user's hand during the use of the wearable system 400. The user input device 466 can be in wired or wireless communication with the wearable system 400.

Figure 5:
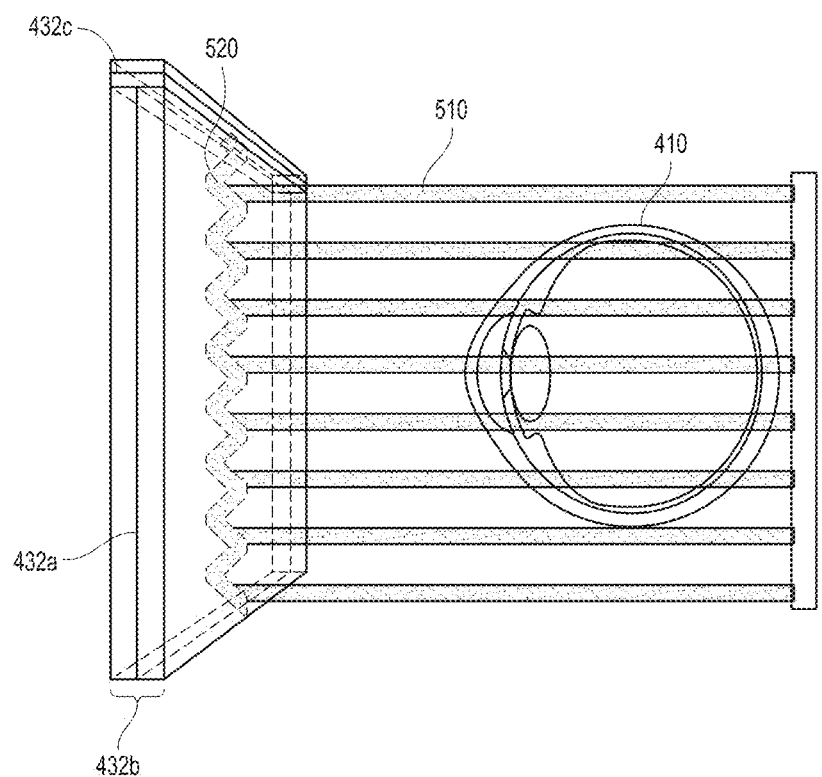
FIG. 5 shows example exit beams that may be outputted by a waveguide.

FIG. 5 shows an example of exit beams outputted by a waveguide. One waveguide is illustrated, but it will be appreciated that other waveguides in the waveguide assembly 480 may function similarly, where the waveguide assembly 480 includes multiple waveguides. Light 520 is injected into the waveguide 432b at the input edge 432c of the waveguide 432b and propagates within the waveguide 432b by TIR. At points where the light 520 impinges on the DOE 432a, a portion of the light exits the waveguide as exit beams 510. The exit beams 510 are illustrated as substantially parallel but they may also be redirected to propagate to the eye 410 at an angle (e.g., forming divergent exit beams), depending on the depth plane associated with the waveguide 432b. It will be appreciated that substantially parallel exit beams may be indicative of a waveguide with light extracting optical elements that outcouple light to form images that appear to be set on a depth plane at a large distance (e.g., optical infinity) from the eye 410. Other waveguides or other sets of light extracting optical elements may output an exit beam pattern that is more divergent, which would require the eye 410 to accommodate to a closer distance to bring it into focus on the retina and would be interpreted by the brain as light from a distance closer to the eye 410 than optical infinity.

Figure 6:
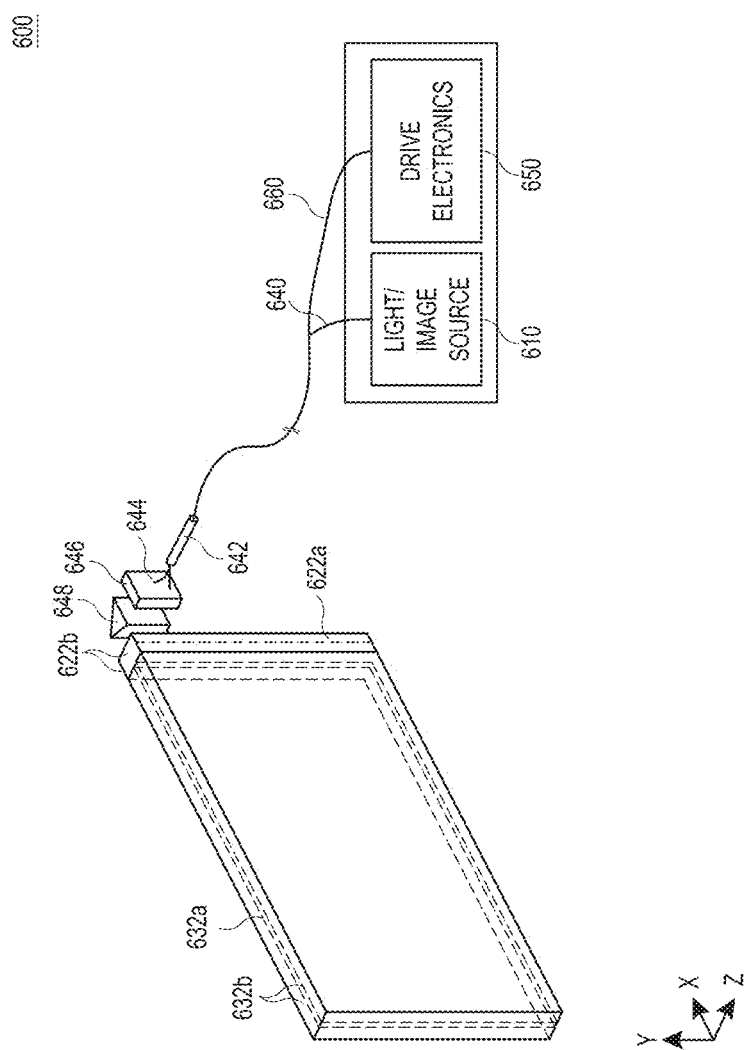
FIG. 6 is a schematic diagram showing an optical system including a waveguide apparatus, an optical coupler subsystem to optically couple light to or from the waveguide apparatus, and a control subsystem, used in the generation of a multi-focal volumetric display, image, or light field.

FIG. 6 is a schematic diagram showing an optical system including a waveguide apparatus, an optical coupler subsystem to optically couple light to or from the waveguide apparatus, and a control subsystem, used in the generation of a multi-focal volumetric display, image, or light field. The optical system can include a waveguide apparatus, an optical coupler subsystem to optically couple light to or from the waveguide apparatus, and a control subsystem. The optical system can be used to generate a multi-focal volumetric, image, or light field. The optical system can include one or more primary planar waveguides 632a (only one is shown in FIG. 6) and one or more DOEs 632b associated with each of at least some of the primary waveguides 632a. The planar waveguides 632b can be similar to the waveguides 432b, 434b, 436b, 438b, 440b discussed with reference to FIG. 4. The optical system may employ a distribution waveguide apparatus to relay light along a first axis (vertical or Y-axis in view of FIG. 6), and expand the light's effective exit pupil along the first axis (e.g., Y-axis). The distribution waveguide apparatus may, for example, include a distribution planar waveguide 622b and at least one DOE 622a (illustrated by double dash-dot line) associated with the distribution planar waveguide 622b. The distribution planar waveguide 622b may be similar or identical in at least some respects to the primary planar waveguide 632b, having a different orientation therefrom. Likewise, at least one DOE 622a may be similar to or identical in at least some respects to the DOE 632a. For example, the distribution planar waveguide 622b or DOE 622a may be comprised of the same materials as the primary planar waveguide 632b or DOE 632a, respectively. Embodiments of the optical display system 600 shown in FIG. 6 can be integrated into the wearable system 200 shown in FIG. 2.

The relayed and exit-pupil expanded light may be optically coupled from the distribution waveguide apparatus into the one or more primary planar waveguides 632b. The primary planar waveguide 632b can relay light along a second axis, preferably orthogonal to first axis (e.g., horizontal or X-axis in view of FIG. 6). Notably, the second axis can be a non-orthogonal axis to the first axis. The primary planar waveguide 632b expands the light's effective exit pupil along that second axis (e.g., X-axis). For example, the distribution planar waveguide 622b can relay and expand light along the vertical or Y-axis, and pass that light to the primary planar waveguide 632b which can relay and expand light along the horizontal or X-axis.

The optical system may include one or more sources of colored light (e.g., red, green, and blue laser light) 610 which may be optically coupled into a proximal end of a single mode optical fiber 640. A distal end of the optical fiber 640 may be threaded or received through a hollow tube 642 of piezoelectric material. The distal end protrudes from the tube 642 as fixed-free flexible cantilever 644. The piezoelectric tube 642 can be associated with four quadrant electrodes (not illustrated). The electrodes may, for example, be plated on the outside, outer surface or outer periphery or diameter of the tube 642. A core electrode (not illustrated) may also be located in a core, center, inner periphery or inner diameter of the tube 642.

Drive electronics 650, for example electrically coupled via wires 660, drive opposing pairs of electrodes to bend the piezoelectric tube 642 in two axes independently. The protruding distal tip of the optical fiber 644 has mechanical modes of resonance. The frequencies of resonance can depend upon a diameter, length, and material properties of the optical fiber 644. By vibrating the piezoelectric tube 642 near a first mode of mechanical resonance of the fiber cantilever 644, the fiber cantilever 644 can be caused to vibrate, and can sweep through large deflections.

By stimulating resonant vibration in two axes, the tip of the fiber cantilever 644 is scanned biaxially in an area filling two-dimensional (2D) scan. By modulating an intensity of light source(s) 610 in synchrony with the scan of the fiber cantilever 644, light emerging from the fiber cantilever 644 can form an image. Descriptions of such a set up are provided in U.S. Patent Publication No. 2014/0003762, which is incorporated by reference herein in its entirety.

A component of an optical coupler subsystem can collimate the light emerging from the scanning fiber cantilever 644. The collimated light can be reflected by mirrored surface 648 into the narrow distribution planar waveguide 622b which contains the at least one diffractive optical element (DOE) 622a. The collimated light can propagate vertically (relative to the view of FIG. 6) along the distribution planar waveguide 622b by TIR, and in doing so repeatedly intersects with the DOE 622a. The DOE 622a preferably has a low diffraction efficiency. This can cause a fraction (e.g., 10%) of the light to be diffracted toward an edge of the larger primary planar waveguide 632b at each point of intersection with the DOE 622a, and a fraction of the light to continue on its original trajectory down the length of the distribution planar waveguide 622b via TIR.

At each point of intersection with the DOE 622a, additional light can be diffracted toward the entrance of the primary waveguide 632b. By dividing the incoming light into multiple outcoupled sets, the exit pupil of the light can be expanded vertically by the DOE 622a in the distribution planar waveguide 622b. This vertically expanded light coupled out of distribution planar waveguide 622b can enter the edge of the primary planar waveguide 632b.

Light entering primary waveguide 632b can propagate horizontally (relative to the view of FIG. 6) along the primary waveguide 632b via TIR. As the light intersects with DOE 632a at multiple points as it propagates horizontally along at least a portion of the length of the primary waveguide 632b via TIR. The DOE 632a may advantageously be designed or configured to have a phase profile that is a summation of a linear diffraction pattern and a radially symmetric diffractive pattern, to produce both deflection and focusing of the light. The DOE 632a may advantageously have a low diffraction efficiency (e.g., 10%), so that only a portion of the light of the beam is deflected toward the eye of the view with each intersection of the DOE 632a while the rest of the light continues to propagate through the primary waveguide 632b via TIR.

At each point of intersection between the propagating light and the DOE 632a, a fraction of the light is diffracted toward the adjacent face of the primary waveguide 632b allowing the light to escape the TIR, and emerge from the face of the primary waveguide 632b. In some embodiments, the radially symmetric diffraction pattern of the DOE 632a additionally imparts a focus level to the diffracted light, both shaping the light wavefront (e.g., imparting a curvature) of the individual beam as well as steering the beam at an angle that matches the designed focus level.

Accordingly, these different pathways can cause the light to be coupled out of the primary planar waveguide 632b by a multiplicity of DOEs 632a at different angles, focus levels, or yielding different fill patterns at the exit pupil. Different fill patterns at the exit pupil can be beneficially used to create a light field display with multiple depth planes. Each layer in the waveguide assembly or a set of layers (e.g., 3 layers) in the stack may be employed to generate a respective color (e.g., red, blue, green). Thus, for example, a first set of three adjacent layers may be employed to respectively produce red, blue and green light at a first focal depth. A second set of three adjacent layers may be employed to respectively produce red, blue and green light at a second focal depth. Multiple sets may be employed to generate a full 3D or 4D color image light field with various focal depths.

Other Components of the Wearable System

In many implementations, the wearable system may include other components in addition or in alternative to the components of the wearable system described above. The wearable system may, for example, include one or more haptic devices or components. The haptic devices or components may be operable to provide a tactile sensation to a user. For example, the haptic devices or components may provide a tactile sensation of pressure or texture when touching virtual content (e.g., virtual objects, virtual tools, other virtual constructs). The tactile sensation may replicate a feel of a physical object which a virtual object represents, or may replicate a feel of an imagined object or character (e.g., a dragon) which the virtual content represents. In some implementations, haptic devices or components may be worn by the user (e.g., a user wearable glove). In some implementations, haptic devices or components may be held by the user.

The wearable system may, for example, include one or more physical objects which are manipulable by the user to allow input or interaction with the wearable system. These physical objects may be referred to herein as totems. Some totems may take the form of inanimate objects, such as for example, a piece of metal or plastic, a wall, a surface of table. In certain implementations, the totems may not actually have any physical input structures (e.g., keys, triggers, joystick, trackball, rocker switch). Instead, the totem may simply provide a physical surface, and the wearable system may render a user interface so as to appear to a user to be on one or more surfaces of the totem. For example, the wearable system may render an image of a computer keyboard and trackpad to appear to reside on one or more surfaces of a totem. For example, the wearable system may render a virtual computer keyboard and virtual trackpad to appear on a surface of a thin rectangular plate of aluminum which serves as a totem. The rectangular plate does not itself have any physical keys or trackpad or sensors. However, the wearable system may detect user manipulation or interaction or touches with the rectangular plate as selections or inputs made via the virtual keyboard or virtual trackpad. The user input device 466 (shown in FIG. 4) may be an embodiment of a totem, which may include a trackpad, a touchpad, a trigger, a joystick, a trackball, a rocker or virtual switch, a mouse, a keyboard, a multi-degree-of-freedom controller, or another physical input device. A user may use the totem, alone or in combination with poses, to interact with the wearable system or other users.

Examples of haptic devices and totems usable with the wearable devices, HMD, and display systems of the present disclosure are described in U.S. Patent Publication No. 2015/0016777, which is incorporated by reference herein in its entirety.

Example Wearable Systems, Environments, and Interfaces

A wearable system may employ various mapping related techniques in order to achieve high depth of field in the rendered light fields. In mapping out the virtual world, it is advantageous to know all the features and points in the real world to accurately portray virtual objects in relation to the real world. To this end, FOV images captured from users of the wearable system can be added to a world model by including new pictures that convey information about various points and features of the real world. For example, the wearable system can collect a set of map points (such as 2D points or 3D points) and find new map points to render a more accurate version of the world model. The world model of a first user can be communicated (e.g., over a network such as a cloud network) to a second user so that the second user can experience the world surrounding the first user.

Figure 7:
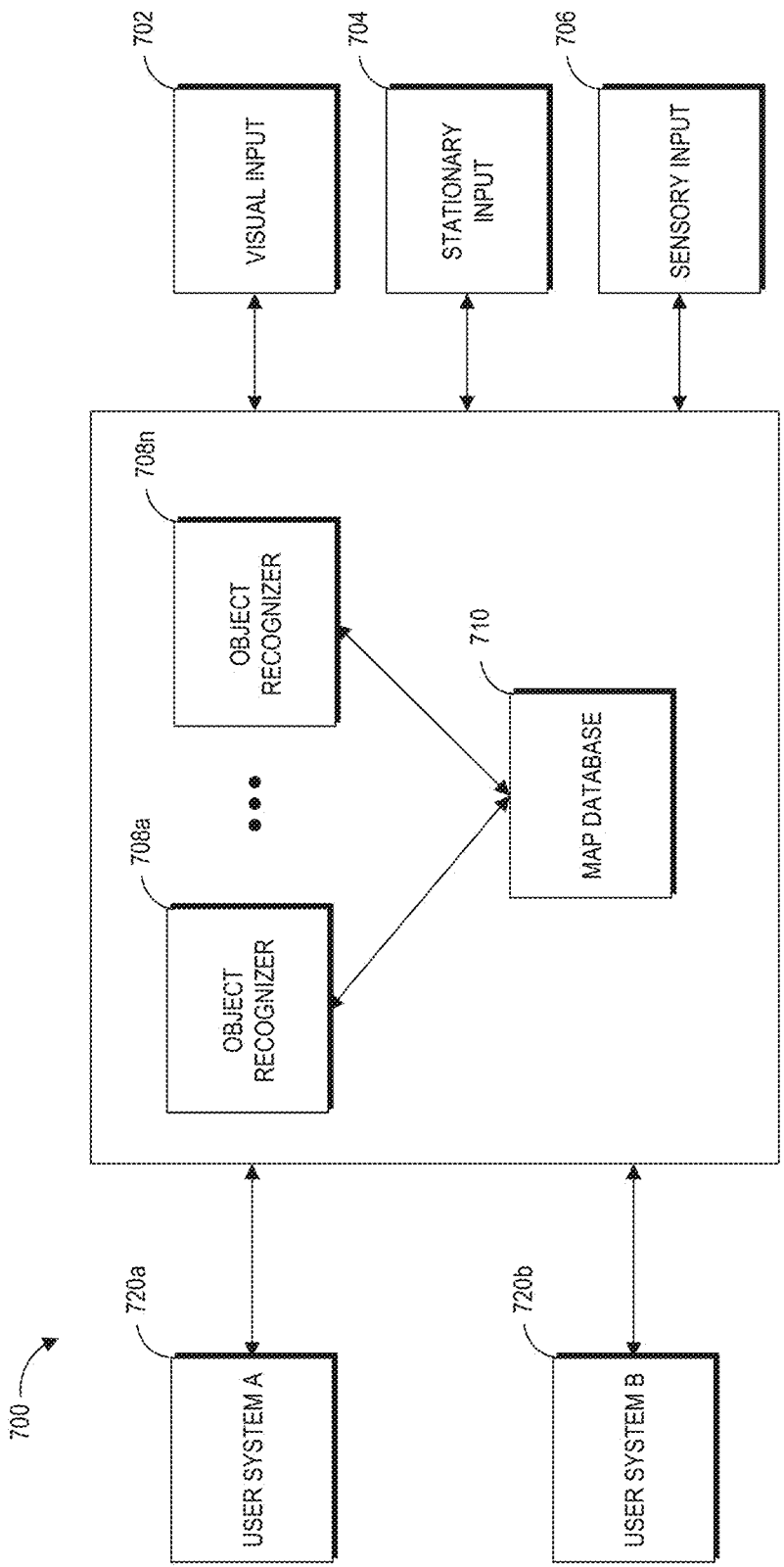
FIG. 7 is a block diagram of an example of a wearable system.

FIG. 7 is a block diagram of an example of an MR environment 700. The MR environment 700 may be configured to receive input (e.g., visual input 702 from the user's wearable system, stationary input 704 such as room cameras, sensory input 706 from various sensors, gestures, totems, eye tracking, user input from the user input device 466 etc.) from one or more user wearable systems (e.g., wearable system 200 or display system 220) or stationary room systems (e.g., room cameras, etc.). The wearable systems can use various sensors (e.g., accelerometers, gyroscopes, temperature sensors, movement sensors, depth sensors, GPS sensors, inward-facing imaging system, outward-facing imaging system, etc.) to determine the location and various other attributes of the environment of the user. This information may further be supplemented with information from stationary cameras in the room that may provide images or various cues from a different point of view. The image data acquired by the cameras (such as the room cameras and/or the cameras of the outward-facing imaging system) may be reduced to a set of mapping points.

One or more object recognizers 708 can crawl through the received data (e.g., the collection of points) and recognize or map points, tag images, attach semantic information to objects with the help of a map database 710. The map database 710 may comprise various points collected over time and their corresponding objects. The various devices and the map database can be connected to each other through a network (e.g., LAN, WAN, etc.) to access the cloud.

Based on this information and collection of points in the map database, the object recognizers 708a to 708n may recognize objects in an environment. For example, the object recognizers can recognize faces, persons, windows, walls, user input devices, televisions, documents (e.g., travel tickets, driver's license, passport as described in the security examples herein), other objects in the user's environment, etc. One or more object recognizers may be specialized for object with certain characteristics. For example, the object recognizer 708a may be used to recognizer faces, while another object recognizer may be used recognize documents.

The object recognitions may be performed using a variety of computer vision techniques. For example, the wearable system can analyze the images acquired by the outward-facing imaging system 464 (shown in FIG. 4) to perform scene reconstruction, event detection, video tracking, object recognition (e.g., persons or documents), object pose estimation, facial recognition (e.g., from a person in the environment or an image on a document), learning, indexing, motion estimation, or image analysis (e.g., identifying indicia within documents such as photos, signatures, identification information, travel information, etc.), and so forth. One or more computer vision algorithms may be used to perform these tasks. Non-limiting examples of computer vision algorithms include: Scale-invariant feature transform (SIFT), speeded up robust features (SURF), oriented FAST and rotated BRIEF (ORB), binary robust invariant scalable keypoints (BRISK), fast retina keypoint (FREAK), Viola-Jones algorithm, Eigenfaces approach, Lucas-Kanade algorithm, Horn-Schunk algorithm, Mean-shift algorithm, visual simultaneous location and mapping (vSLAM) techniques, a sequential Bayesian estimator (e.g., Kalman filter, extended Kalman filter, etc.), bundle adjustment, Adaptive thresholding (and other thresholding techniques), Iterative Closest Point (ICP), Semi Global Matching (SGM), Semi Global Block Matching (SGBM), Feature Point Histograms, various machine learning algorithms (such as e.g., support vector machine, k-nearest neighbors algorithm, Naive Bayes, neural network (including convolutional or deep neural networks), or other supervised/unsupervised models, etc.), and so forth.

The object recognitions can additionally or alternatively be performed by a variety of machine learning algorithms. Once trained, the machine learning algorithm can be stored by the HMD. Some examples of machine learning algorithms can include supervised or non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, a-priori algorithms), artificial neural network algorithms (such as, for example, Perceptron), deep learning algorithms (such as, for example, Deep Boltzmann Machine, or deep neural network), dimensionality reduction algorithms (such as, for example, Principal Component Analysis), ensemble algorithms (such as, for example, Stacked Generalization), and/or other machine learning algorithms. In some embodiments, individual models can be customized for individual data sets. For example, the wearable device can generate or store a base model. The base model may be used as a starting point to generate additional models specific to a data type (e.g., a particular user in the telepresence session), a data set (e.g., a set of additional images obtained of the user in the telepresence session), conditional situations, or other variations. In some embodiments, the wearable HMD can be configured to utilize a plurality of techniques to generate models for analysis of the aggregated data. Other techniques may include using pre-defined thresholds or data values.

Based on this information and collection of points in the map database, the object recognizers 708a to 708n may recognize objects and supplement objects with semantic information to give life to the objects. For example, if the object recognizer recognizes a set of points to be a door, the system may attach some semantic information (e.g., the door has a hinge and has a 90 degree movement about the hinge). If the object recognizer recognizes a set of points to be a mirror, the system may attach semantic information that the mirror has a reflective surface that can reflect images of objects in the room. The semantic information can include affordances of the objects as described herein. For example, the semantic information may include a normal of the object. The system can assign a vector whose direction indicates the normal of the object. Over time the map database grows as the system (which may reside locally or may be accessible through a wireless network) accumulates more data from the world. Once the objects are recognized, the information may be transmitted to one or more wearable systems. For example, the MR environment 700 may include information about a scene happening in California. The environment 700 may be transmitted to one or more users in New York. Based on data received from an FOV camera and other inputs, the object recognizers and other software components can map the points collected from the various images, recognize objects etc., such that the scene may be accurately "passed over" to a second user, who may be in a different part of the world. The environment 700 may also use a topological map for localization purposes.

Figure 8:
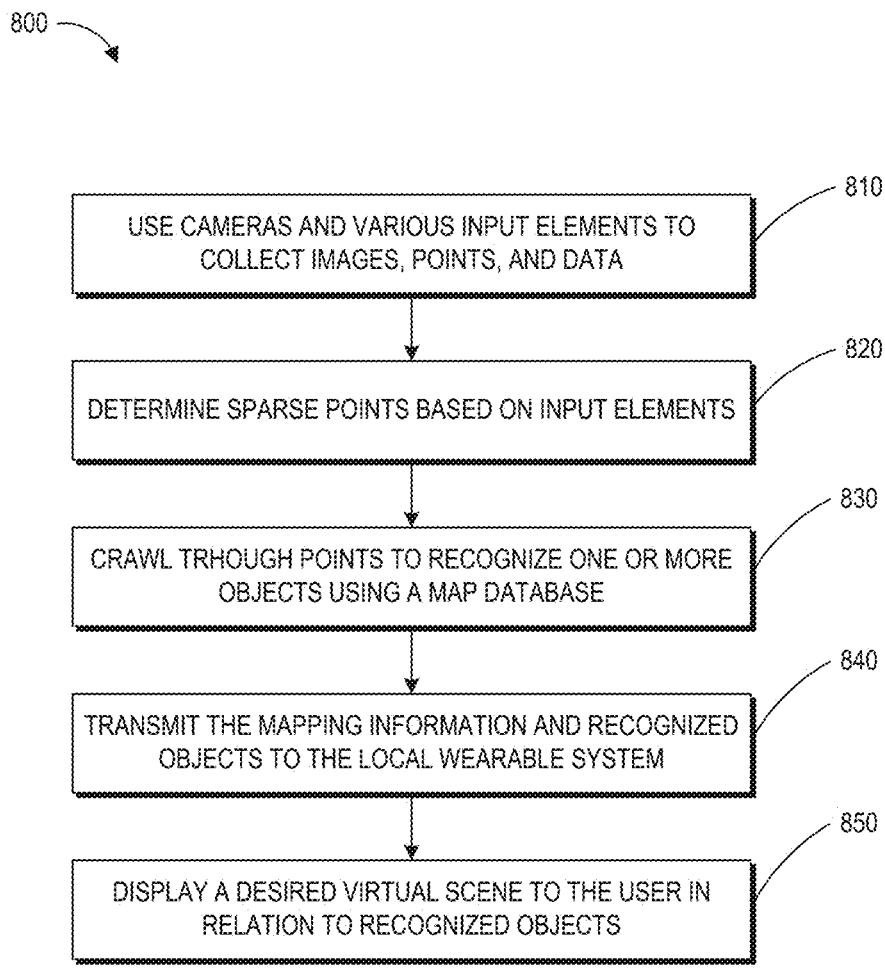
FIG. 8 is a process flow diagram of an example of a method of rendering virtual content in relation to recognized objects.

FIG. 8 is a process flow diagram of an example of a method 800 of rendering virtual content in relation to recognized objects. The method 800 describes how a virtual scene may be presented to a user of the wearable system. The user may be geographically remote from the scene. For example, the user may be in New York, but may want to view a scene that is presently going on in California, or may want to go on a walk with a friend who resides in California.

At block 810, the wearable system may receive input from the user and other users regarding the environment of the user. This may be achieved through various input devices, and knowledge already possessed in the map database. The user's FOV camera, sensors, GPS, eye tracking, etc., convey information to the system at block 810. The system may determine sparse points based on this information at block 820. The sparse points may be used in determining pose data (e.g., head pose, eye pose, body pose, or hand gestures) that can be used in displaying and understanding the orientation and position of various objects in the user's surroundings. The object recognizers 708a-708n may crawl through these collected points and recognize one or more objects using a map database at block 830. This information may then be conveyed to the user's individual wearable system at block 840, and the desired virtual scene may be accordingly displayed to the user at block 850. For example, the desired virtual scene (e.g., user in CA) may be displayed at the appropriate orientation, position, etc., in relation to the various objects and other surroundings of the user in New York.

Figure 9:
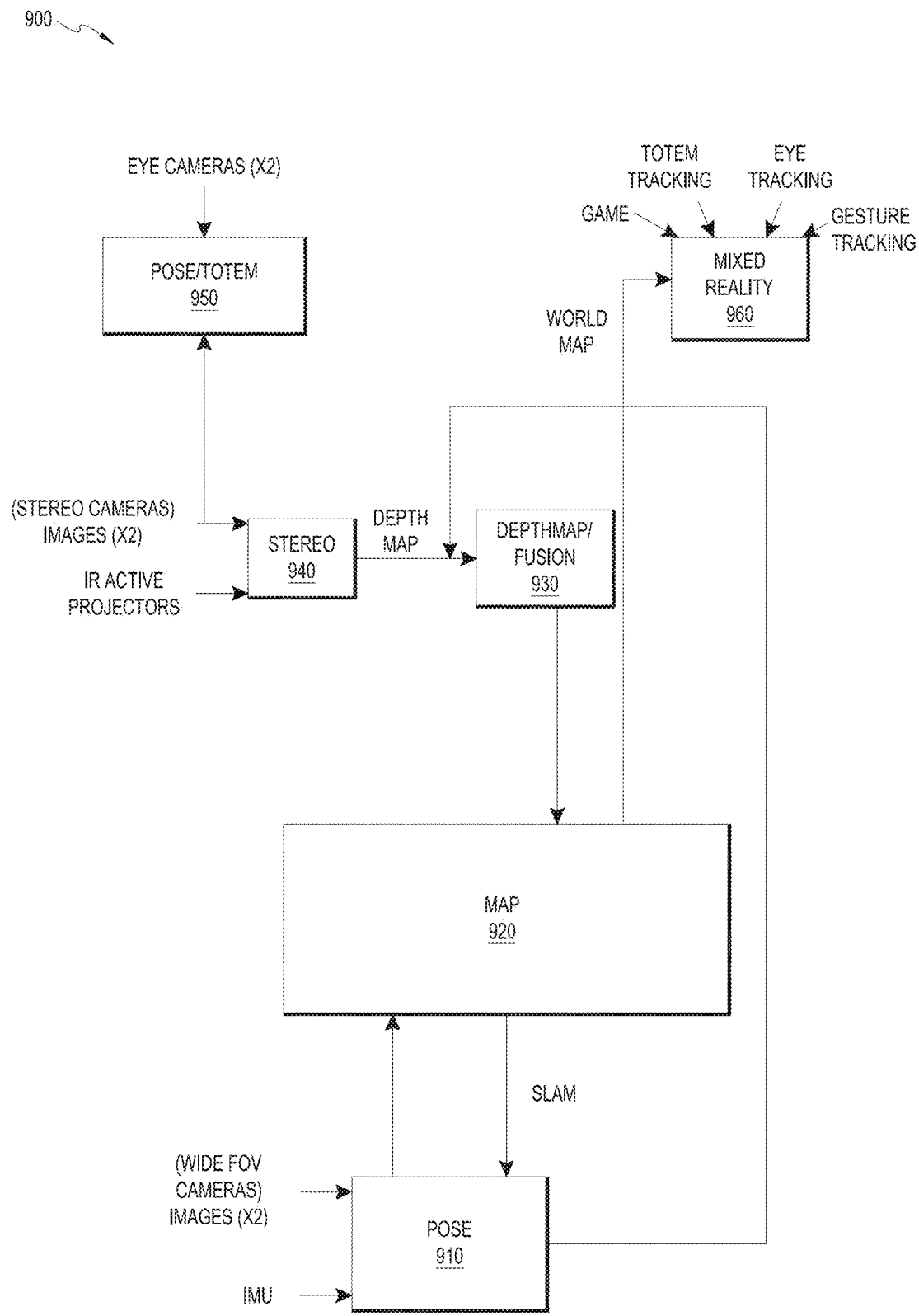
FIG. 9 is a block diagram of another example of a wearable system.

FIG. 9 is a block diagram of another example of a wearable system. In this example, the wearable system 900 comprises a map, which may include map data for the world. The map may partly reside locally on the wearable system, and may partly reside at networked storage locations accessible by wired or wireless network (e.g., in a cloud system). A pose process 910 may be executed on the wearable computing architecture (e.g., processing module 260 or controller 460) and utilize data from the map to determine position and orientation of the wearable computing hardware or user. Pose data may be computed from data collected on the fly as the user is experiencing the system and operating in the world. The data may comprise images, data from sensors (such as inertial measurement units, which generally comprise accelerometer and gyroscope components) and surface information pertinent to objects in the real or virtual environment.

A sparse point representation may be the output of a simultaneous localization and mapping (e.g., SLAM or vSLAM, referring to a configuration wherein the input is images/visual only) process. The system can be configured to not only find out where in the world the various components are, but what the world is made of. Pose may be a building block that achieves many goals, including populating the map and using the data from the map.

In one embodiment, a sparse point position may not be completely adequate on its own, and further information may be needed to produce a multifocal AR, VR, or MR experience. Dense representations, generally referring to depth map information, may be utilized to fill this gap at least in part. Such information may be computed from a process referred to as Stereo 940, wherein depth information is determined using a technique such as triangulation or time-of-flight sensing. Image information and active patterns (such as infrared patterns created using active projectors) may serve as input to the Stereo process 940. A significant amount of depth map information may be fused together, and some of this may be summarized with a surface representation. For example, mathematically definable surfaces may be efficient (e.g., relative to a large point cloud) and digestible inputs to other processing devices like game engines. Thus, the output of the stereo process (e.g., a depth map) 940 may be combined in the fusion process 930. Pose 950 may be an input to this fusion process 930 as well, and the output of fusion 930 becomes an input to populating the map process 920. Sub-surfaces may connect with each other, such as in topographical mapping, to form larger surfaces, and the map becomes a large hybrid of points and surfaces.

To resolve various aspects in a mixed reality process 960, various inputs may be utilized. For example, in the embodiment depicted in FIG. 9, Game parameters may be inputs to determine that the user of the system is playing a monster battling game with one or more monsters at various locations, monsters dying or running away under various conditions (such as if the user shoots the monster), walls or other objects at various locations, and the like. The world map may include information regarding where such objects are relative to each other, to be another valuable input to mixed reality. Pose relative to the world becomes an input as well and plays a key role to almost any interactive system.

Controls or inputs from the user are another input to the wearable system 900. As described herein, user inputs can include visual input, gestures, totems, audio input, sensory input, etc. In order to move around or play a game, for example, the user may need to instruct the wearable system 900 regarding what he or she wants to do. Beyond just moving oneself in space, there are various forms of user controls that may be utilized. In one embodiment, a totem (e.g. a user input device), or an object such as a toy gun may be held by the user and tracked by the system. The system preferably will be configured to know that the user is holding the item and understand what kind of interaction the user is having with the item (e.g., if the totem or object is a gun, the system may be configured to understand location and orientation, as well as whether the user is clicking a trigger or other sensed button or element which may be equipped with a sensor, such as an IMU, which may assist in determining what is going on, even when such activity is not within the field of view of any of the cameras.)

Hand gesture tracking or recognition may also provide input information. The wearable system 900 may be configured to track and interpret hand gestures for button presses, for gesturing left or right, stop, grab, hold, etc. For example, in one configuration, the user may want to flip through emails or a calendar in a non-gaming environment, or do a "fist bump" with another person or player. The wearable system 900 may be configured to leverage a minimum amount of hand gesture, which may or may not be dynamic. For example, the gestures may be simple static gestures like open hand for stop, thumbs up for ok, thumbs down for not ok; or a hand flip right, or left, or up/down for directional commands.

Eye tracking is another input (e.g., tracking where the user is looking to control the display technology to render at a specific depth or range). In one embodiment, vergence of the eyes may be determined using triangulation, and then using a vergence/accommodation model developed for that particular person, accommodation may be determined. Eye tracking can be performed by the eye camera(s) to determine eye gaze (e.g., direction or orientation of one or both eyes). Other techniques can be used for eye tracking such as, e.g., measurement of electrical potentials by electrodes placed near the eye(s) (e.g., electrooculography).

Voice recognition can be another input, which can be used alone or in combination with other inputs (e.g., totem tracking, eye tracking, gesture tracking, etc.). The system 900 can include an audio sensor (e.g., a microphone) that receives an audio stream from the environment. The received audio stream can be processed (e.g., by processing modules 260, 270 or central server 1650) to recognize a user's voice (from other voices or background audio), to extract commands, parameters, etc. from the audio stream. For example, the system 900 may identify from an audio stream that the phrase "show me your identification" was said, identify that this phrase was said by the wearer of the system 900 (e.g., a security inspector rather than another person in the inspector's environment), and extract from the phrase and the context of the situation (e.g., a security checkpoint) that there is an executable command to be performed (e.g., computer vision analysis of something in the wearer's FOV) and an object for which the command is to be performed on ("your identification"). The system 900 can incorporate speaker recognition technology to determine who is speaking (e.g., whether the speech is from the wearer of the HMD or another person or voice (e.g., a recorded voice transmitted by a loudspeaker in the environment)) as well as speech recognition technology to determine what is being said. Voice recognition techniques can include frequency estimation, hidden Markov models, Gaussian mixture models, pattern matching algorithms, neural networks, matrix representation, Vector Quantization, speaker diarisation, decision trees, and dynamic time warping (DTW) technique. Voice recognition techniques can also include anti-speaker techniques, such as cohort models, and world models. Spectral features may be used in representing speaker characteristics.

With regard to the camera systems, the example wearable system 900 shown in FIG. 9 can include three pairs of cameras: a relative wide FOV or passive SLAM pair of cameras arranged to the sides of the user's face, a different pair of cameras oriented in front of the user to handle the stereo imaging process 940 and also to capture hand gestures and totem/object tracking in front of the user's face. The FOV cameras and the pair of cameras for the stereo process 940 may be a part of the outward-facing imaging system 464 (shown in FIG. 4). The wearable system 900 can include eye tracking cameras (which may be a part of an inward-facing imaging system 462 shown in FIG. 4) oriented toward the eyes of the user in order to triangulate eye vectors and other information. The wearable system 900 may also comprise one or more textured light projectors (such as infrared (IR) projectors) to inject texture into a scene.

Figure 10:
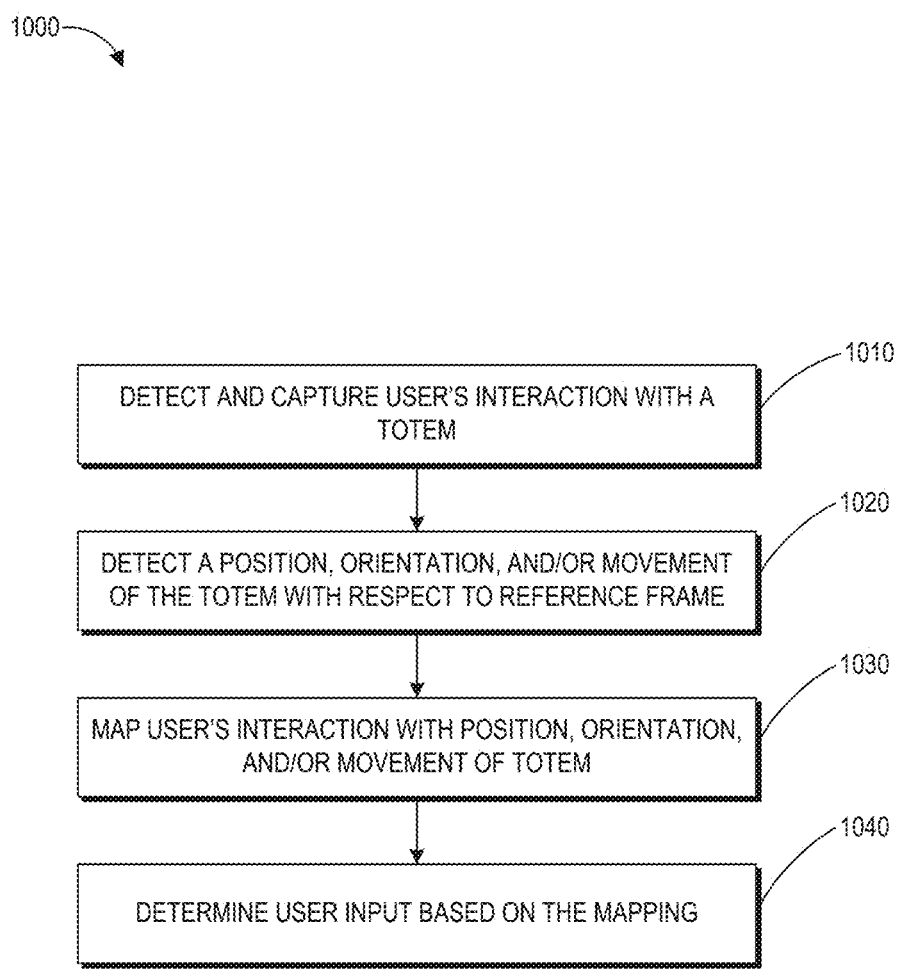
FIG. 10 is a process flow diagram of an example of a method for determining user input to a wearable system.

FIG. 10 is a process flow diagram of an example of a method 1000 for determining user input to a wearable system. In this example, the user may interact with a totem. The user may have multiple totems. For example, the user may have designated one totem for a social media application, another totem for playing games, etc. At block 1010, the wearable system may detect a motion of a totem. The movement of the totem may be recognized through the outward-facing imaging system or may be detected through sensors (e.g., haptic glove, image sensors, hand tracking devices, eye-tracking cameras, head pose sensors, etc.).

Based at least partly on the detected gesture, eye pose, head pose, or input through the totem, the wearable system detects a position, orientation, or movement of the totem (or the user's eyes or head or gestures) with respect to a reference frame, at block 1020. The reference frame may be a set of map points based on which the wearable system translates the movement of the totem (or the user) to an action or command. At block 1030, the user's interaction with the totem is mapped. Based on the mapping of the user interaction with respect to the reference frame 1020, the system determines the user input at block 1040.

For example, the user may move a totem or physical object back and forth to signify turning a virtual page and moving on to a next page or moving from one user interface (UI) display screen to another UI screen. As another example, the user may move their head or eyes to look at different real or virtual objects in the user's FOR. If the user's gaze at a particular real or virtual object is longer than a threshold time, the real or virtual object may be selected as the user input. In some implementations, the vergence of the user's eyes can be tracked and an accommodation/vergence model can be used to determine the accommodation state of the user's eyes, which provides information on a depth plane on which the user is focusing. In some implementations, the wearable system can use ray casting techniques to determine which real or virtual objects are along the direction of the user's head pose or eye pose. In various implementations, the ray casting techniques can include casting thin, pencil rays with substantially little transverse width or casting rays with substantial transverse width (e.g., cones or frustums).

The user interface may be projected by the display system as described herein (such as the display 220 in FIG. 2). It may also be displayed using a variety of other techniques such as one or more projectors. The projectors may project images onto a physical object such as a canvas or a globe. Interactions with user interface may be tracked using one or more cameras external to the system or part of the system (such as, e.g., using the inward-facing imaging system 462 or the outward-facing imaging system 464).

Figure 11:
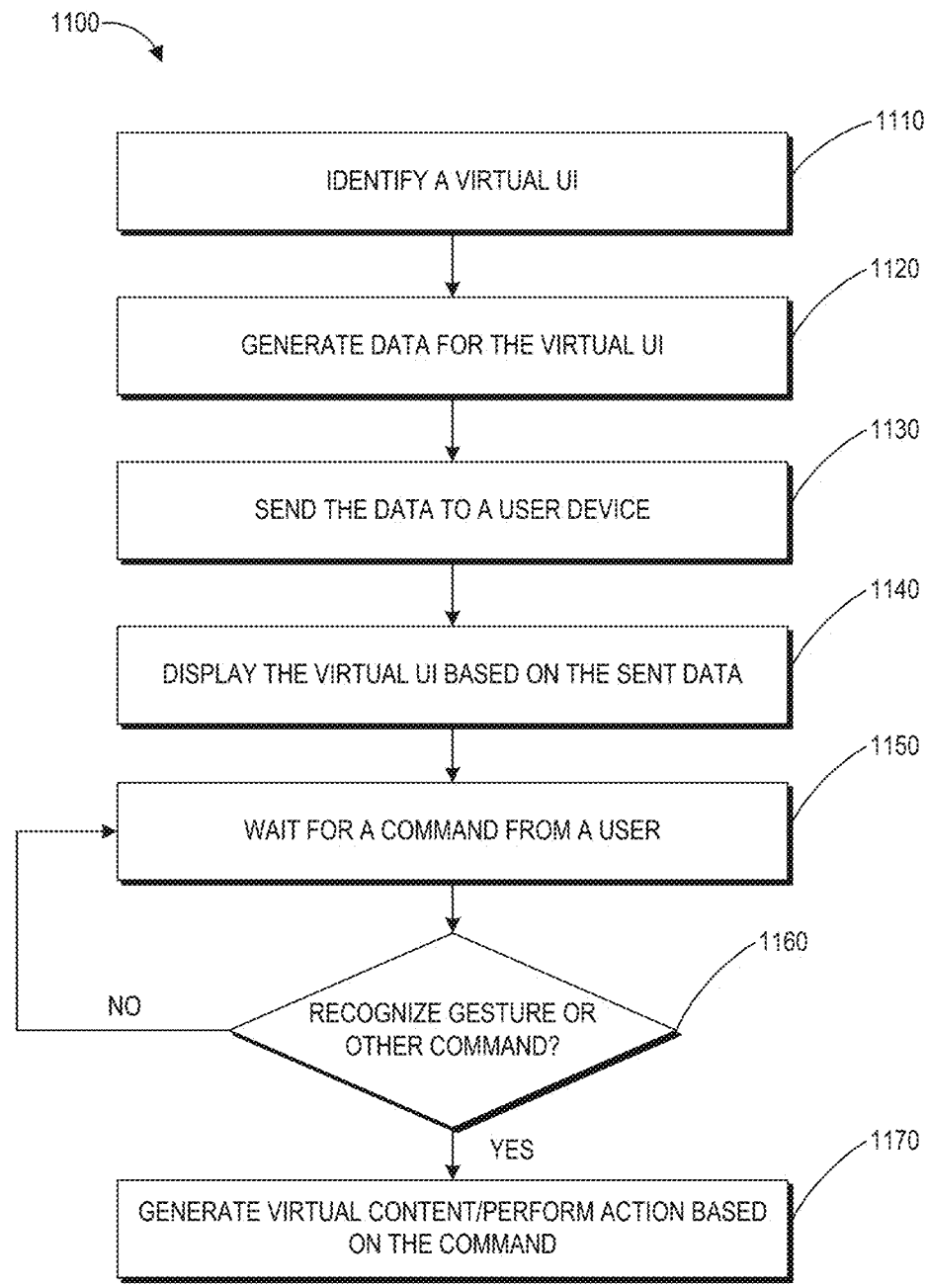
FIG. 11 is a process flow diagram of an example of a method for interacting with a virtual user interface.

FIG. 11 is a process flow diagram of an example of a method 1100 for interacting with a virtual user interface. The method 1100 may be performed by the wearable system described herein. Embodiments of the method 1100 can be used by the wearable system to detect persons or documents in the FOV of the wearable system.

At block 1110, the wearable system may identify a particular UI. The type of UI may be predetermined by the user. The wearable system may identify that a particular UI needs to be populated based on a user input (e.g., gesture, visual data, audio data, sensory data, direct command, etc.). The UI can be specific to a security scenario where the wearer of the system is observing users who present documents to the wearer (e.g., at a travel checkpoint). At block 1120, the wearable system may generate data for the virtual UI. For example, data associated with the confines, general structure, shape of the UI etc., may be generated. In addition, the wearable system may determine map coordinates of the user's physical location so that the wearable system can display the UI in relation to the user's physical location. For example, if the UI is body centric, the wearable system may determine the coordinates of the user's physical stance, head pose, or eye pose such that a ring UI can be displayed around the user or a planar UI can be displayed on a wall or in front of the user. In the security context described herein, the UI may be displayed as if the UI were surrounding the traveler who is presenting documents to the wearer of the system, so that the wearer can readily view the UI while looking at the traveler and the traveler's documents. If the UI is hand centric, the map coordinates of the user's hands may be determined. These map points may be derived through data received through the FOV cameras, sensory input, or any other type of collected data.

At block 1130, the wearable system may send the data to the display from the cloud or the data may be sent from a local database to the display components. At block 1140, the UI is displayed to the user based on the sent data. For example, a light field display can project the virtual UI into one or both of the user's eyes. Once the virtual UI has been created, the wearable system may simply wait for a command from the user to generate more virtual content on the virtual UI at block 1150. For example, the UI may be a body centric ring around the user's body or the body of a person in the user's environment (e.g., a traveler). The wearable system may then wait for the command (a gesture, a head or eye movement, voice command, input from a user input device, etc.), and if it is recognized (block 1160), virtual content associated with the command may be displayed to the user (block 1170).

Additional examples of wearable systems, UIs, and user experiences (UX) are described in U.S. Patent Publication No. 2015/0016777, which is incorporated by reference herein in its entirety.

Examples of Rendering a Virtual Remote Control

Besides interacting with the user's virtual environment, a user can also control a physical object in the user's environment using a wearable device whose display 230 may be configured to render a virtual remote. As further described herein, the wearable system can identify a target device such as a physical remote or a parent device which is controlled by the physical remote. The wearable system can generate a virtual remote based on the characteristics of the target device or the physical remote associated with the target device, present the virtual remote to the user in an AR/MR environment, and allow the user to control the parent device with the virtual remote. Although many of the examples described herein are in the context of using a virtual remote control to control a physical device (e.g., a physical television, a DVD or CD player or an audio system, a thermostat, a coffee machine, refrigerator, or other appliance, an electric lamp or light bulb, a door entry system or home security system, etc.), this is for illustration and is not a limitation. Embodiments of the virtual remote control can be used, additionally or alternatively, to control virtual devices. For example, a user of the wearable system can use a virtual remote control to control a virtual television that is rendered by the wearable device and displayed to the user.

Examples of Initiating a Selection Event on a Virtual Remote

Figure 12:
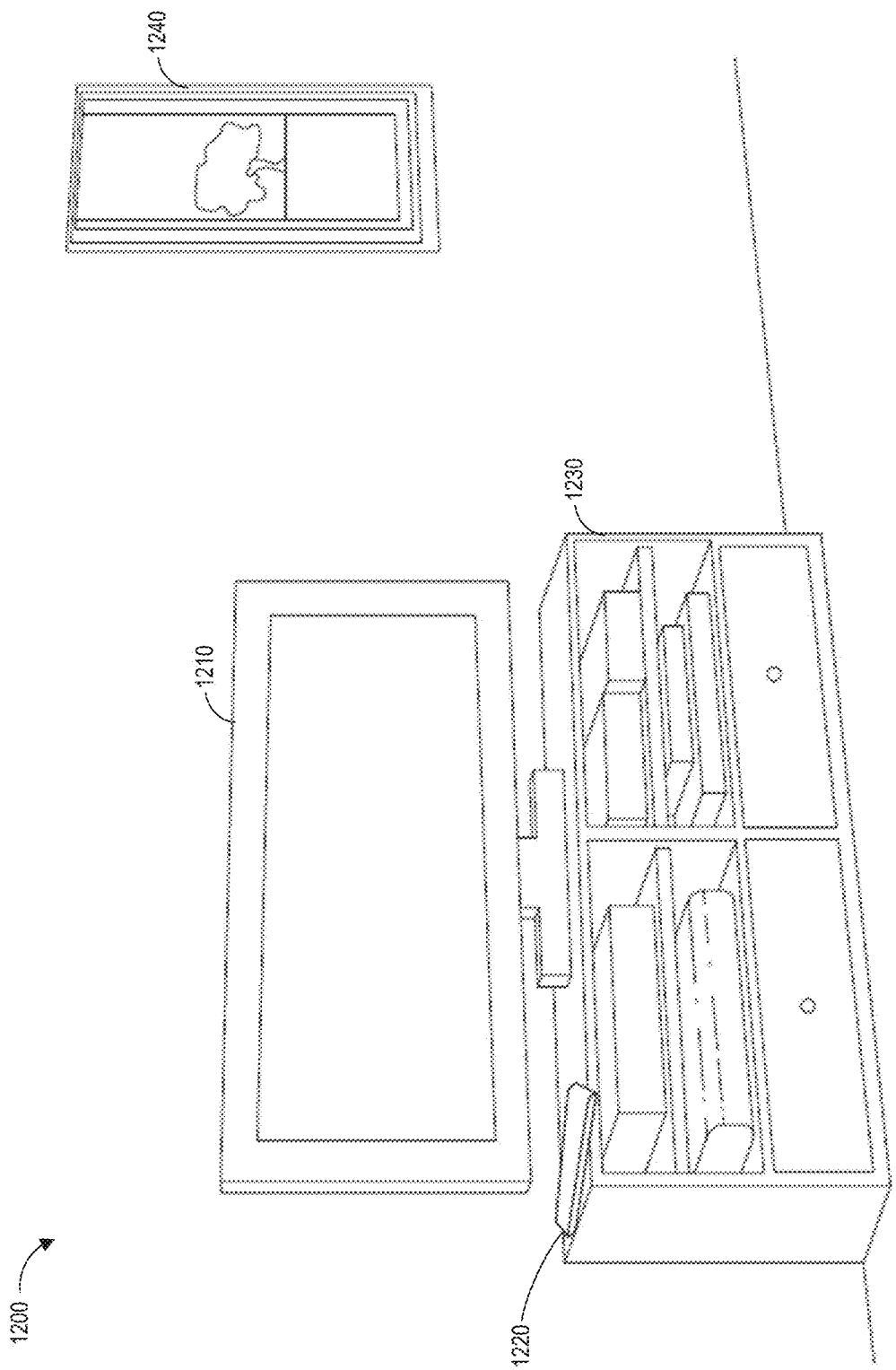
FIG. 12 illustrates an example of a physical environment as perceived by a user of an augmented reality device.

FIG. 12 illustrates an example of a physical environment as perceived by a user of a wearable system. The example environment 1200 includes a living room of a user's home. The environment 1200 has physical objects such as a television (TV) 1210, a physical remote control 1220 (sometimes simply referred to as a remote), a TV stand 1230, and a window 1240. While the user is wearing a wearable device, the user can perceive the physical objects and interact with the physical objects. For example, the user may watch the TV 1210 while wearing the wearable device. The user can control the TV using the physical remote 1220. For example, the user can control the physical remote 1220 to turn the TV 1210 on/off or change the channel or volume of the TV 1210. The user can also interact with the TV 1210 using a virtual remote. The virtual remote may be generated based on the functions of the physical remote 1220. For example, the virtual remote may emulate some or all of the functions of the physical remote 1220 (and may provide additional or alternative functionality as well).

The user can initiate a selection event on a virtual remote associated with a target device. The selection event may cause a user interface action associated with the virtual remote to be performed. For example, upon initiation of the selection event, the wearable device may render the virtual remote in the user's FOV. The target device may be a physical remote which the wearable system can emulate to generate a virtual remote, which emulates functions of the physical remote. The target device may also be a parent device such as a TV, a coffeemaker, a thermostat, or other appliances or electronic devices, etc., which may be controlled by a physical remote or a virtual remote. The user can initiate the selection event by actuating a user input device such as, e.g., clicking on a mouse, tapping on a touch pad, swiping on a touch screen, hovering over or touching a capacitive button, pressing a key on a keyboard or a game controller (e.g., a 5-way d-pad), pointing a joystick, wand or totem toward the object, pressing a button on a remote control, other interactions with a user input device, etc. The user may also initiate the selection event using head, eye, or body poses, such as e.g., by gazing or pointing at a target object for a period of time.

To initiate a selection event on the virtual remote, the user can indicate a selection of the target device associated with the virtual remote. For example, the user can indicate a physical remote to select the virtual remote associated with the physical remote. As shown in FIG. 12, if the user wants to interact with a virtual remote which is based on the functions of the physical remote 1220, the user may indicate the physical remote 1220 by hand gestures such as touching, pointing with finger, visually enclosing the objects by, for example, pinching, or using other hand gestures. As an example, the user may point in the direction of the physical remote 1220 for an extended period of time. As another example, the user may select a virtual remote associated with the physical remote 1220 by making a hand gesture for grabbing the physical remote 1220. The user may also indicate the physical remote 1220 using a user input device (such as, e.g., the user input device 466 shown in FIG. 4). For example, the user may point at the physical remote using a stylus.

Figure 13:
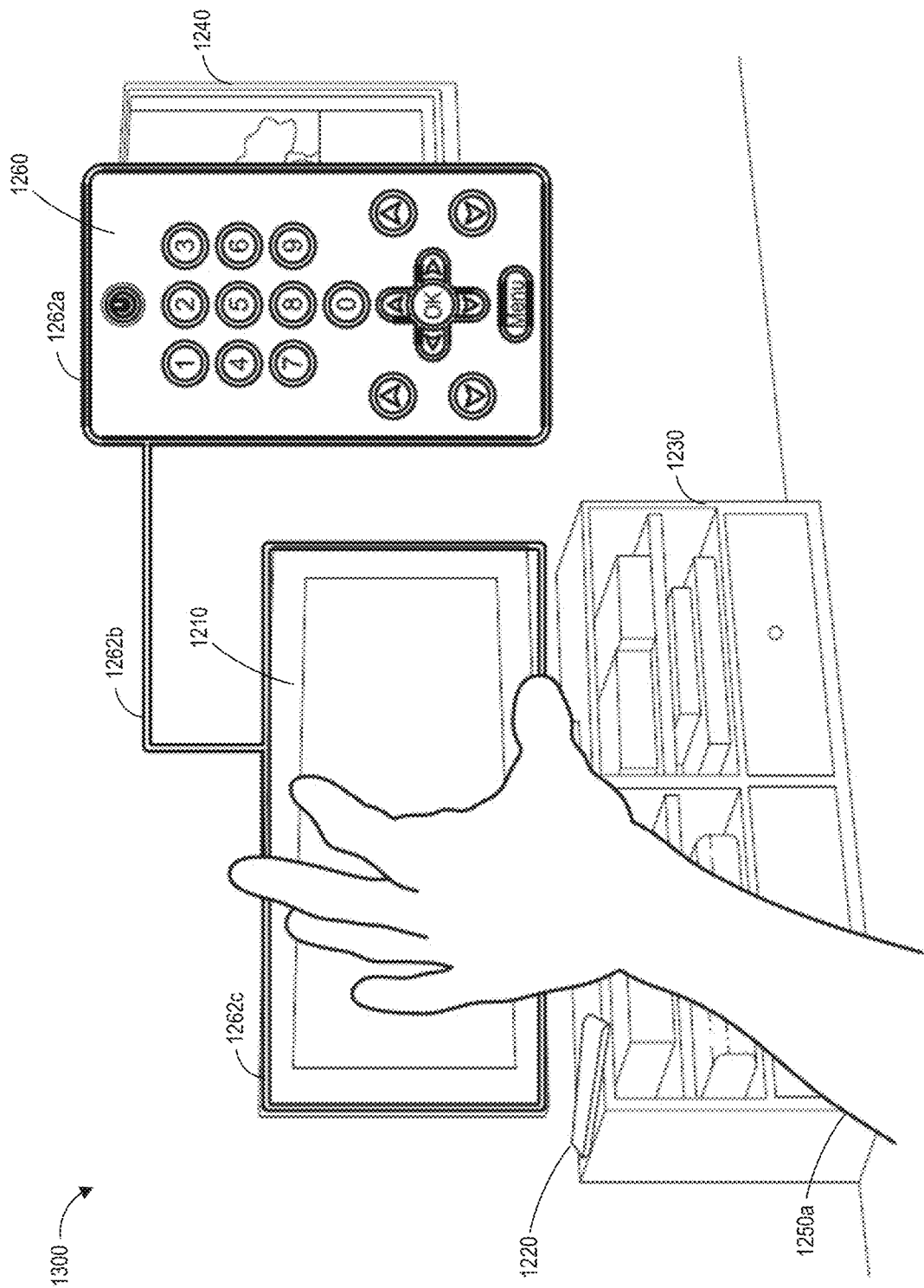
FIG. 13 illustrates an example of initiating a selection event associated with a virtual remote using a hand gesture.

The user can also select a virtual remote by selecting the parent device that the virtual remote controls. The user can use the hand gestures and actuate the user input device for such selection. FIG. 13 illustrates an example of initiating a selection event associated with a virtual remote using a hand gesture. The user can perceive, via the wearable system, the environment 1300 as shown in FIG. 13. The environment 1300 can include physical objects such as the TV 1210, the physical remote 1220, the TV stand 1230, and the window 1240. As illustrated, the user's left arm 1250a is making a pinch gesture indicating the TV 1210. The wearable system may recognize this pinch gesture as a command to render and present the virtual remote 1260 associated with the TV 1210 to the user. As another example, if the user wants to select a virtual remote for controlling the TV 1210, the user can use a body pose (such as grabbing the TV 1210 or pointing at the TV 1210) to indicate a selection of the TV 1210.

In addition to or in alternative to hand gestures and actuations of user input device, a user can also select a virtual remote using eye gaze. The wearable system may perform a cone cast based on the direction of the user's eye gaze (as tracked by the inward-facing imaging system 462). The wearable system can identify an object which intersects the user's direction of gaze and render a remote associated with such object. For example, the wearable system can identify that the TV 1210 based on the user's direction of gaze, and thus present a virtual remote associated with the TV 1210. The virtual remote may be generated based on the physical remote 1220, where the virtual remote may have similar functions and control panels as the physical remote 1220.

Examples of Recognizing a Target Device

The wearable system can recognize a target device, such as the physical remote 1220 or the parent device (such as the TV 1210) using a variety of techniques, alone or in combination. As an example, the wearable system may query the target device directly. This is possible where the device is capable of identifying itself, e.g., by RF wireless protocols such as Wi-Fi or Bluetooth, and where protocols already exist to support such a query. For example, the wearable system can pair with the TV 1210 or the physical remote 1220 using Bluetooth technology.

The wearable system may also identify the target device visually based on the characteristics of the target device. For example, the wearable system may use the outward-facing imaging system to acquire an image of the target device and identify the type target device using computer vision algorithms such as feature keypoint methods (e.g. SIFT) combined with a Bag of Words type search, or through the application of an artificial neural network (e.g. "Alex-net") capable of categorizing devices. The wearable system may identify the target device in a hierarchical fashion. For example, a target device may first be identified as a television using a first algorithm, and then as a specific product, e.g., a ManuCo 55" 530U Series Premium 4K UHD Slim Direct-Lit LED TV, using a second algorithm.

The user can also specify the target device using other poses or user input device. For example, the user may identify a TV with a waving gesture while identifying another type of device (e.g., a thermostat) by pointing his finger at the thermostat. In some embodiments, the user can identify a type of the target device (such as TV or thermostat) using a pose. The wearable system may perform other techniques to further identify a subtype of the type indicated by the user's pose. For example, the user may use a waving gesture to identify that the target device is a TV. The wearable system may run a computer vision algorithm to further identify that the TV is a ManuCo 55" 530U Series Premium 4K UHD Slim Direct-Lit LED TV.

The wearable system may identify the target device by visual inspection of the existing target device for one or more characteristics. For example, the target device may include an optically-readable label such as a bar code or a QR code. The wearable system may include an optical sensor (e.g., an outward facing camera) for scanning or imaging the label and extracting information from the label. The extracted information may include device identifiers such as manufacturer, type of the device, etc. The label may be stuck to or imprinted onto the target device. For example, a TV may have a sticker or placard explicitly indicating the make, model, serial number, etc. of the TV. As another example, the TV's brand may be imprinted on a surface of the TV panel.

In some embodiments, when the target device is the physical remote and the wearable system has recognized the physical remote, the wearable system may be configured to automatically identify the associated parent device. For example, once the wearable system has recognized the physical remote 1220 for the TV 1210, the wearable system can retrieve or search for information associated with the parent device such as the appearance of the parent device, the communication protocols associated with the parent device, or the brand/model of the parent device. The wearable system can search and recognize the parent device in the user's environment based on the images acquired by the outward-facing imaging system. The recognition may be achieved using the computer vision algorithms described herein. The wearable system can also send a query signal to the environment and identify the parent device based on the received response to the query signal. These techniques for identifying the parent device based on the physical remote can also be applied when the target device is the parent device. For example, the wearable system can use similar techniques to identify a physical remote in the user's environment based on a recognized parent device.

The parent device may be associated with multiple physical remotes in some situations. For example, a gaming station may be associated with multiple game controllers. The wearable system may prompt a notification to the user indicating that there is more than one virtual remote associated with the parent device (where each virtual remote may correspond to a physical remote). The wearable system may provide the user the option to select one virtual remote among the multiple virtual remotes with which the user wants to use.

In another example, the wearable system may be uncertain whether the parent device or the physical remote selected by the user is of a certain type. For example, some TVs may be identical in appearance but compatible with different types of physical remotes. Similarly, certain physical remotes may appear to have the same button or shape, but serve different parent devices. The wearable system may present a list of possible options of the virtual remote. The user can then select the correct virtual remote among the list of possible options.

Additionally or alternatively, the wearable system can be configured to allow a user to select a virtual remote associated with a target device using a virtual user interface of the wearable system. For example, the wearable system may present a list of available virtual remotes in a menu. The user can select the virtual remote with which to interact with from the menu. The wearable system can also present a menu including a list of parent devices or physical remotes associated with the parent devices for which the wearable system can provide the virtual remote. For example, the parent devices or physical remotes on the list may be previously identified by the wearable system using one or more object recognizers 2208a-2208n shown in FIG. 7. The user can accordingly select the virtual remote by selecting the parent device or the physical remote from the list.

The virtual remotes themselves may be stored in a data store such as the remote data repository 280 shown in FIG. 2. The wearable system can recognize the target device using the techniques described herein and fetch the specifications for the virtual remote based on the target device. For example, the wearable system may submit a description of the recognized target device to the remote processing module 270 to retrieve the specifications for the associated virtual remote. In some embodiments, the processing module may redirect the request for the specifications to another computing device (such as a server for maintaining the specification for a specific type of device) based on the characteristics of the target device such as brand, type, year of manufacture, etc.

The specifications may include instructions on how to render the virtual remote (e.g. specifying the layout, buttons and other controls, etc.), the communications channel needed to emulate the remote (e.g. from the IRDA specification), the actual codes to be emulated on that channel (e.g. the exact IR pulse sequence associated with the selection of "Channel 2", etc.), and so on. The specification may also include a mapping of a control element to a corresponding function performed on the parent device. For example, an actuation of an upward arrow button (on the physical and the virtual remotes) may be mapped to a function of increasing volume by the parent device.

Examples of Rendering a Virtual Remote

Figure 14:
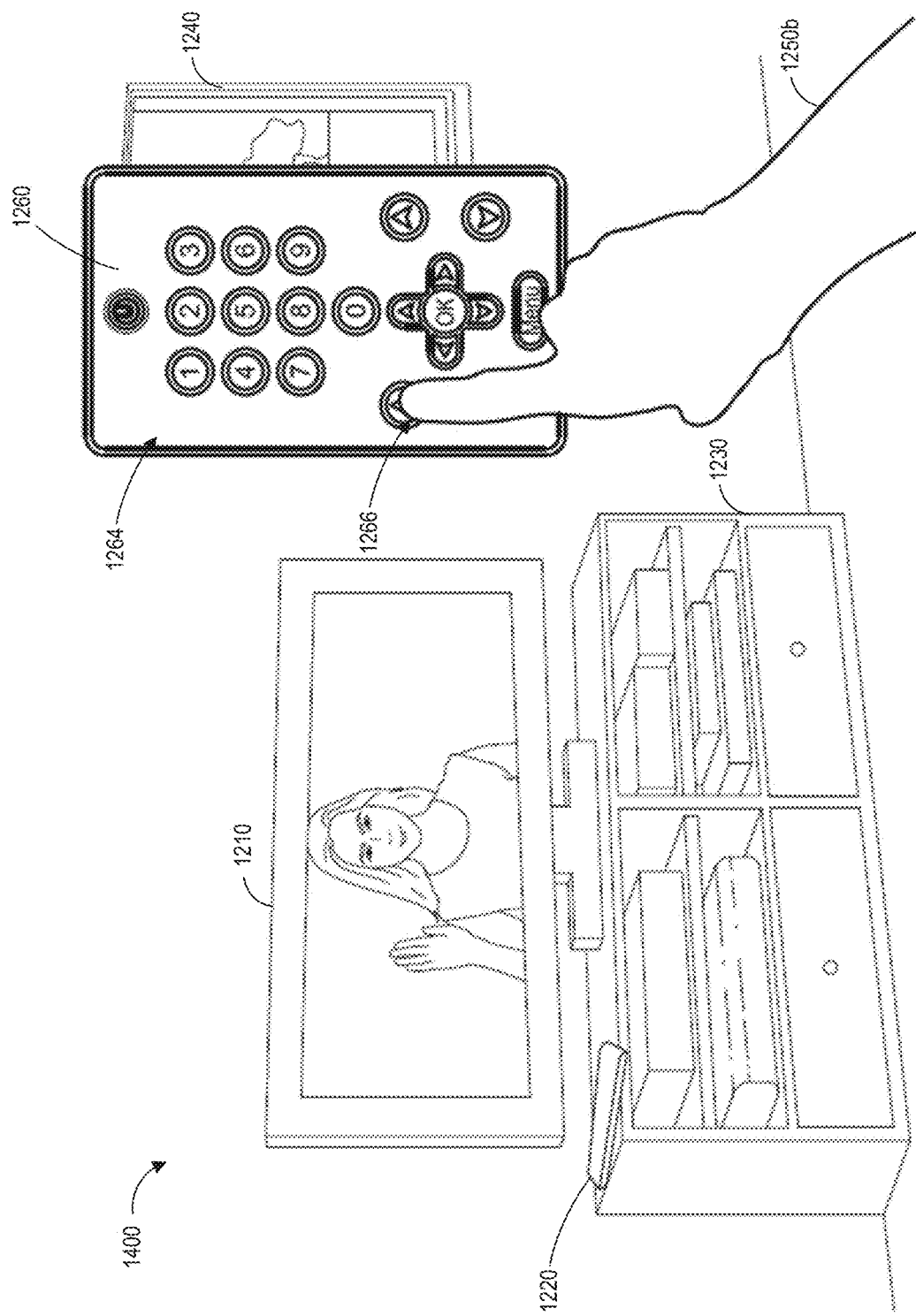
FIG. 14 illustrates an example of actuating a virtual remote during a selection event.

The virtual remote may mirror some or all of the functions or at least a portion of the layout of the physical remote. This may make it easier for a user, who is familiar with the functionality or layout of the physical remote, to operate the virtual remote. Upon the selection of the virtual remote (e.g., by selecting the parent device or the physical remote associated with the virtual remote), the wearable device can render the virtual remote so that it appears visually near the user. For example, as shown in FIG. 14, the wearable device can render a virtual control panel 1264 of the virtual remote 1260 within the user's arm's reach (such as, e.g., between 10 cm and 1 m from the user) so that the user can conveniently interact with the virtual remote. In some embodiments, as the user moves around in his environment, the virtual remote may accordingly move with the user. For example, the wearable device may present the virtual remote at a certain distance from the user regardless of the user's current position in his environment.

Additionally or alternatively, the wearable device can render the virtual remote near the parent device or the physical remote. For example, the wearable device can render a virtual remote for controlling the TV where the virtual control panel of the virtual remote is located next to the TV (e.g., as shown in FIGS. 13 and 14). In some embodiments, the rendering location of the virtual remote may be based on the type of the parent device. For example, if the parent device is a TV, the wearable device may render the virtual remote near the TV because the user's interaction with the TV is likely to happen when the user is in the vicinity of the TV. As another example, if the parent device is a thermostat, the wearable device may render a virtual remote near the user (which may be far away from the thermostat). A user may control a thermostat upstairs in a house using the virtual remote even though the user is downstairs.

Figure 15:
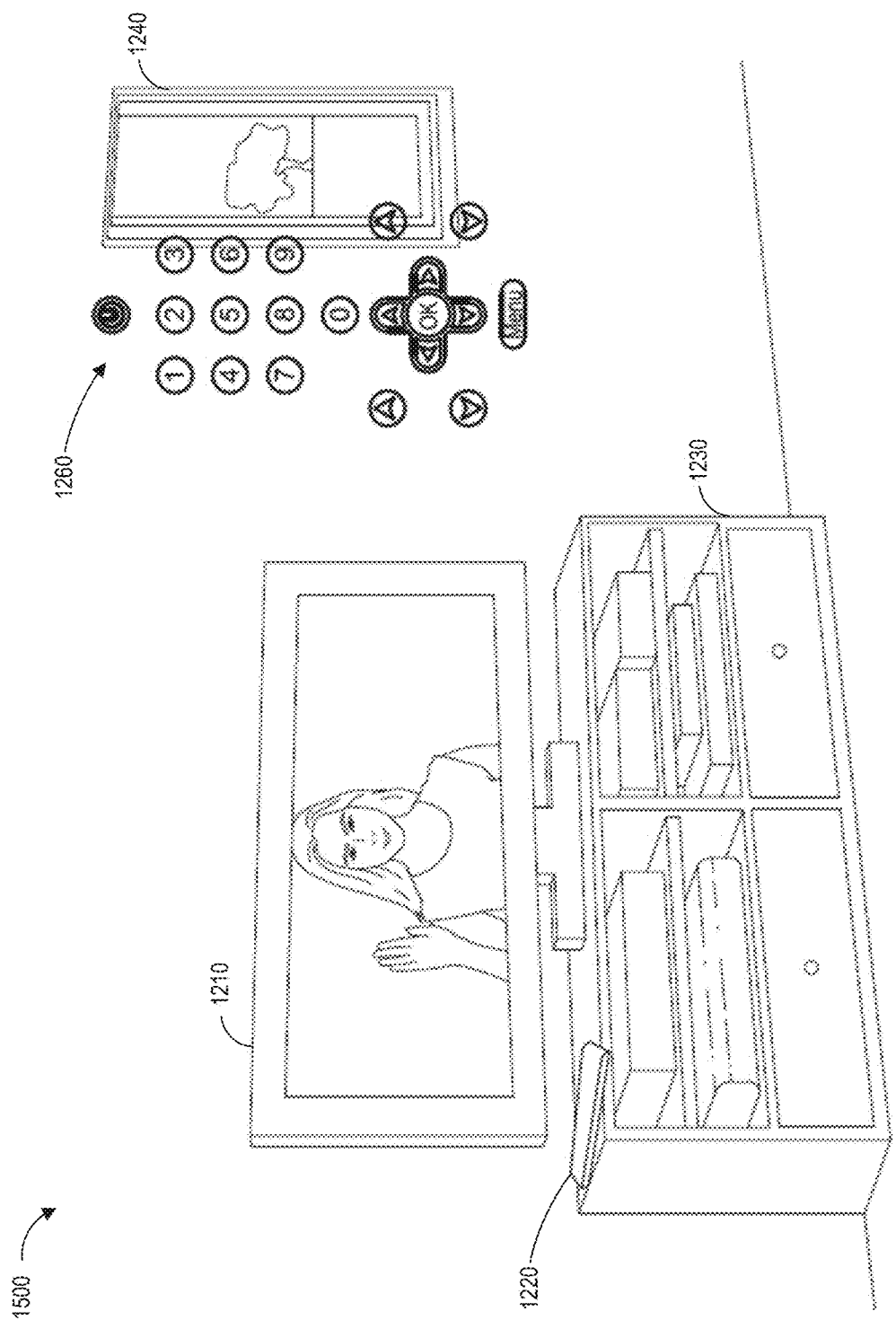
FIG. 15 illustrates an example of automatically hiding a virtual remote or terminating the selection event if a threshold condition is met.

The wearable device can render the virtual remote as superimposed onto the user's physical environment. For example, the wearable device may render the virtual remote 1260 as if it is in front of a wall. The virtual remote may be a rendered as non-transparent such that the user can perceive the virtual remote occluding a portion of the user's physical environment, so that the virtual remote appears as if in front of the portion of the environment. For example, as shown in FIG. 14, the user may perceive that the virtual remote occludes a portion of the window 1240. In some implementations, the virtual remote may be rendered as at least partially transparent so that the user may see through the virtual remote. For example, as shown in FIG. 15, the user may see the window sill as well as the wall even though the user may perceive the virtual remote 1260 as being in front of the window and the wall. Portions of the virtual remote (e.g., user actuatable elements such as the buttons) may be rendered less transparently than other portions (e.g., a body or frame) so that the virtual remote occludes less of the background environment.

The user can also move the rendering location, size, or orientation of the virtual remote. For example, the user can move the virtual remote closer (or farther) to him, upward/downward, left/right, and so on. The user can also fix the rendering location of the virtual remote to be at a certain distance from him or be at a certain location in his environment.

In some embodiments, the wearable device may present a focus indicator associated with the TV 1210 or the virtual remote 1260. The focus indicator may assist the user in seeing or finding the virtual remote. The focus indicator can comprise a halo, a color, a perceived size or depth change (e.g., causing the target object to appear closer and/or larger when selected), a change in the shape of the cursor graphic (e.g., the cursor is changed from a circle to an arrow, where the cursor may indicate the position of the user's hand or finger and the change in the cursor graphic may indicate a user's actuation of a control element or indicate that a user is about to actuate the control element on the virtual remote), or other audible, tactile, or visual effects which draw the user's attention. For example, in FIG. 13, the wearable device can present a focus indicator 1262c around the TV 1210 and a focus indicator 1262a around the virtual remote 1260. The wearable device can also present a focus indicator 1262b connecting the virtual remote 1260 with the TV 1210 to show that the virtual remote 1260 is associated with the TV 1210. In some embodiments, some or all of the focus indicators can be displayed, or not displayed, depending on contextual information, timing, etc. For example, all three focus indicators 1262a, 1262b, and 1262c may be displayed when the virtual remote 1260 is first selected by the user, which may assist the user in recognizing that the virtual remote 1260 is associated with the TV 1210. After a time period, some or all of the focus indicators may disappear or fade away, as they may be no longer needed to show the user that the remote 1260 is associated with the TV 1210.

Examples of Interacting with a Virtual Remote

During a selection event, the user can actuate a virtual remote to interact with a target device. FIG. 14 illustrates an example of actuating a virtual remote during a selection event. In FIG. 14, the user can perceive the environment 1400 using his wearable device. The environment 1400 can include physical objects such as the TV 1210, the physical remote 1220 for controlling the TV 1210, the TV stand 1230, and the window 1240. The environment 1400 can also include a virtual remote 1260. The virtual remote 1260 can emulate the functions of the physical remote 1220 to control the TV 1210. For example, the layout and functions of virtual buttons of the virtual remote 1260 may be substantially the same as the physical keys on the physical remote 1210.

The virtual remote 1260 may include virtual elements such as virtual keyboards, virtual buttons, virtual switches or toggles or sliders, or virtual touch surfaces. These virtual elements may be part of the control panel 1264 of the virtual remote 1260. To actuate the virtual remote, the user may initiate an interaction event on a virtual element. For example, the user can interact with the virtual element by touching, pressing, releasing, sliding up/down or left/right, moving along a trajectory, or other types of movements in the 3D space.

Upon actuation of the virtual remote 1260, the wearable system may communicate with the TV 1210 as if it were the physical remote 1220. As an example, in FIG. 14, the user can use his right arm 1250*b* to actuate the virtual remote 1260. The wearable system can use the outward-facing imaging system to image the user's poses. As further described with reference to FIGS. 16-18, based on the user's poses, the wearable system can compute which virtual element the user has actuated. In the example depicted in FIG. 14, the wearable system can determine that the user's right index finger is actuating the button 1266. In some embodiments, the wearable system may present a focus indicator for the button 1266 indicating that this actuation by the user.

Once the wearable system detects that the user has actuated a virtual element of the virtual remote 1260, the wearable system can accordingly send a signal via the sensor 232 (shown in FIG. 2) to the corresponding parent device to instruct the parent device to perform an action based on the virtual element actuated by the user. For example, the user can touch the virtual button 1266 on the virtual remote. Because this button is associated with increasing the volume of the TV 1210, the wearable system can accordingly generate a signal (such as an IR signal generated by an IR emitter on a wearable device) and communicate the signal to the TV 1210 (which may have an IR detector), thereby causing the TV to increase its volume. The signal generated by the wearable system can be the same signal that would be generated by the corresponding physical remote control.

In cases where the signal is a line-of sight signal (such as an IR signal that must be directed at the IR detector of the TV), the emitter on the wearable system may need to be directed toward the device (just as a physical remote control must be pointed at its associated device). Advantageously, the wearable system may be configured to determine whether the requested command (e.g., to increase the volume of the TV or change a channel) has occurred (e.g., by using a microphone on the wearable system to determine an increase in sound intensity or an outward-facing camera to determine the display of the TV has changed, respectively). If the effect of the command has not been produced by the parent device, the wearable system may instruct the user to change the user's pose so that the wearable system emitter is directed toward the parent device. For example, the wearable system may generate a visual graphic (or audible instruction) to suggest the user to point the user's head toward the parent device. In some implementations, and for some types of parent devices, the communication between the wearable system and the parent device may not be line-of-sight sensitive (e.g., when wireless RF signals or ultrasonic acoustic signals are used), and the foregoing functionality may be optional.

Although the examples in FIG. 14 illustrate actuating the virtual remote using hand gestures, the user can also actuate the virtual remote using other poses such as head poses, eye poses (including, e.g., eye gaze directions), or other body poses. In addition to or in alternative to various poses, the user may interact with the virtual remote using a user input device. For example, the user may actuate the virtual remote using a stylus or a wand or a totem.

In some embodiments, the wearable system may communicate with the physical remote to control the functions of the parent device. For example, upon detection of actuating the virtual remote, the wearable system may communicate the information associated with the actuation (such as which key is pressed, etc.) to the physical remote. The physical remote can then communicate the information associated with the actuation to the parent device.

When the user is done with the virtual remote, the user may use a hand gesture or actuate the virtual remote to terminate the selection event. As an example, while the user is watching a TV program, the user may decide that he does not need the virtual remote any more. As a result, the user may wave his hand to indicate that he is done with the virtual remote. The user may also press the dismiss button on the virtual remote. The wearable system may, in response, cease displaying the virtual remote or display the virtual remote so that it is substantially less visually perceptible (e.g., with increased transparency), which may assist the user in later selecting the virtual remote.

In certain implementations, rather than terminating the selection event, the wearable system may temporarily hide the virtual remote from the user's FOV or move the virtual remote outside of the user's FOV or to an edge of the user's FOV. For example, the user may start watching a movie on the TV 1210 and decide that he may not need the virtual remote for a while. The user can use a swipe gesture to indicate that he does not need the virtual remote right now. The wearable system can accordingly hide the virtual remote from the user's FOV or move the virtual remote outside of the user's FOV or minimize the virtual remote.

The wearable system can also automatically hide a virtual remote or terminate the selection event if a threshold condition is met. FIG. 15 illustrates an example of such features. In FIG. 15, the user can perceive the environment 1500 which includes physical objects such as the TV 1210, the physical remote 1220, the TV stand 1230, and the window 1240. The user can also perceive the virtual remote 1260. As described herein, the wearable system can emulate the signal of the physical remote 1220 and present a virtual user remote 1260 which includes the functions of the physical remote 1220. In the example environment 1500, however, the user is currently watching a program on the TV 1210 through the wearable system. The wearable system can detect that the virtual remote is inactive for a threshold period of time (such as 10 seconds, 1 minute, 2 minutes, etc.), because the user has not actuated the virtual remote during the threshold period of time. The wearable system can gradually fade out the virtual remote such as by increasing the transparency of the virtual remote. For example, the virtual remote 1260 may change from non-transparent to transparent as part of the fading out process. The wearable system can also fade out the virtual remote by decreasing the visibility of the virtual remote. For example, the wearable system can gradually reduce the size of the virtual remote or change the color of the virtual remote from a dark color to a light color (or change the color to be a color in the surrounding environment). In some embodiments, the wearable system may remove the focus indicator associated with the virtual remote when the virtual remote is hidden. In other embodiments, the wearable system may still display the focus indicator (such as, e.g., the halo around the virtual remote), even though the control panel of the virtual remote is hidden.

In addition to or as an alternative to a period of inactivity, the threshold condition for hiding the virtual remote or terminating the selection event may be based on the contextual information associated with the target device. For example, when the wearable system detects that the user is watching a movie, the wearable system may automatically hide the virtual remote (or terminate the selection event) after the user selects the movie. As another example, the wearable system may automatically hide the virtual remote or terminate the selection event when based on the type of the parent device. For example, the wearable system may be configured to automatically hide the virtual remote or terminate the selection event after a period of inactivity when the parent device associated with the virtual remote is a TV or a thermostat. However, when the parent device is a game controller, the wearable system may be configured to leave the virtual remote there unless specifically indicated by the user.

Although the examples described herein are with reference to one virtual remote, in some embodiments, the wearable system may render multiple virtual remotes associated with one or more target devices in the user's FOV. The wearable system may allow the user to interact and switch among these virtual remotes using poses or a user input device.

Example Processes of Rendering a Virtual Remote

Figure 16:
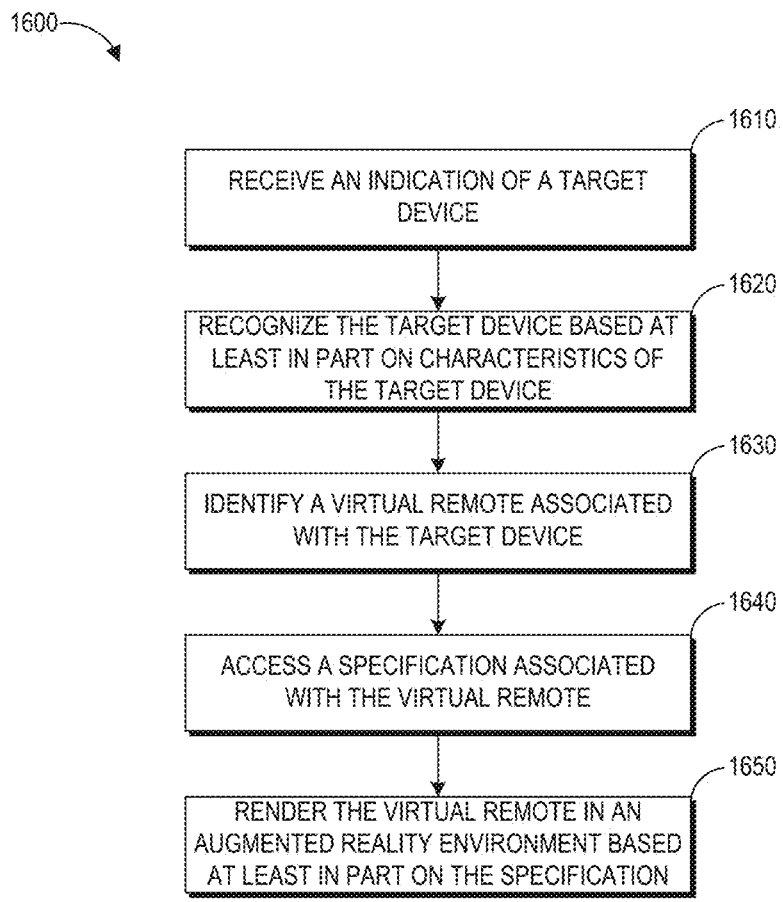
FIG. 16 illustrates an example process of rendering a virtual remote.

FIG. 16 illustrates an example process of rendering a virtual remote. The process 1600 may be performed by the wearable system 200 described herein. In some embodiments, the process 1600 may be part of a selection event.

At block 1610, the wearable system can receive an indication of a target device. The indication may include a change in the user's pose or an actuation of a user input device. For example, the user can make certain hand gestures that indicate a selection of a target device. The target device may be a physical remote or a parent device of the physical remote. For example, the user can point at a TV or the physical remote of the TV indicating that the user wants to interact with the TV via a virtual remote.

At block 1620, the wearable system can recognize the target device based at least in part on characteristics of the target device. The characteristics may include appearances of the target device, such as the shape, size, color, layout of control panel, and so on. For example, the wearable system can acquire an image of the targeted device and apply a computer vision algorithm which can identify appearances of the target device. The wearable system can communicate with a data store and use the appearance of the target device to identify the brand and model of the target device. Characteristics may also include other visual cues such as a label. For example, the wearable system can identify the label associate with the target device, which may include information such as the brand, model, manufacturer, date of manufacture, compatibility, etc., of the target device. The wearable system can accordingly image and parse the label to recognize the target device. In certain implementations, the wearable system may also send a query signal to the target device to recognize the type associated with the target device based on the response to the query signal. For example, the wearable system can send a query signal wirelessly to the target device requesting a device identifier from the target device. The target device may respond with its device identifier. The wearable system can thereby associate the device identifier with the target device. The wearable system can use the identifier to access the characteristics of the target device such as the specifications, appearances of the target device, etc. The wearable system and the target device can use wireless advertising techniques in which, for example, one of these devices communicates advertisements, and the other device scans for such advertisements and initiates wireless connections to advertising devices.

At block 1630, the wearable system can identify a virtual remote associated with the target device. For example, based on the recognized target device, the wearable system may access a data store storing which virtual remote is associated with the target device. The wearable system can accordingly fetch the virtual remote (together with the specification of the virtual remote) as shown in block 1640. In some situations, where the target device is a parent device (such as, e.g., a TV), the wearable system may identify a physical remote associated with the parent device after the wearable system recognizes the target device. The wearable system can generate a virtual remote emulating the functions of the physical remote. Where the target device is a physical remote, the wearable system can identify the associated parent device. The wearable system can establish a connection to the parent device and communicate with the parent device as if it is the physical remote.

At block 1640, the wearable system can access a specification associated with the virtual remote. The specification may include protocols for communicating with the parent device (such as, e.g., the channel and frequency used for communication). The specification may also include layout of virtual elements on the control panel and the functions of each virtual element of virtual remote. The specification may be based on the physical remote used for controlling the parent device such that the virtual remote may have the same specification as the physical remote and the virtual remote may substitute the physical remote for communications with the parent device. In some implementations, the wearable system can perform the block 1640 righter after the target device is recognized. For example, the wearable system can perform the block 1640 before the block 1630. The wearable system can automatically fetch the specification from a data store after the wearable system has identified the model of a physical remote or a parent device. In certain implementations, the wearable system can access a virtual remote based on the specification.

At block 1650, the wearable system can render the virtual remote in an AR/MR environment based at least in part on the specification. The wearable system can render the virtual remote and the virtual elements of the virtual remote based on the retrieved layout. In some embodiments, the wearable system may provide one or more focus indicators associated with the virtual remote, the virtual elements of the virtual remote, or the parent device. For example, the focus indicator may include a visual connection (such as a line) connecting the parent device and the virtual remote. This focus indicator may show that the virtual remote controls the parent device.

As further described herein, the user can actuate the virtual remote (and the virtual elements of the virtual remote) using poses or a user input device. The wearable system can generate a signal causing one or more user interface actions to be performed based on the user's action.

Although the examples herein are described with reference to rendering a virtual remote based on a physical remote or a parent device, in various embodiments, the virtual remote can also be rendered based on a user input device 466 (such as, e.g., a physical keyboard).

Example Interactions with a Virtual Element on a Virtual User Interface

The wearable system can be configured to detect actuation of a virtual element based on the user's hand or finger movement or the movement of a stylus or wand. The virtual element may be part of a virtual remote described herein, although in some embodiments, the virtual element may be a standalone user interface element rendered in the AR/VR/MR environment. The virtual element may be a virtual button, toggle, slider, or a virtual touch surface, or elements with other types of user interface appearances.

Figure 17:
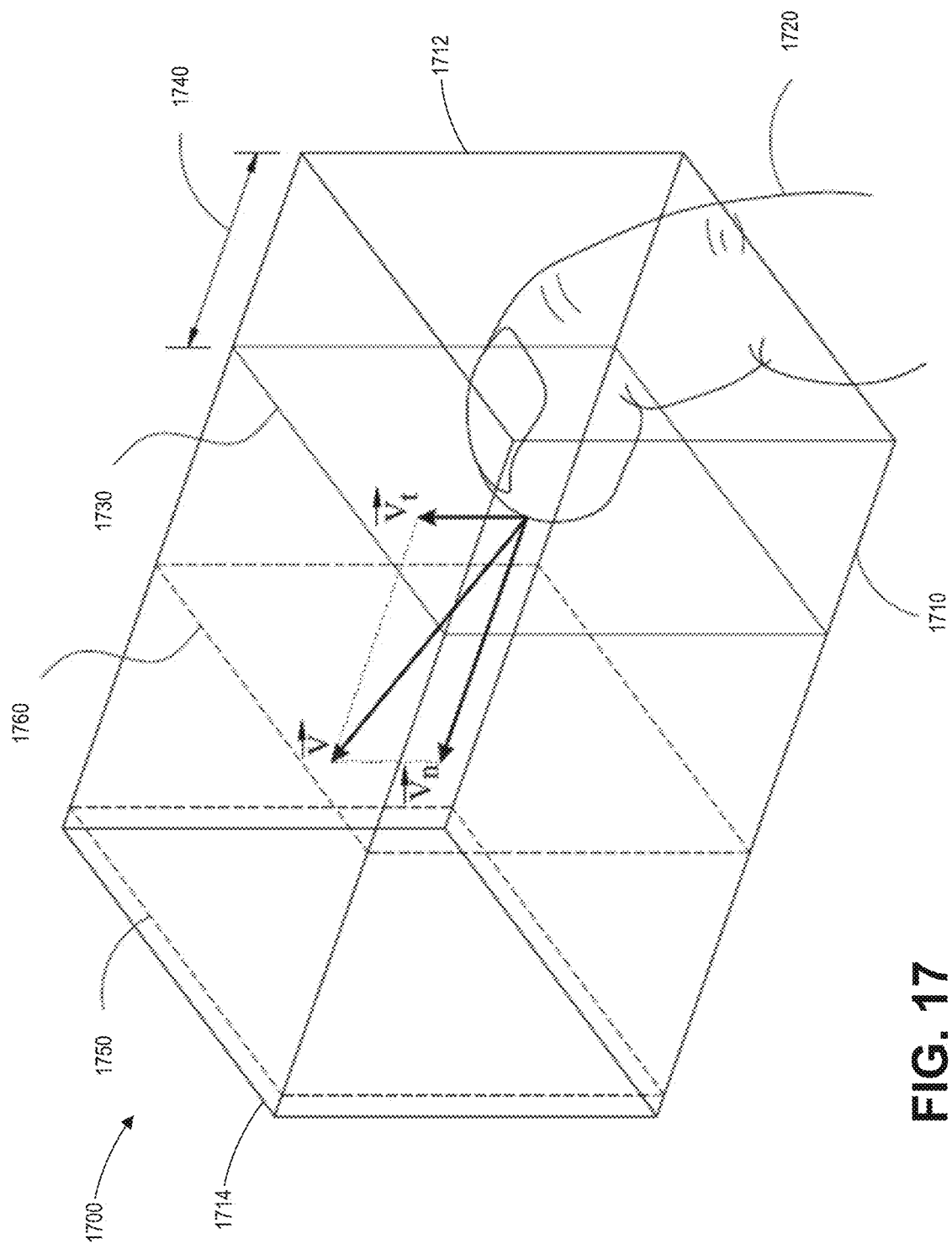
FIG. 17 illustrates an example of detecting an act of pressing a virtual button by a user.

FIG. 17 illustrates an example of detecting an act of pressing a virtual button by a user. The virtual button 1700 in FIG. 17 includes a proximal surface 1712 and a distal surface 1714, where the proximal surface 1712 is the side of the virtual button that is close to the user while the distal surface 1714 is the side that is away from the user.

The virtual button 1700 can include an active volume 1710. The active volume 1710 may represent a volume of space in the user's environment in which the button can be actuated. When the wearable system detects that the user's finger has entered into this volume of space, the wearable system may initiate an interaction event on the virtual button 1700 associated with this volume of space. Because the location of the virtual remote (or the virtual button) may change based on the user's position or interaction (such as when the user moves around in his room or when the user moves the virtual remote to a different location), the active volume 1710 associated with the virtual button 1700 may not necessarily be fixed to a certain location in the user's environment.

In FIG. 17, the active volume 1710 associated with the virtual button 1700 may be the volume of space in-between the proximal surface 1712 and the distal surface 1714 of the virtual button 1700. Although in this example, the volume of space associated with the active volume 1710 is the same as the volume of space associated with the virtual button 1700, in some embodiments, the volume of space associated with the active volume 1710 may be a portion of the active volume associated with the virtual button 1700.

The active volume 1710 can include a trigger surface 1750 and a release surface 1760. The trigger surface 1750 or the release surface 1760 may cause the wearable system to initiate an interaction event on the virtual element.

The active volume 1710 may also include an active surface 1730. The active surface 1730 may be in a parallel relationship with the proximal surface 1712 or the distal surface 1714. The position of the active surface 1730 may change based on the movement of the user's finger. For example, the initial position of the active surface 1730 may be at the proximal surface 1712. However, when the user's finger 1720 enters into the active volume 1710, the wearable system may calculate a penetration distance 1740 into the active volume 1710 based on the movement of the user's finger 1720. This penetration distance 1740 may be used to calculate the displacement of the active surface 1730. For example, the active surface 1730 may move away from the proximal surface 1712 by the amount of the penetration distance 1740. In some embodiments, at least the active surface 1730 is displayed to the user so that the user can visually perceive the virtual button 1700 being depressed or released. Further, although the finger 1720 is illustrated in FIG. 17 as actuating the button 1700, this is for illustration and in other embodiments, an end of a stylus or wand can be used to actuate the button 1700. Further, the user's finger 1720 can be a thumb, forefinger, or other finger.

The wearable system may also calculate a velocity associated with the active surface 1730. For example, the user's finger 1720 may enter the active volume 1710 with a velocity $\vec{V}$. The velocity $\vec{V}$ may include two components: $\vec{V_n}$ and $\vec{V_t}$, where $\vec{V_n}$ is normal to the active surface 1730 and $\vec{V_t}$ is parallel to the active surface 1730. The velocity $\vec{V_n}$ may be imparted to the active surface 1730. As a result, active surface 1730 can co-move with the finger 1720 when the finger 1720 is moving toward the back of the active surface. The wearable system can utilize an outward-facing imaging system 464 to image the movement of the user's finger 1720 and determine a position or the velocity $\vec{V}$ using computer vision techniques. In implementations in which the velocity is measured, the penetration distance 1740 can be determined via numerical integration (e.g., Simpson's rule, Newton-Cotes algorithms, or Gauss quadrature formulas) as $\int \vec{V_n} \, dt$.

As the finger 1720 continues moving toward the distal surface 1714, the active surface 1730 may reach the trigger surface 1750. In some embodiments, the trigger surface 1750 may be located at the distal surface 1714 of the active volume 1710. In other embodiments, the trigger surface 1750 may be in-between the proximal surface 1712 and the distal surface 1744. Upon determining that the active surface 1730 has reached the position of the trigger surface 1750, the wearable system may initiate an interaction event associated with the trigger surface 1750. For example, the wearable system may generate a signal indicating that the user has pressed the button 1710 as part of the interaction event. In some embodiments, when an interaction event is triggered, the wearable system may prevent another interaction event from being generated, at least temporarily. For example, a virtual button may be associated with multiple interaction events such as pressing, releasing, or sliding. When a pressing interaction is triggered, the wearable system may prevent the sliding or the releasing interaction event to be triggered. The distance between the proximal surface 1712 and the trigger surface 1750 may be set to reflect the sensitivity of the button 1700. For example, a very sensitive button 1700 may have a relatively small distance between the proximal surface 1712 and the trigger surface 1750 (so that the button is easy to trigger with a small movement of the fingertip). A less sensitive button 1700 may have a relatively large distance between the proximal surface 1712 and the trigger surface 1750 (so that greater fingertip movement is needed to actuate the button). The distance between the proximal surface 1712 and the trigger surface 1750 may be in a range from about 1 mm to 5 cm or some other distance, in various embodiments.

In some implementations, the active surface 1730 may not be able to move past the trigger surface 1750. For example, the active surface 1730 may stop moving past the trigger surface 1750 even if the user's finger 1720 continues moving in the direction toward or past the distal surface 1714.

The user can terminate the interaction event, for example, by retracting his finger. As an example, the user may move his finger back toward the proximal surface 1712. The active surface 1730 may accordingly move towards the proximal surface 1712 from the trigger surface 1750. In some embodiments, when the active surface 1730 reaches the release surface 1760, the wearable system may terminate the interaction event associated with pressing the virtual button 1700 and thereby allow another interaction event to be initiated (e.g., by the user pressing the button toward the distal surface 1714 again). Additionally or alternatively, when the active surface 1730 reaches the release surface 1760, the wearable system may initiate another interaction event associated with releasing the button. For example, the virtual button 1700 may be associated with an arrow key such that when the user presses the virtual button 1700, the user's avatar is moving in a certain direction in the virtual environment rendered by the wearable system. When the user releases the virtual button 1700, the wearable system may generate a signal indicating that the user's avatar will stop moving in that direction.

The active surface 1730 may recede toward the proximal surface 1712 at a pre-determined return velocity. The return velocity may be a constant or a function of the position of the active surface. For example, the return velocity may gradually increase until it reaches the proximal surface 1712 (where the return velocity reaches 0 because the active surface 1730 may be configured not to pass the proximal surface 1712 of the virtual button). As another example, the return velocity may change when it reaches a certain threshold position. For example, the return velocity may be slow while the active surface is in-between the trigger surface 1750 and the release surface 1760 but may increase when the active surface moves past the release surface 1760 toward the proximal surface 1712. The return velocity may be greater than, less than, or equal to the velocity of the receding finger.

In some embodiments, active surface 1730 may co-move with the finger 1720 when active surface 1730 is receding. For example, the active surface 1730 may recede with a velocity $\vec{Vn}$ while the finger recedes with a velocity $\vec{V}$.

Figure 18:
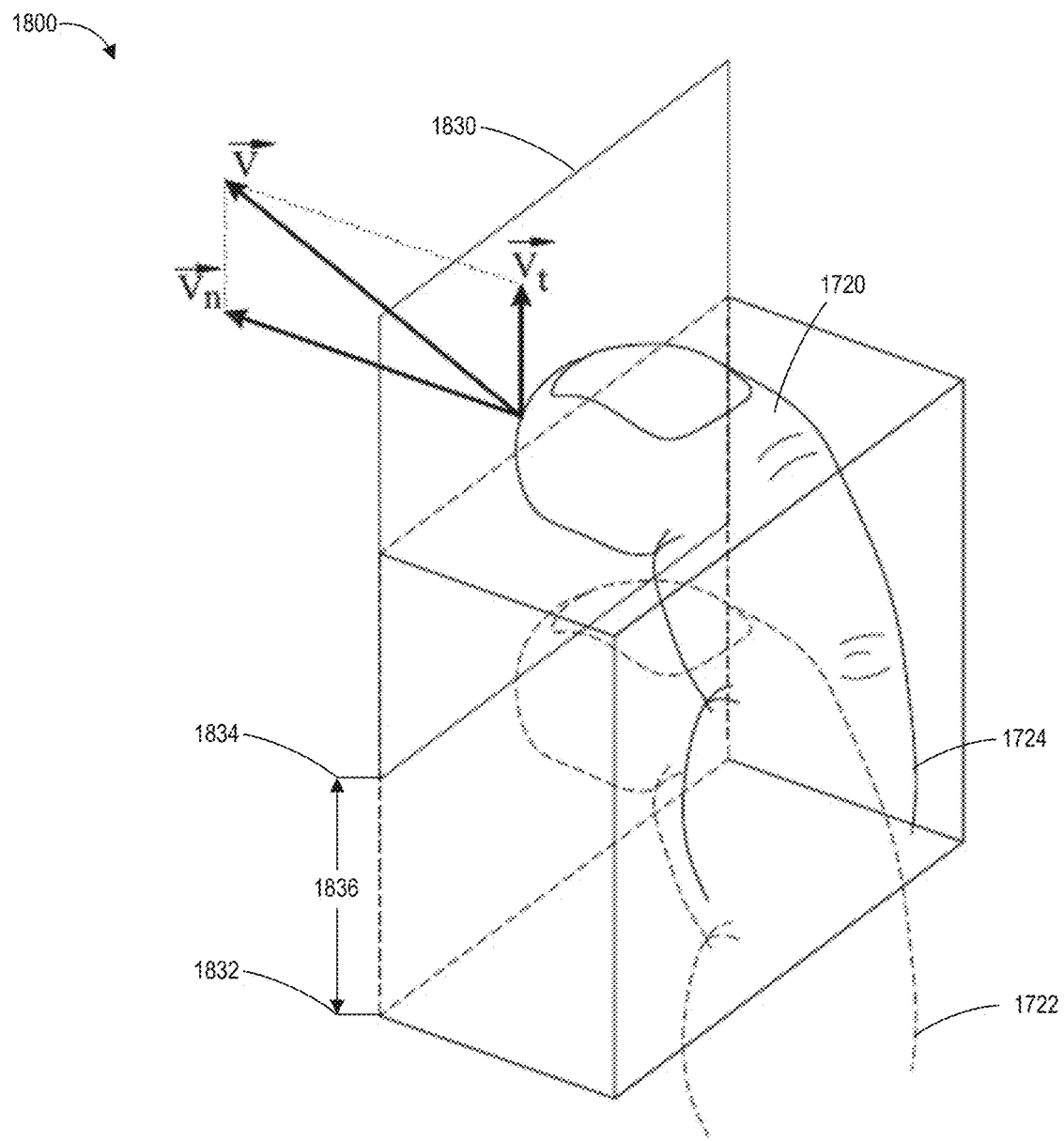
FIG. 18 illustrates an example where a user actuates a virtual button by sliding the virtual button up and down.

In addition to or in alterative to pressing a virtual button, a user can also interact with a virtual button by sliding the virtual button. FIG. 18 illustrates an example where a user actuates a virtual button by sliding the virtual button up and down. The virtual button 1800 may include an active surface 1830. The active surface 1830 may be an embodiment of the active surface 1730 described in FIG. 17. The active surface 1830 may be initially located at the position 1832.

Although in this example, the active surface 1730 moves in a direction parallel to the distal surface 1714 and the proximal surface 1712, the movement of the active surface 1730 may move in any direction in the 3D space (such as a direction that is not parallel to the distal surface 1714 or the proximal surface 1712).

In FIG. 18, the wearable system may determine that the finger 1720 is initially at the position 1722 which corresponds to the position 1832 of the active surface 1830. The wearable system may further detect that a portion of the finger 1720 intersects with the active surface 1830. The wearable system can detect that the finger 1720 moves from the position 1722 to the position 1724 with a velocity $\vec{V}$. The velocity $\vec{V}$ is composed of velocities $\vec{Vn}$ and $\vec{Vt}$, where $\vec{Vn}$ is normal to the active surface 1830 and $\vec{Vt}$ is parallel to the active surface 1830. Accordingly, the wearable system can move the active surface 1830 with a velocity $\vec{Vt}$.

In this example, the displacement of the active surface 1830 may also be calculated based on the movement of the finger 1720. For example, the wearable system can calculate that the finger 1720 has moved for a distance 1836 in the direction that is parallel to the active surface 1830. The wearable system may then determine that the active surface may be displaced for the distance 1836. Accordingly, the wearable system may move the active surface upward from the position 1832 to the position 1834. In some embodiments, the wearable system may set one or more threshold positions where an interaction event may be triggered. For example, when the active surface reaches the position 1834, the wearable system may generate a signal to move a virtual object in the user's FOV upward. Similarly as described with reference to FIG. 17, the wearable system can utilize an outward-facing imaging system 464 to image the movement of the user's finger 1720 and determine a position or the velocity $\vec{V}$ using computer vision techniques. In implementations in which the velocity is measured, the displacement distance 1836 can be determined via numerical integration (e.g., Simpson's rule, Newton-Cotes algorithms, or Gauss quadrature formulas) as $\int \vec{Vt}\, dt$.

When the user's finger 1720 no longer touches the active surface 1830 or when the user's finger 1720 slides down, the wearable system may recede the active surface to its initial position (such as from the position 1834 to the position 1832). In some embodiments, the velocity of receding may be a pre-determined velocity which may not correspond to the finger's movement. In other embodiments, the active surface may co-move with the finger 1720.

Figure 19:
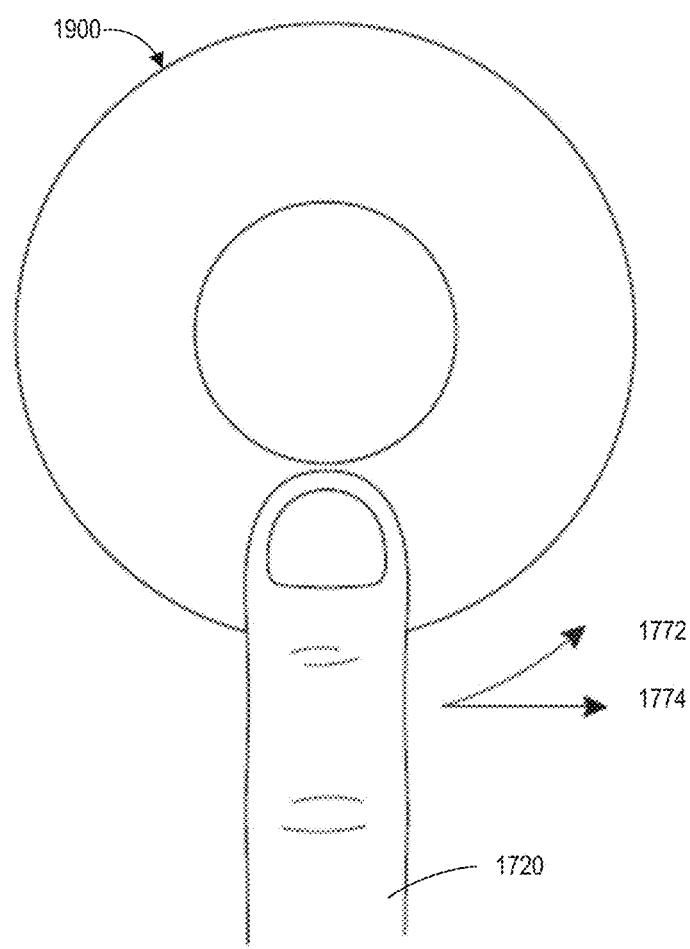
FIG. 19 illustrates an example where a user actuates a virtual touch surface.

FIG. 19 illustrates an example where a user actuates a virtual touch surface. The virtual touch surface 1900 may be part of a virtual remote described herein or be a standalone virtual element. The user can actuates the virtual touch surface 1900 using the finger 1720. The finger 1720 may move along a trajectory 1772. The wearable system can accordingly initiate an interaction event based on the trajectory 1772. For example, the wearable system can calculate the tangent 1774 of the trajectory 1772. The wearable system can initiate an interaction event if the movement (velocity or displacement) along the tangent 1774 exceeds a threshold condition. During the interaction event, the wearable system can provide an instruction for moving a virtual object along the trajectory 1772.

In some embodiments, the wearable system may present a focus indicator associated with a virtual element. For example, the wearable system may present the color or depth change based on the movement of the active plane, where the intensity of the color or the perceived depth increases as the active surface moves towards the distal surface of the virtual button. As another example, the wearable system may provide a sound or a glow around a virtual button when the virtual button is pressed. The wearable system may also illuminate the proximal surface of the virtual button indicating that the virtual button is pressed. The focus indicator may also be provided when the user releases the button. For example, as the button moves closer to the proximal surface, the illumination on the button may decrease. As another example, the size (or the font) associated with the virtual button may decrease as it recedes back to its initial position.

The appearances of the virtual elements (e.g., the virtual buttons 1700, 1800, and the virtual touch surface 1900) illustrated in FIGS. 16-18 are merely examples and are not intended to be limiting. For example, the active surfaces as well as the virtual elements may be in any 2D or 3D shapes such as a rectangle, triangle, circle, oval, sphere, cuboid, pyramid, irregular, etc.

Furthermore, although the examples are described with reference to actuating the virtual elements with a finger of the user, in some implementations, the user can also actuate the virtual elements using other hand poses, body poses, or more than one figure. Additionally or alternatively, the user can actuate the virtual elements using a user input device, such as a stylus or a wand.

Example Processes for Interacting with a Virtual Button

Figure 20:
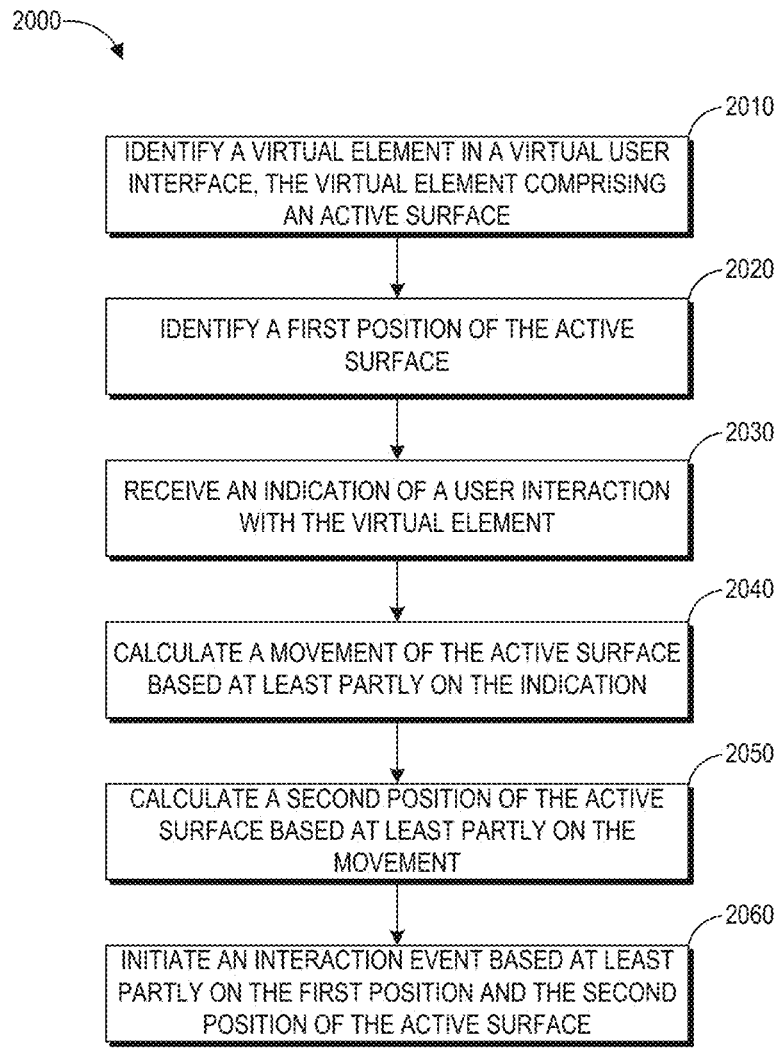
FIG. 20 illustrates an example process for initiating an interaction event with a virtual element in a mixed reality user interface.

FIG. 20 illustrates an example process for initiating an interaction event with a virtual element in a virtual user interface. The process 2000 in FIG. 20 may be performed by the wearable system 200 described herein.

At block 2010, the wearable system can identify a virtual element in a virtual user interface. The virtual user interface may be part of an AR/VR/MR environment. The VR or the MR environment may be rendered by the wearable system alone or in combination with another computing device. The virtual element may be a virtual button or a virtual touch surface. The virtual element may be part of the virtual remote described herein or be a standalone virtual user interface element. The virtual element may include an active surface whose movements may be associated with the user's movement. In some embodiments, the active surface may be part of an active volume which can cause an interaction event to be triggered upon detecting that a portion of the user's body (such as a finger) has entered into the active volume.

At block 2020, the wearable system can identify a first position of the active surface. The first position may be the initial position of the active surface before the user interaction. For example, the first position may be located at the proximal surface of a virtual button (or of an active volume of the virtual button). However, in some implementations, when the user has already pressed the button, the first position may be at the trigger surface or at the distal surface of the virtual button (or the active volume of the virtual button).

At block 2030, the wearable system can receive an indication of a user interaction with the virtual element. The indication may be that a portion of the user's body intersects with the virtual element (or the active surface). For example, a user may press a virtual button or touch the active surface.

At block 2040, the wearable system can calculate a movement of the active surface based at least partly on the indication 2040. For example, the wearable system can calculate a velocity vector of the user's finger when the user presses a virtual button. Based on the velocity vector, the wearable system can calculate a velocity in a direction normal to the active surface and use this velocity as the velocity for the active surface. As another example, when the user is sliding a virtual surface, the wearable system can calculate a velocity in the direction that is parallel to the active surface for determining the velocity of the active surface. The wearable system can also calculate a displacement of the active surface based on the amount of distance that the user's finger has moved.

At block 2050, the wearable system can calculate a second position of the active surface based at least partly on the movement 2050. For example, the wearable system can calculate the second position based on the displacement of the active surface. In some embodiments, once the active surface reaches a certain threshold position, the active surface will not continue moving. For example, when the active surface reaches the distal end or the proximal end of the active volume, the active surface may stop moving so that it will move pass the distal end or the proximal end of the active volume.

At block 2060, the wearable system can initiate an interaction event based at least partly on the first position and the second position of the active surface. The second position may be associated with triggering a certain user interface action. For example, when the active surface reaches a triggering surface, the wearable system may determine that the user has pressed the virtual button. As another example, when the user's finger recedes, the active surface may move back toward the proximal surface of the active volume. Once the active surface reaches a release surface, the wearable system may generate a signal indicating that the user has released the virtual button.

Additional Aspects

In a 1st aspect, a system for providing a visual remote by an augmented reality device (ARD), the system comprising: an augmented reality (AR) display for presenting a virtual image to a user of an ARD; an outward-facing imaging system configured to image an environment of the user; a sensor configured to communicate with a parent device; and a hardware processor programmed to: identify, based on data from at least one of the outward-facing imaging system or the sensor, a physical remote associated with the parent device in the environment of the user; access specifications of the physical remote; emulate the physical remote based at least partly on the accessed specification to generate a virtual remote; receive a selection of the virtual remote; render, by the display, the virtual remote in response to the selection; receive an indication of an interaction with the parent device via the virtual remote; and transmit an instruction comprising the indication of the interaction to the parent device.

In a 2nd aspect, the system of aspect 1, wherein the AR display comprises a light field display.

In a 3rd aspect, the system of any one of aspects 1-2, wherein the sensor comprises an infrared light source.

In a 4th aspect, the system of any one of aspects 1-3, wherein the parent device comprises at least one of: a television, a thermostat, an audio system, a home theater system, a home security system, a door bell, a door lock, an air conditioner, a heater, a lighting system, or a garage door opener.

In a 5th aspect, the system of any one of aspects 1-4, wherein to identify, based on the data from at least one of the outward-facing imaging system or the sensor, the physical remote, the hardware processor is programmed to: receive an image of the environment from the outward-facing imaging system; and identify at least one of the parent device or the physical remote in the image using a computer vision algorithm.

In a 6th aspect, the system of aspect 5, wherein the image comprises at least one of: a still image, a frame of a video, or a video.

In a 7th aspect, the system of any one of aspects 5-6, to identify at least one of the parent device or the physical remote, the hardware processor is programmed to: recognize existence of at least one of the parent device or the physical remote; and identify a type of at least one of the parent device or the physical remote.

In an 8th aspect, the system of any one of aspects 5-7, wherein the computer vision algorithm comprises at least one of: a feature keypoint algorithm, a bag of words type search, or a neural network algorithm.

In a 9th aspect, the system of any one of aspects 1-8, wherein to identify, based on the data from at least one of the outward-facing imaging system or the sensor, the physical remote comprises: receive, by the sensor, a signal indicating a presence of the physical remote or the parent device in the environment of the user.

In a 10th aspect, the system of any one of aspects 1-9, wherein the specifications of the physical remote comprise at least one of: a plurality of buttons, a layout of buttons, a communication channel, or a signal associated with the communication channel.

In an 11th aspect, the system of any one of aspects 1-10, wherein to emulate the physical remote, the hardware processor is programmed to associate functionality of a button on the physical remote with a button on the virtual remote.

In a 12th aspect, the system of any one of aspects 1-11, wherein to receive a selection of the virtual remote, the hardware processor is configured to: detect a pose of the user, wherein the pose indicates the selection of the virtual remote; or receive an indication of the selection from a user input device.

In a 13th aspect, the system of any one of aspects 1-12, wherein the virtual remote is rendered based at least partly on a layout of buttons of the physical remote.

In a 14th aspect, the system of any one of aspects 1-13, wherein to receive an indication of an interaction, the hardware processor is programmed to: detect a pose of the user, wherein the pose indicates the selection of the virtual remote; or receive an indication of the selection from a user input device.

In a 15th aspect, the system of aspect 14, wherein the pose comprises at least one of a head pose, a hand gesture, a body pose, or a foot pose.

In a 16th aspect, the system of any one of aspects 1-15, wherein the instruction is transmitted in accordance with an infrared data association communication standard or a radio frequency communication standard.

In a 17th aspect, a wearable display device comprising: a display for presenting a virtual image to a user of the wearable display device; an outward-facing imaging system configured to image an environment of the user; a sensor configured to communicate with an electronic device; and a hardware processor in communication with the display, the outward-facing imaging system, and the sensor, the hardware processor programmed to: access remote control specifications of the electronic device; render a virtual remote having a user interface permitting user interaction with the electronic device, the user interface providing functionality based at least partly on the remote control specifications; analyze an image obtained by the outward-facing camera to determine a gesture by the user; analyze the gesture to determine an interaction by the user with the user interface of the virtual remote; and transmit, via the sensor to the electronic device, an instruction associated with the interaction, the instruction based at least partly on the remote control specifications of the electronic device.

In an 18th aspect, the wearable display device of aspect 17, wherein the display comprises a light field display.

In a 19th aspect, the wearable display device of aspect 17 or 18, wherein the sensor comprises an infrared emitter or a radio frequency emitter.

In a 20th aspect, the wearable display device of any one of aspects 17-19, wherein: the hardware processor is programmed to analyze an image obtained by the outward-facing imaging system to determine a specific model of the electronic device.

In a 21st aspect, the wearable display device of any one of aspects 17-20, wherein the hardware processor is programmed to render a focus indicator associated with the virtual remote.

In a 22nd aspect, a method for providing a visual remote by an augmented reality device (ARD), the method comprising: under control of an ARD comprising a hardware processor, a display for presenting a virtual image to a user of the ARD, an outward-facing imaging system configured to image an environment of the user, and a sensor configured to communicate with a parent device: identifying, based on data from at least one of the outward-facing imaging system or the sensor, a physical remote associated with the parent device in the environment of the user; accessing specifications of the physical remote; emulating the physical remote based at least partly on the accessed specification to generate a virtual remote; receiving a selection of the virtual remote; rendering, by the display, the virtual remote in response to the selection; receiving an indication of an interaction with the parent device via the virtual remote; and transmitting an instruction comprising the indication of the interaction to the parent device.

In a 23rd aspect, the method of aspect 22, wherein identifying, based on the data from at least one of the outward-facing imaging system or the sensor, the physical remote comprises: receiving an image of the environment from the outward-facing imaging system; and identifying at least one of the parent device or the physical remote in the image using a computer vision algorithm.

In a 24th aspect, the method of aspect 23, wherein identifying at least one of the parent device or the physical remote comprises: recognizing existence of at least one of the parent device or the physical remote; and identifying a type of at least one of the parent device or the physical remote.

In a 25th aspect, the method of aspect 23 or 24, wherein the computer vision algorithm comprises at least one of: a feature keypoint algorithm, a bag of words type search, or a neural network algorithm.

In a 26th aspect, the method of any one of aspects 22-25, wherein identifying, based on the data from at least one of the outward-facing imaging system or the sensor, the physical remote comprises: receiving, by the sensor, a signal indicating a presence of the physical remote or the parent device in the environment of the user.

In a 27th aspect, the method of any one of aspects 22-26, wherein the specifications of the physical remote comprise at least one of: a plurality of buttons, a layout of buttons, a communication channel, or a signal associated with the communication channel.

In a 28th aspect, the method of any one of aspects 22-27, wherein emulating the physical remote comprises associating functionality of a button on the physical remote with a button on the virtual remote.

In a 29th aspect, the method of any one of aspects 22-28, wherein receiving a selection of the virtual remote comprises at least one of: detecting a pose of the user, wherein the pose indicates the selection of the virtual remote; or receiving an indication of the selection from a user input device.

In a 30th aspect, the method of any one of aspects 22-29, wherein the virtual remote is rendered based at least partly on a layout of buttons of the physical remote.

In a 31st aspect, the method of any one of aspects 22-30, wherein receiving an indication of an interaction comprises: detecting a pose of the user, wherein the pose indicates the selection of the virtual remote; or receiving an indication of the selection from a user input device.

In a 32nd aspect, the method of any one of aspects 22-31, wherein the instruction is transmitted in accordance with an infrared data association communication standard or a radio frequency communication standard.

In a 33rd aspect, a system for detecting actuation of a virtual button, the system comprising: a wearable display system configured to display a virtual image to a user; an outward-facing imaging system configured to obtain images of an environment of the user; and a hardware processor programmed to: identify a virtual button of a virtual user interface, the virtual button comprising an active surface and a trigger surface; identify a first position of the active surface; determine a user interaction indicating movement of the virtual button; calculate a movement of the active surface based at least partly on the user interaction; calculate a second position of the active surface based at least partly on the movement; and initiate an interaction event based at least partly on the first position and the second position of the active surface, wherein the interaction event is associated with actuating the virtual button when the movement of the active surface is toward the trigger surface and the second position of the active surface intersects with at least a portion of the trigger surface, and wherein the interaction event is associated with releasing the virtual button when the movement of the active surface is away from the trigger surface and the first position of the active surface intersects with at least a portion of the trigger surface.

In a 34th aspect, the system of aspect 33, wherein the active surface is in a parallel relationship with the trigger surface.

In a 35th aspect, the system of aspect 33 or 34, wherein the virtual button further comprises a release surface and wherein the interaction event is associated with releasing the virtual button when the second position of the active surface intersects with at least a portion of the release surface.

In a 36th aspect, the system of any one of aspects 33-35, wherein the user interaction indicating movement of the virtual button comprises an intersection between the active plane and a physical object in the environment of the user, the physical object comprising at least one of: a portion of a user or a portion of a user input device.

In a 37th aspect, the system of aspect 36, wherein to calculate the movement of the active surface, the hardware processor is configured to: calculate a velocity vector of the physical object; and calculate a velocity of the active surface using at least one of: a value the velocity vector of the physical object normal to the active surface, a value of the velocity vector of the physical object parallel to the active surface, or a value of the velocity vector tangent to the active surface.

In a 38th aspect, the system of any one of aspects 36-37, wherein to calculate the second position of the active surface, the hardware processor is configured to: determine the physical object has receded from the trigger surface at a recession speed; and move the active surface at speed less than or equal to the recession speed.

In a 39th aspect, the system of any one of aspects 33-38, wherein calculating the movement of the active surface comprises calculating a displacement of the active surface.

In a 40th aspect, the system of any one of aspects 33-39, wherein the hardware processor is further configured to provide a visualization of the virtual button based at least partly on the movement of the active surface.

In a 41st aspect, the system of aspect 40, wherein the visualization comprises a focus indicator of the virtual button, the focus indicator being provided when the movement of the virtual button passes a threshold condition.

In a 42nd aspect, the system of aspect 41, wherein the threshold condition comprises at least one of: a threshold position, a threshold duration, or a threshold velocity.

In a 43rd aspect, the system of any one of aspects 40-42, wherein the visualization comprises a focus indicator of the virtual button, wherein the focus indicator changes in accordance with the movement of the active plane.

In a 44th aspect, the system of any one of aspects 33-43, wherein the interaction event comprises at least one of: triggering a user interface function on the virtual user interface or disabling a user interface function.

In a 45th aspect, the system of any one of aspects 33-44, wherein to determine the user interaction indicating movement of the virtual button, the hardware processor is configured to analyzing images obtained by the outward-facing imaging system.

In a 46th aspect, the system of any one of aspects 33-45, wherein the hardware processor is further configured to generate a sound associated with initiating the interaction event.

In a 47th aspect, a method for detecting actuation of a virtual button, the method comprising: under control of a wearable display system configured to display a virtual image to a user, a hardware processor, and an outward-facing imaging system configured to obtain images of an environment of the user: identifying a virtual button of a virtual user interface, the virtual button comprising an active surface and a trigger surface; identifying a first position of the active surface; determining a user interaction indicating movement of the virtual button; calculating a movement of the active surface based at least partly on the user interaction; calculating a second position of the active surface based at least partly on the movement; and initiating an interaction event based at least partly on the first position and the second position of the active surface, wherein the interaction event is associated with actuating the virtual button when the movement of the active surface is toward the trigger surface and the second position of the active surface intersects with at least a portion of the trigger surface, and wherein the interaction event is associated with releasing the virtual button when the movement of the active surface is away from the trigger surface and the first position of the active surface intersects with at least a portion of the trigger surface.

In a 48th aspect, the method of aspect 47, wherein the active surface is in a parallel relationship with the trigger surface.

In a 49th aspect, the method of any one of aspects 47-48, wherein the virtual button further comprises a release surface and wherein the interaction event is associated with releasing the virtual button when the second position of the active surface intersects with at least a portion of the release surface.

In a 50th aspect, the method of any one of aspects 47-49, wherein the user interaction indicating movement of the virtual button comprises an intersection between the active plane and a physical object in the environment of the user, the physical object comprising at least one of: a portion of a user or a portion of a user input device.

In a 51st aspect, the method of aspect 50, wherein calculating the movement of the active surface comprises: calculating a velocity vector of the physical object; and calculating a velocity of the active surface using at least one of: a value the velocity vector of the physical object normal to the active surface, a value of the velocity vector of the physical object parallel to the active surface, or a value of the velocity vector tangent to the active surface.

In a 52nd aspect, the method of aspect 50 or 51, wherein calculating the second position of the active surface comprises: determining the physical object has receded from the trigger surface at a recession speed; and moving the active surface at speed less than or equal to the recession speed.

In a 53rd aspect, the method of any one of aspects 47-52, further comprising providing a visualization of the virtual button based at least partly on the movement of the active surface.

In a 54th aspect, the method of aspect 53, wherein the visualization comprises a focus indicator of the virtual button, the focus indicator being provided when the movement of the virtual button passes a threshold condition.

In a 55th aspect, the method of aspect 54, wherein the threshold condition comprises at least one of: a threshold position, a threshold duration, or a threshold velocity.

In a 56th aspect, the method of aspect 54 or 55, wherein the visualization comprises a focus indicator of the virtual button, wherein the focus indicator changes in accordance with the movement of the active plane.

In a 57th aspect, the method of any one of aspects 47-56, wherein the interaction event comprises at least one of: triggering a user interface function on the virtual user interface or disabling a user interface function.

In a 58th aspect, a wearable system for providing a virtual remote control in a mixed reality environment, the wearable system comprising: a mixed reality display for presenting a virtual image to a user; an outward-facing imaging system configured to image an environment of a user; a sensor configured to communicate with a parent device; and a hardware processor programmed to: access images acquired by the outward-facing imaging system; analyze the images to identify a physical remote associated with the parent device; access specifications of the physical remote; generate a virtual remote based at least partly on the specifications of the physical remote; cause the display to render the virtual remote; receive an actuation of the virtual remote for an interaction with the parent device; and generate and transmit an instruction to the parent device causing the parent device to perform a function as if the physical remote is actuated.

In a 59th aspect, the wearable system of aspect 58, wherein to identify the physical remote, the hardware processor is programmed to: analyze the images to recognize the physical remote using one or more computer vision algorithms comprising at least one of: a feature keypoint algorithm, a bag of words type search, or a neural network algorithm.

In a 60th aspect, the wearable system of aspect 59, wherein the hardware processor is further programmed to identify the presence of the parent device based at least partly on the images acquired by the outward-facing imaging system or a signal received by the sensor which indicates the presence of the parent device.

In a 61st aspect, the wearable system of any one of aspects 58-60, wherein the specifications include at least one of a mapping of controls elements of the physical remote to corresponding functions of the parent device, or communication protocols between the physical remote and the parent device.

In a 62nd aspect, the wearable system of aspect 61, wherein to generate the virtual remote, the hardware processor is programmed to: determine a layout of virtual elements for the virtual remote based at least partly on the specification; and associate the virtual elements of the virtual remote with the control elements of the physical remote such that an actuation of a virtual element on the virtual remote would cause the parent device react as if the control element corresponding to the virtual element is actuated on the physical remote.

In a 63rd aspect, the wearable system of any one of aspects 58-62, wherein the hardware processor is further programmed to: determine a plurality of candidate virtual remotes associated with the parent device; and select the virtual remote among the plurality of candidate virtual remotes based at least partly on the user's pose or an indication from a user input device.

In a 64th aspect, the wearable system of any one of aspects 58-63, wherein the sensor comprises an infrared light source, and wherein the instruction is generated and transmitted to the parent device in accordance with an infrared data association communication standard or a radio frequency communication standard.

In a 65th aspect, the wearable system of any one of aspects 58-64, wherein the virtual remote comprises a virtual button, the virtual button is associated with a volume of space and has an active surface configured to track the user's interaction with the virtual button and a trigger surface for triggering a user interface action.

In a 66th aspect, the wearable system of aspect 65, wherein the active surface is in a parallel relationship with the trigger surface.

In a 67th aspect, the wearable system of aspect 65 or 66, wherein to receive an actuation of the virtual remote, the hardware processor is configured to: identify a first position of the active surface; calculate a second position and a movement of the active surface based at least partly on the user's movement; and actuate the virtual button when the movement of the active surface is toward the trigger surface and the second position of the active surface intersects with at least a portion of the trigger surface, or release the virtual button when the movement of the active surface is away from the trigger surface and the first position of the active surface intersects with at least a portion of the trigger surface.

In a 68th aspect, the wearable system of aspect 67, wherein the virtual button further comprises a release surface and wherein the hardware processor is programmed to release the virtual button when the second position of the active surface intersects with at least a portion of the release surface.

In a 69th aspect, the wearable system of aspect 67 or 68, wherein to calculate the movement of the active surface, the hardware processor is programmed to: calculate a velocity vector of the user's movement; and calculate a velocity of the active surface based on at least one of: a value the velocity vector normal to the active surface, a value of the velocity vector parallel to the active surface, or a value of the velocity vector tangent to the active surface.

In a 70th aspect, the wearable system of aspect 65, wherein the hardware processor is programmed to provide a visualization of the virtual button for presentation to the user by the mixed reality display, the visualization based at least partly on a movement of the active surface.

In a 71st aspect, a method for providing a virtual remote control in a mixed reality environment, the method comprising: accessing images of a user's environment acquired by a wearable device; analyzing the images to identify a target device in the user's environment; accessing specifications associated with the target device, wherein the specifications comprises at least a mapping between control elements of a physical remote to functions of a parent device; generating a virtual remote based at least partly on the specifications; causing the wearable device to render the virtual remote in a mixed reality environment; detecting an actuation of the virtual remote for an interaction with the parent device; and generating and transmitting an instruction to the parent device causing the parent device to perform a function as if the physical remote is actuated.

In a 72nd aspect, the method of aspect 71, wherein the target device comprises the physical remote or the parent device.

In a 73rd aspect, the method of aspect 71 or 72, wherein identifying the target device comprises: analyzing the images to recognize the target device using one or more computer vision algorithms comprising at least one of: a feature keypoint algorithm, a bag of words type search, or a neural network algorithm.

In a 74th aspect, the method of any one of aspects 71-73, wherein generating the virtual remote comprises: determining a layout of virtual elements for the virtual remote based at least partly on the specification; and associating the virtual elements of the virtual remote with the control elements of the physical remote such that an actuation of a virtual element on the virtual remote would cause the parent device react as if the control element corresponding to the virtual element is actuated on the physical remote.

In a 75th aspect, the method of any one of aspects 71-74, wherein the virtual remote comprises a virtual button, the virtual button is associated with a volume of space and has an active surface configured to track the user's interaction with the virtual button and a trigger surface for triggering a user interface action.

In a 76th aspect, the method of any one of aspects 71-75, wherein detecting an actuation of the virtual remote comprises: identifying a first position of the active surface; calculating a second position and a movement of the active surface based at least partly on the user's movement; and actuating the virtual button when the movement of the active surface is toward the trigger surface and the second position of the active surface intersects with at least a portion of the trigger surface, or release the virtual button when the movement of the active surface is away from the trigger surface and the first position of the active surface intersects with at least a portion of the trigger surface.

In a 77th aspect, the method of aspect 76, wherein the virtual button further comprises a release surface and the method further comprises releasing the virtual button when the second position of the active surface intersects with at least a portion of the release surface.

Other Considerations

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A wearable system for providing a virtual remote control in a mixed reality environment, the wearable system comprising:
    a mixed reality display for presenting a virtual image to a user;
    an outward-facing imaging system configured to image an environment of the user;
    a sensor configured to communicate with a parent device; and
    a hardware processor programmed to:
        access images acquired by the outward-facing imaging system;
        analyze the images to identify a physical remote associated with the parent device;
        access specifications of the physical remote;
        generate a virtual remote based at least partly on the specifications of the physical remote, wherein the virtual remote comprises a virtual button associated with a volume of space, the virtual button comprising:
            an active surface configured to track the user's interaction with the virtual button, and
            a trigger surface for triggering a user interface action;
        cause the mixed reality display to render the virtual remote;
        cause the mixed reality display to render a focus indicator, the focus indicator graphically connecting the virtual remote with the parent device, such that the focus indicator identifies that the virtual remote is associated with the parent device:
        identify a first position of the active surface;
        calculate a second position of the active surface based at least partly on the user's movement;
        calculate a movement of the active surface based at least partly on the user's movement, wherein to calculate a movement of the active surface, the hardware processor is configured to:
            calculate a velocity vector of the user's movement; and
            calculate a velocity of the active surface based on at least one of: a value of the velocity vector normal to the active surface, a value of the velocity vector parallel to the active surface, or a value of the velocity vector tangent to the active surface;
        cause the mixed reality display to render an actuation movement of the virtual button when the movement of the active surface is toward the trigger surface and the second position of the active surface intersects with at least a portion of the trigger surface;
        cause the mixed reality display to render a release movement of the virtual button when the movement of the active surface is away from the trigger surface and the first position of the active surface intersects with at least a portion of the trigger surface; and
        generate and transmit an instruction to the parent device causing the parent device to perform a function as if the physical remote is actuated.

2. The wearable system of claim 1, wherein to identify the physical remote, the hardware processor is programmed to:
    analyze the images to recognize the physical remote using one or more computer vision algorithms comprising at least one of: a feature keypoint algorithm, a bag of words type search, or a neural network algorithm.

3. The wearable system of claim 2, wherein the hardware processor is further programmed to identify the presence of the parent device based at least partly on the images acquired by the outward-facing imaging system or a signal received by the sensor which indicates the presence of the parent device.

4. The wearable system of claim 1, wherein the specifications include at least one of a mapping of controls elements of the physical remote to corresponding functions of the parent device, or communication protocols between the physical remote and the parent device.

5. The wearable system of claim 4, wherein to generate the virtual remote, the hardware processor is programmed to:
   determine a layout of virtual elements for the virtual remote based at least partly on the specification; and
   associate the virtual elements of the virtual remote with the control elements of the physical remote such that an actuation of a virtual element on the virtual remote would cause the parent device react as if the control element corresponding to the virtual element is actuated on the physical remote.

6. The wearable system of claim 1, wherein the hardware processor is further programmed to:
   determine a plurality of candidate virtual remotes associated with the parent device; and
   select the virtual remote among the plurality of candidate virtual remotes based at least partly on the user's pose or an indication from a user input device.

7. The wearable system of claim 1, wherein the sensor comprises an infrared light source, and wherein the instruction is generated and transmitted to the parent device in accordance with an infrared data association communication standard or a radio frequency communication standard.

8. The wearable system of claim 1, wherein the active surface is in a parallel relationship with the trigger surface.

9. The wearable system of claim 1, wherein the virtual button further comprises a release surface and wherein the hardware processor is programmed to cause the mixed reality display to render the release movement of the virtual button when the second position of the active surface intersects with at least a portion of the release surface.

10. The wearable system of claim 1, wherein the hardware processor is programmed to provide a visualization of the virtual button for presentation to the user by the mixed reality display, the visualization based at least partly on the movement of the active surface.

11. A method for providing a virtual remote control in a mixed reality environment, the method comprising:
   accessing images of a user's environment acquired by a wearable device;
   analyzing the images to identify a target device in the user's environment;
   accessing specifications associated with the target device, wherein the specifications comprises at least a mapping between control elements of a physical remote to functions of a parent device;
   generating a virtual remote based at least partly on the specifications, wherein the virtual remote comprises a virtual button associated with a volume of space, the virtual button comprising:
      an active surface configured to track the user's interaction with the virtual button, and
      a trigger surface for triggering a user interface action;
   causing the wearable device to render the virtual remote in a mixed reality environment;
   causing the wearable device to render a focus indicator, the focus indicator graphically connecting the virtual remote with the parent device, such that the focus indicator identifies that the virtual remote is associated with the parent device;
   identifying a first position of the active surface;
   calculating a second position of the active surface based at least partly on the user's movement;
   calculating a movement of the active surface based at least partly on the user's movement, wherein calculating a movement of the active surface comprises:
      calculating a velocity vector of the user's movement; and
      calculating a velocity of the active surface based on at least one of: a value the velocity vector normal to the active surface, a value of the velocity vector parallel to the active surface, or a value of the velocity vector tangent to the active surface;
   causing the wearable device to render an actuation movement of the virtual button when the movement of the active surface is toward the trigger surface and the second position of the active surface intersects with at least a portion of the trigger surface;
   causing the wearable device to render a release movement of the virtual button when the movement of the active surface is away from the trigger surface and the first position of the active surface intersects with at least a portion of the trigger surface; and
   generating and transmitting an instruction to the parent device causing the parent device to perform a function as if the physical remote is actuated.

12. The method of claim 11, wherein the target device comprises the physical remote or the parent device.

13. The method of claim 11, wherein identifying the target device comprises:
   analyzing the images to recognize the target device using one or more computer vision algorithms comprising at least one of: a feature keypoint algorithm, a bag of words type search, or a neural network algorithm.

14. The method of claim 11, wherein generating the virtual remote comprises:
   determining a layout of virtual elements for the virtual remote based at least partly on the specification; and
   associating the virtual elements of the virtual remote with the control elements of the physical remote such that an actuation of a virtual element on the virtual remote would cause the parent device react as if the control element corresponding to the virtual element is actuated on the physical remote.

15. The method of claim 11, wherein the virtual button further comprises a release surface and the method comprises causing the wearable device to render the release movement of the virtual button when the second position of the active surface intersects with at least a portion of the release surface.

* * * * *